US010717263B2

(12) United States Patent
Knecht et al.

(10) Patent No.: US 10,717,263 B2
(45) Date of Patent: Jul. 21, 2020

(54) ADDITIVE MANUFACTURING APPARATUS, SYSTEM, AND METHOD

(71) Applicant: PAXIS LLC, Crystal Lake, IL (US)

(72) Inventors: Frederick Knecht, Woodstock, IL (US); Michael G. Littrell, Crystal Lake, IL (US)

(73) Assignee: PAXIS LLC, Crystal Lake, IL (US)

( * ) Notice: Subject to any disclaimer, the term of this patent is extended or adjusted under 35 U.S.C. 154(b) by 193 days.

(21) Appl. No.: 15/589,609

(22) Filed: May 8, 2017

(65) Prior Publication Data

US 2017/0239932 A1    Aug. 24, 2017

Related U.S. Application Data

(63) Continuation-in-part of application No. 15/349,748, filed on Nov. 11, 2016, now Pat. No. 10,343,390, and
(Continued)

(51) Int. Cl.
*B33Y 30/00* (2015.01)
*B29C 64/171* (2017.01)
(Continued)

(52) U.S. Cl.
CPC ............ *B33Y 30/00* (2014.12); *B29C 64/171* (2017.08); *B29C 64/218* (2017.08);
(Continued)

(58) Field of Classification Search
CPC .............................. B29C 64/245; B29C 64/40
(Continued)

(56) References Cited

U.S. PATENT DOCUMENTS

| 4,865,029 A | 9/1989 | Pankratov et al. |
| 4,915,402 A * | 4/1990 | Brinker ................. A45C 5/146 |
| | | 16/29 |

(Continued)

FOREIGN PATENT DOCUMENTS

| CN | 101489766 A | 7/2009 |
| CN | 101554778 A | 10/2009 |

(Continued)

OTHER PUBLICATIONS

Aug. 5, 2019—(WO) International Search Report & Written Opinion—App PCT/US19/26026.
(Continued)

*Primary Examiner* — Peter L Vajda
*Assistant Examiner* — Russell E Sparks
(74) *Attorney, Agent, or Firm* — Banner & Witcoff, Ltd.

(57) ABSTRACT

An apparatus for producing a three-dimensional object includes a support assembly having a build platform, a track extending through a build area, and a deposition mechanism mounted on the track and configured for producing the three-dimensional object in a layer-by-layer technique. The deposition mechanism includes a carriage moveable along the track, a supply of a flowable material mounted on the carriage, a roller in communication with the flowable material, where the roller is rotatably mounted on the carriage and configured for rotating to carry the flowable resin to an application for application to produce the object, and an exposure device mounted on the carriage. The exposure device emits electromagnetic waves to an exposure site to solidify the applied flowable material to produce the object. The roller is permeable to the electromagnetic waves, such that the waves pass through the roller in traveling from the exposure device to the exposure site.

23 Claims, 71 Drawing Sheets

Related U.S. Application Data a continuation-in-part of application No. 15/349,780, filed on Nov. 11, 2016.

(60) Provisional application No. 62/255,175, filed on Nov. 13, 2015.

(51) Int. Cl.

| | | |
|---|---|---|
| *B29C 64/236* | (2017.01) | |
| *B33Y 10/00* | (2015.01) | |
| *B29C 64/245* | (2017.01) | |
| *B29C 64/223* | (2017.01) | |
| *B29C 64/218* | (2017.01) | |

(52) U.S. Cl.
CPC .......... *B29C 64/223* (2017.08); *B29C 64/236* (2017.08); *B29C 64/245* (2017.08); *B33Y 10/00* (2014.12)

(58) Field of Classification Search
USPC .......................................................... 264/494
See application file for complete search history.

(56) References Cited

U.S. PATENT DOCUMENTS

| | | | |
|---|---|---|---|
| 5,263,130 A | 11/1993 | Pomerantz et al. | |
| 5,902,537 A | 5/1999 | Almquist et al. | |
| 7,195,472 B2 | 3/2007 | John | |
| 7,229,201 B2 | 6/2007 | Krupa et al. | |
| 7,357,629 B2 * | 4/2008 | Weiskopf ............... | B33Y 10/00 425/188 |
| 7,438,846 B2 | 10/2008 | John | |
| 7,467,837 B2 | 12/2008 | Silverbrook | |
| 7,806,493 B2 * | 10/2010 | Gazeau .................. | B41J 3/4073 347/8 |
| 8,252,223 B2 * | 8/2012 | Medina .................. | B33Y 70/00 264/401 |
| 8,317,508 B2 | 11/2012 | Bokodi et al. | |
| 8,696,971 B2 | 4/2014 | Boot et al. | |
| 9,011,136 B1 * | 4/2015 | Uzan ....................... | B33Y 10/00 425/375 |
| 9,254,535 B2 | 2/2016 | Buller et al. | |
| 10,022,911 B2 | 7/2018 | Yasukochi | |
| 10,343,390 B2 | 7/2019 | Knecht et al. | |
| 10,618,270 B2 | 4/2020 | Knecht et al. | |
| 2005/0280185 A1 | 12/2005 | Russell et al. | |
| 2008/0109102 A1 * | 5/2008 | Sutcliffe ............... | B29C 64/165 700/119 |
| 2008/0169589 A1 | 7/2008 | Sperry et al. | |
| 2009/0309267 A1 | 12/2009 | Boot et al. | |
| 2010/0177151 A1 | 7/2010 | Thompson et al. | |
| 2012/0045617 A1 | 2/2012 | Yasukochi | |
| 2014/0070463 A1 | 3/2014 | Boot et al. | |
| 2014/0271328 A1 | 9/2014 | Burris et al. | |
| 2015/0084240 A1 | 3/2015 | Shuck et al. | |
| 2015/0110910 A1 | 4/2015 | Hartmann et al. | |
| 2015/0165556 A1 | 6/2015 | Jones et al. | |
| 2015/0273762 A1 | 10/2015 | Okamoto | |
| 2015/0360419 A1 | 12/2015 | Willis et al. | |
| 2015/0375458 A1 | 12/2015 | Chen et al. | |
| 2016/0158962 A1 | 6/2016 | Balistreri et al. | |
| 2016/0236422 A1 | 8/2016 | Sakura | |
| 2016/0311023 A1 * | 10/2016 | Schirtzinger ............ | B33Y 10/00 |
| 2016/0311163 A1 | 10/2016 | Yasukochi | |
| 2016/0311166 A1 | 10/2016 | Campbell | |
| 2017/0015059 A1 | 1/2017 | Lewicki | |
| 2017/0136688 A1 | 5/2017 | Knecht et al. | |
| 2017/0136701 A1 | 5/2017 | Knecht et al. | |
| 2017/0192377 A1 | 7/2017 | Batchelder et al. | |
| 2017/0239885 A1 | 8/2017 | Knecht et al. | |
| 2017/0239932 A1 | 8/2017 | Knecht et al. | |
| 2017/0348902 A1 * | 12/2017 | Ohara ..................... | B33Y 10/00 |
| 2018/0141126 A1 | 5/2018 | Buller et al. | |
| 2018/0253080 A1 * | 9/2018 | Meess ................ | G05B 19/4099 |
| 2019/0126347 A1 * | 5/2019 | Roman .................. | B33Y 30/00 |

FOREIGN PATENT DOCUMENTS

| | | | |
|---|---|---|---|
| CN | 102049858 A | | 5/2011 |
| CN | 103921444 A | | 7/2014 |
| EP | 3085516 A1 | | 10/2016 |
| EP | 3374163 A1 | | 9/2018 |
| JP | S61118273 A | | 6/1986 |
| JP | H05237942 A | | 9/1993 |
| JP | 2000211031 A | | 8/2000 |
| JP | 2004122501 A | | 4/2004 |
| JP | 2009543717 A | | 12/2009 |
| JP | 2011098484 A | | 5/2011 |
| JP | 2015120261 A | | 7/2015 |
| KR | 20100080298 A | | 7/2010 |
| WO | 2014006399 A1 | | 1/2014 |
| WO | 2015093032 A1 | | 6/2015 |
| WO | 2015116639 A1 | | 8/2015 |
| WO | WO-2015177598 A1 * | | 11/2015 |
| WO | 2017083734 A1 | | 5/2017 |
| WO | 2018208799 A1 | | 11/2018 |

OTHER PUBLICATIONS

Mar. 24, 2017—(WO) International Search Report & Written Opinion—App PCT/US16/61649.
Sep. 12, 2018—(WO) International Search Report and Written Opinion—App PCT/US18/31630.
Mar. 19, 2019—(AU) Office Action—App 2016353326.
Apr. 2, 2019—(CA) Office Action—App 3,005,229.
Jul. 10, 2019—(EESR) Supplementary European Search Report & Opinion—App EP16865142.
Nov. 12, 2019—(CN) OA—App 2019110701451180—Eng Tran.
Nov. 26, 2019—(JP) Office Action—App 2014-174966—Eng Tran.
Jan. 1, 2020—(KR) OA—App 10-2018-7016314—Eng Tran.
Feb. 10, 2020—(EP) Office Action—App 16865142.0-1017.
Jan. 24, 2020—(CA) Office Action—App 3,005,229.
Mar. 11, 2020—(AU) Full Examination Report—App 2016353326.

\* cited by examiner

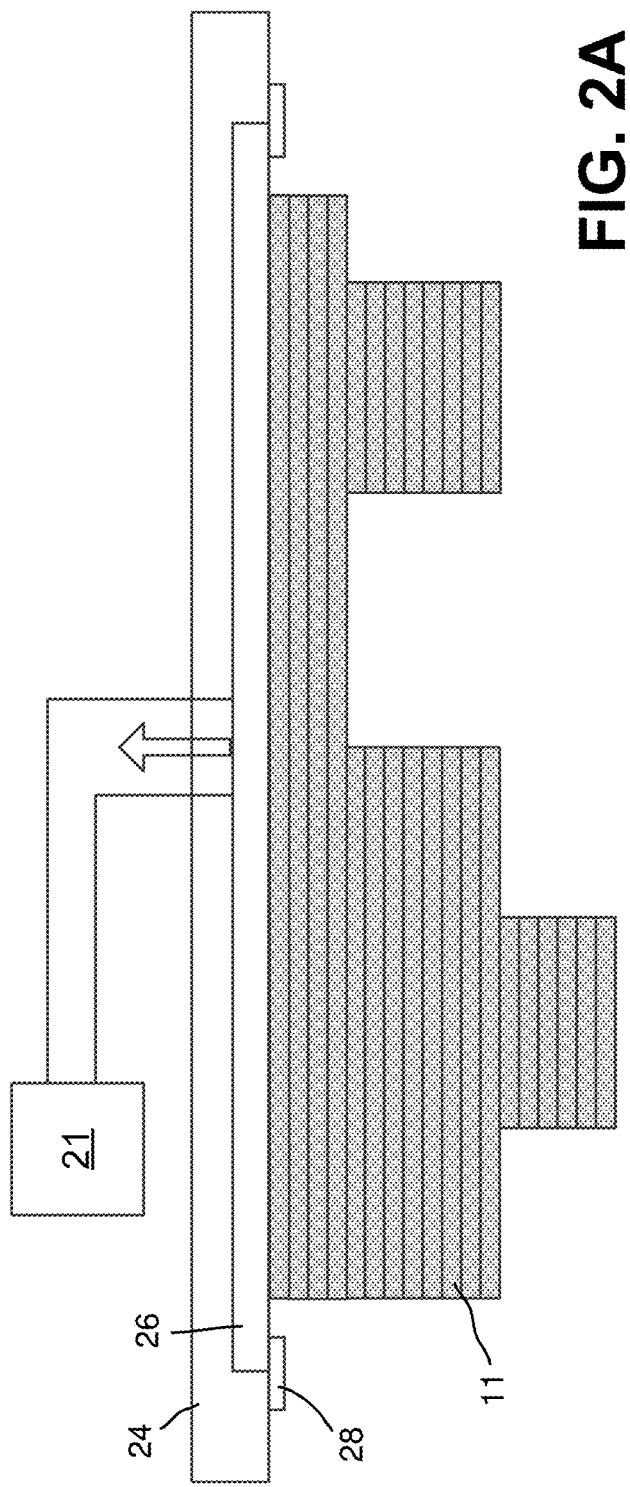

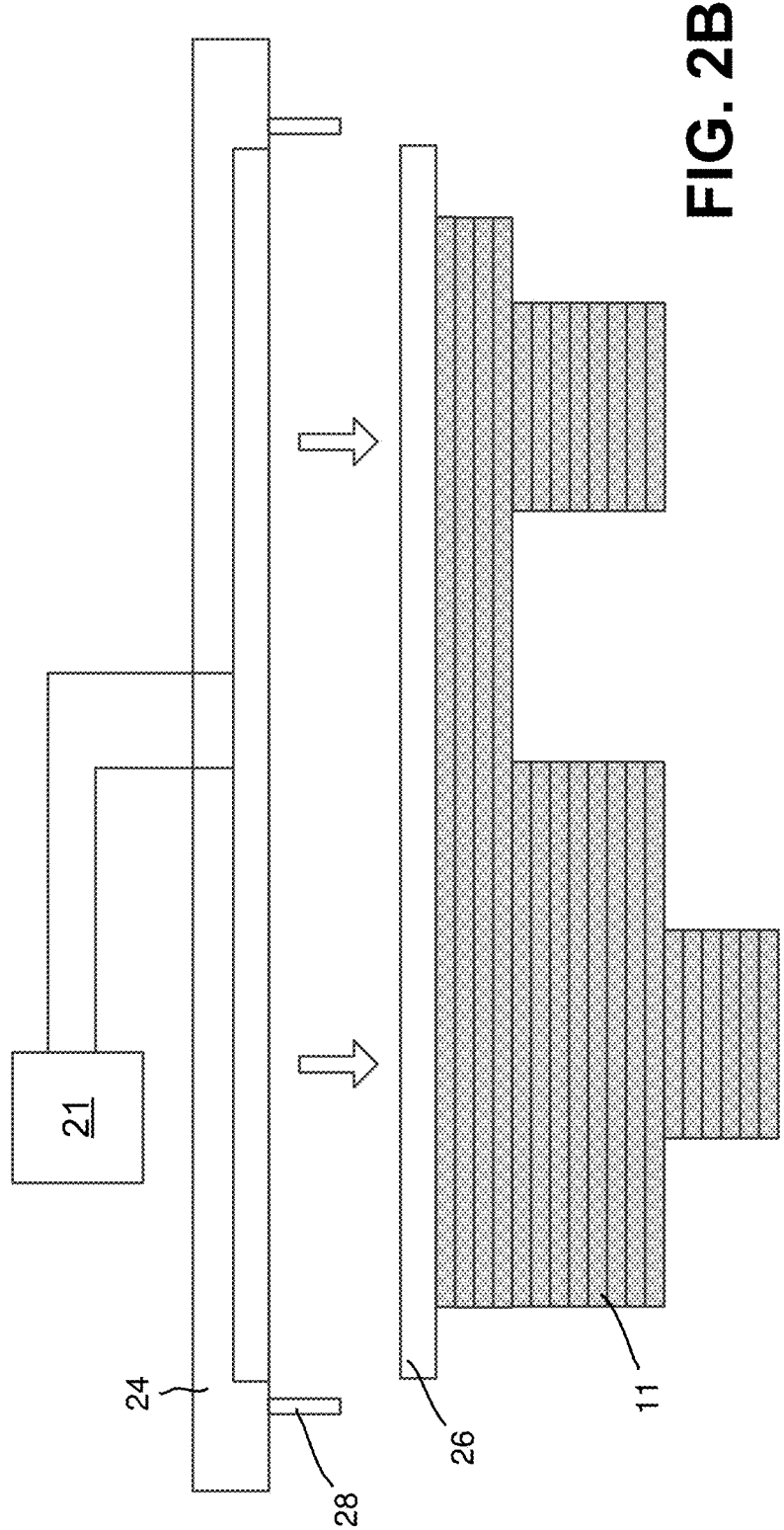

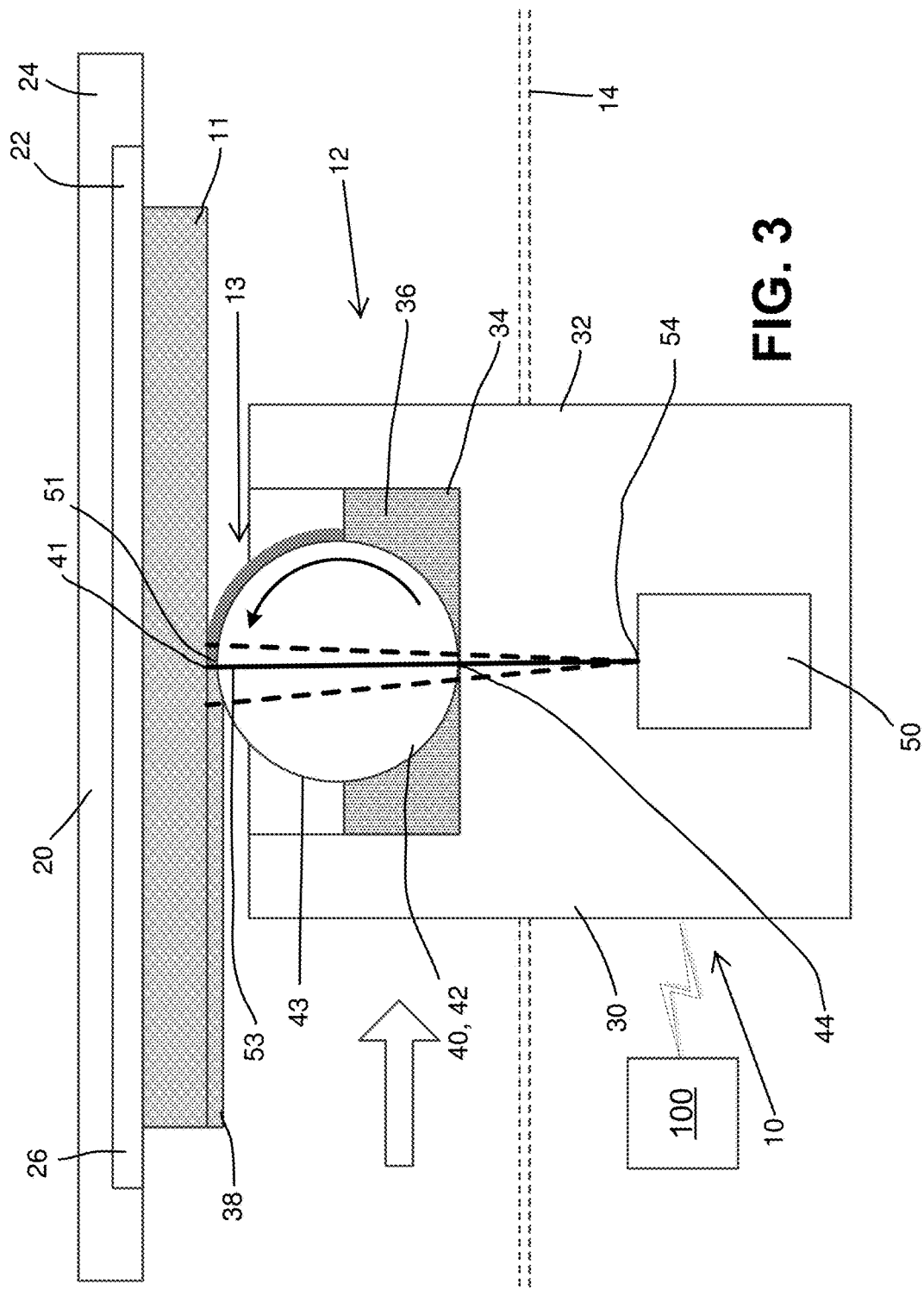

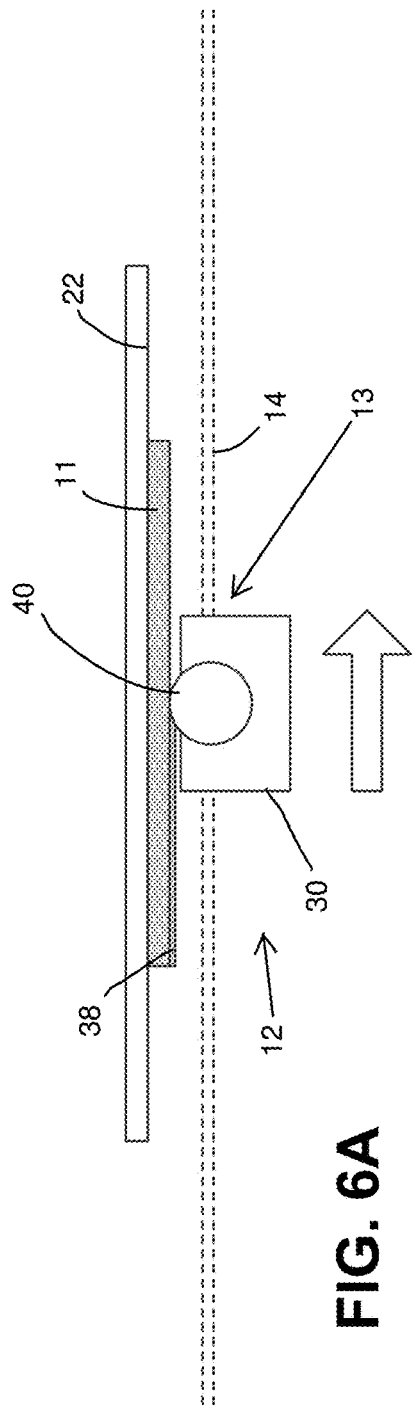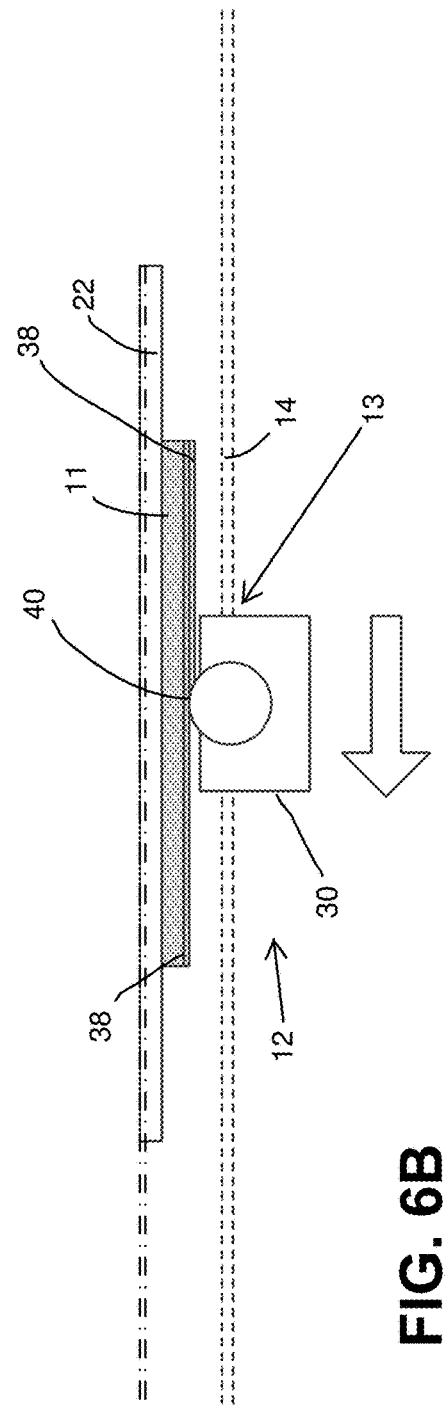

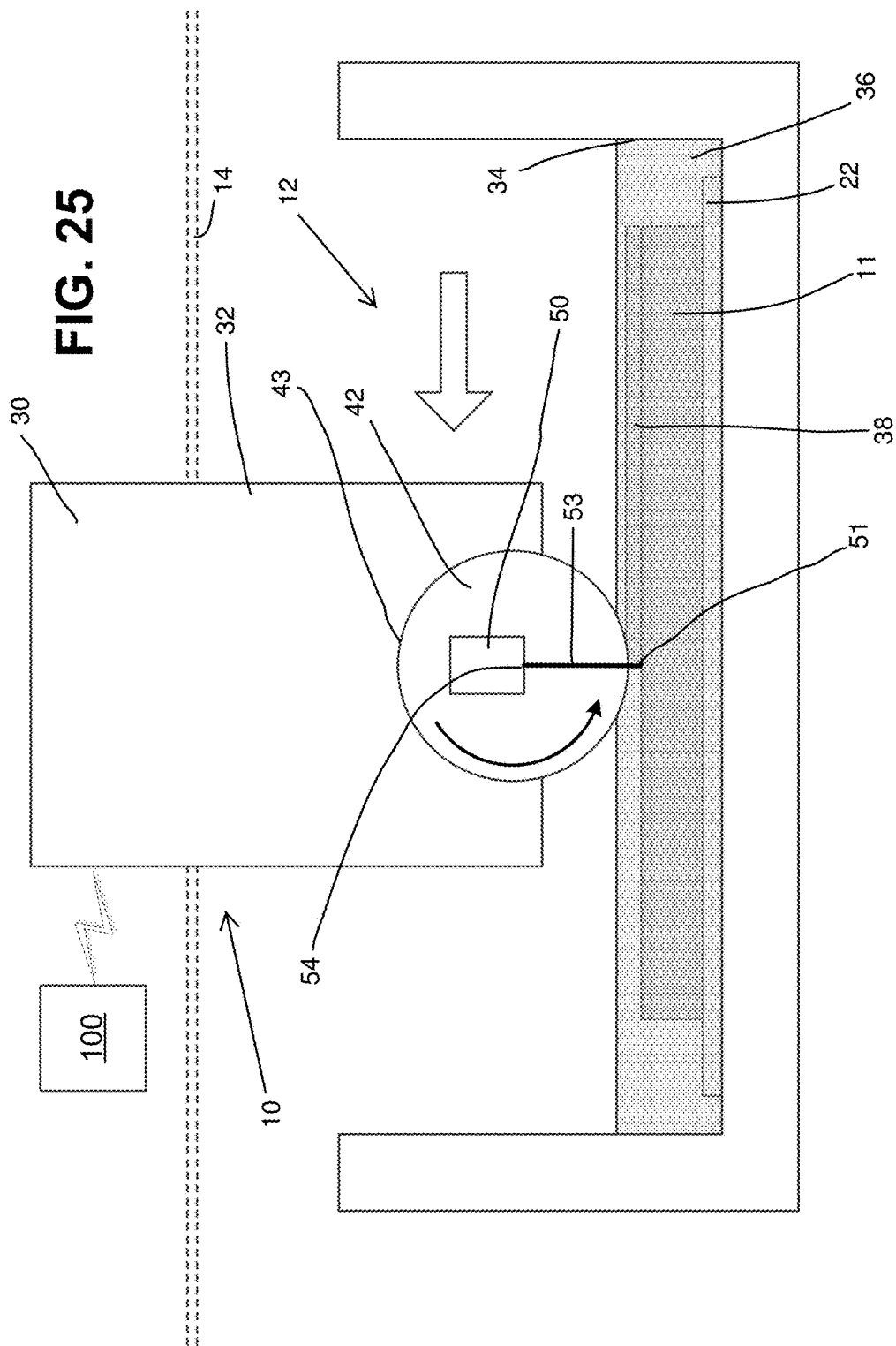

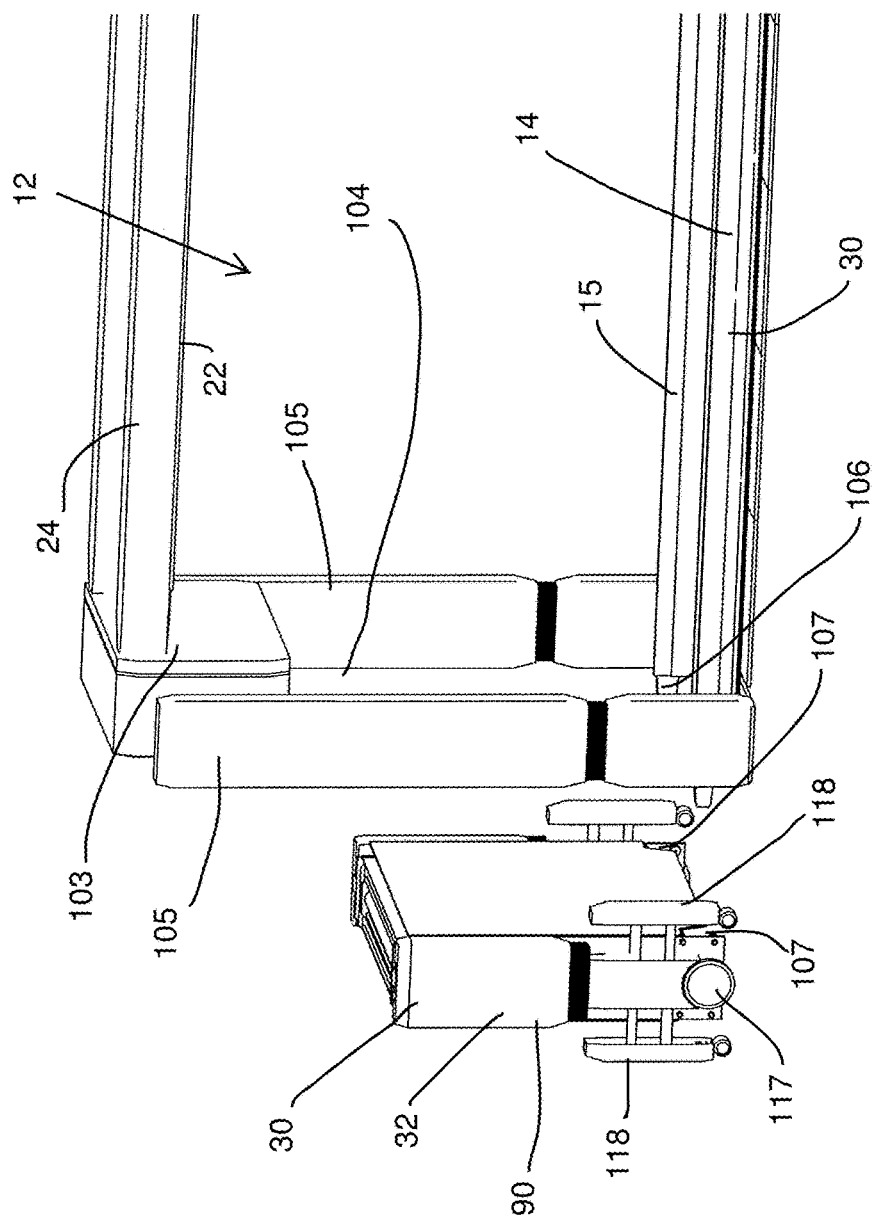

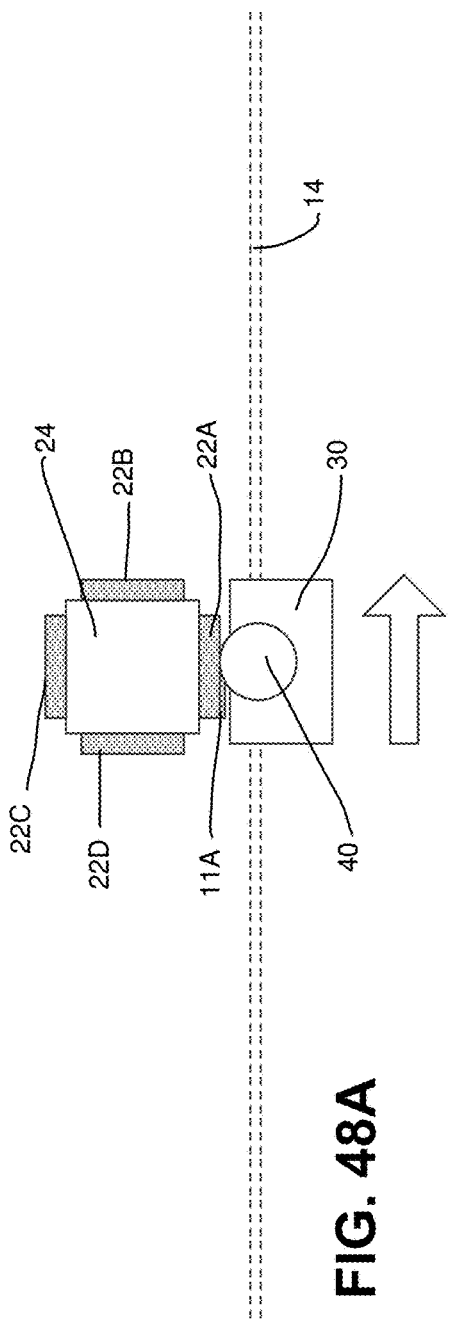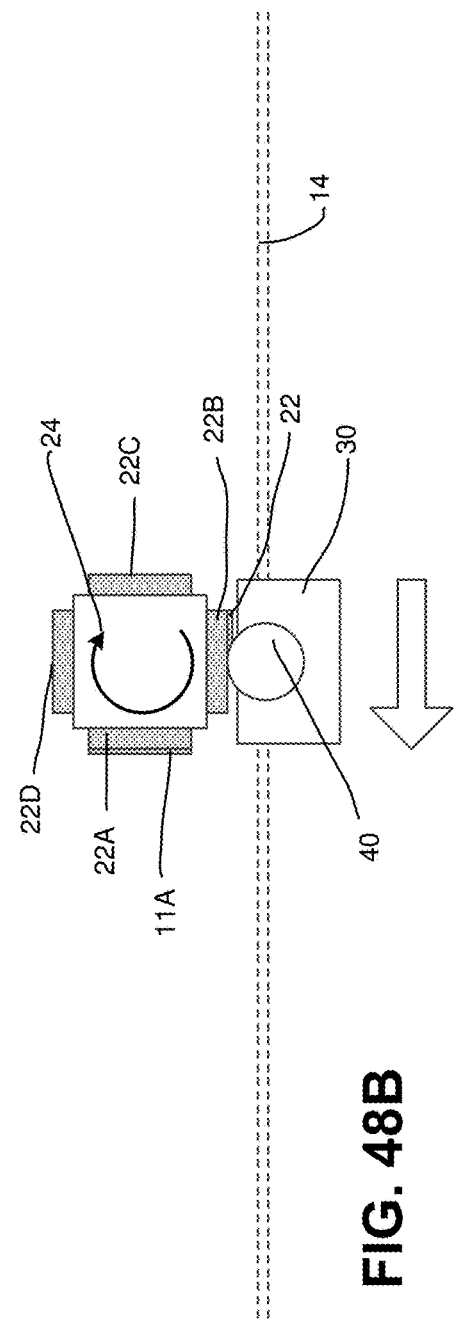

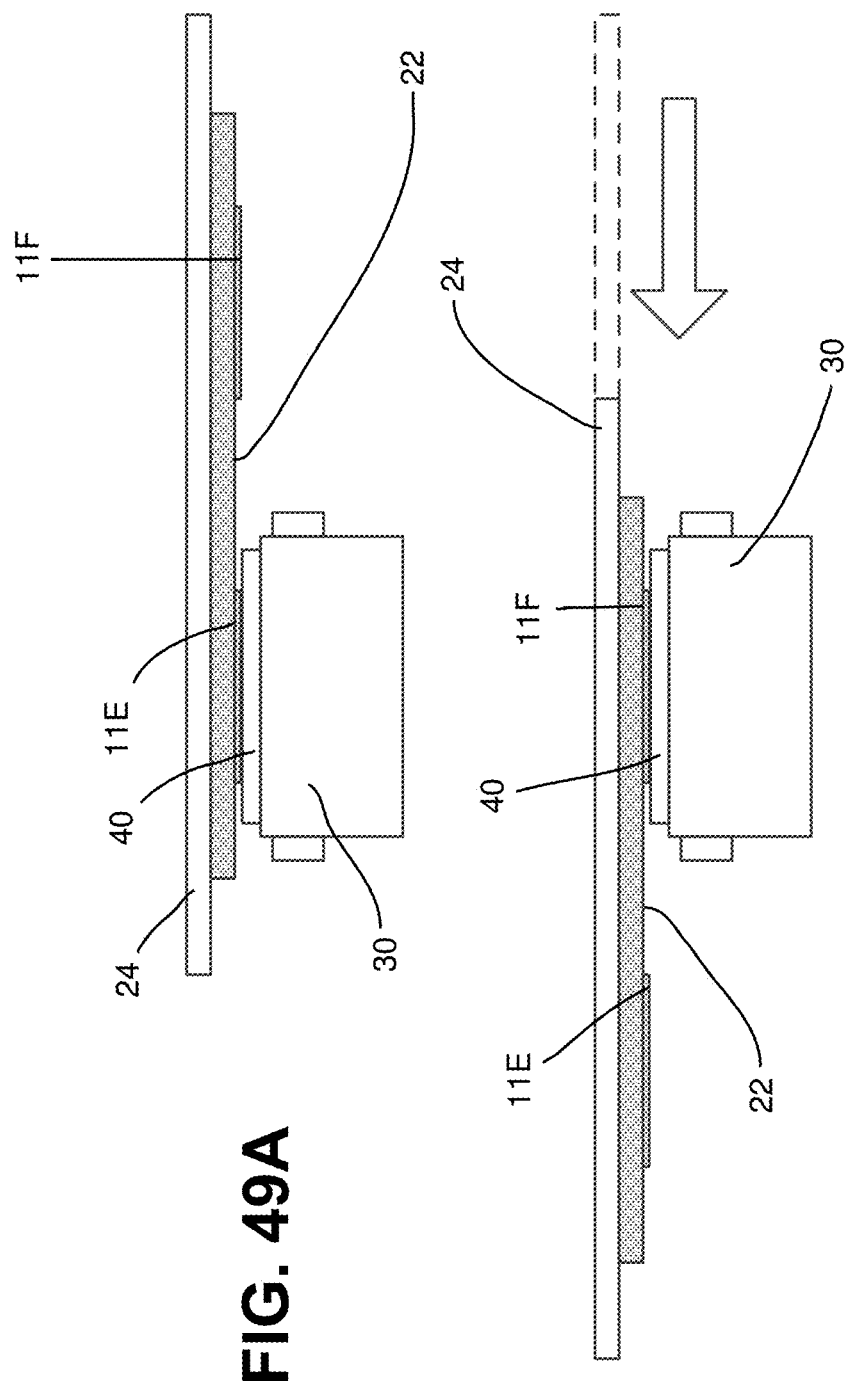

ADDITIVE MANUFACTURING APPARATUS, SYSTEM, AND METHOD

CROSS-REFERENCE TO RELATED APPLICATIONS

This application is a continuation-in-part of U.S. patent application Ser. No. 15/349,748, filed Nov. 11, 2016, and a continuation-in-part of U.S. patent application Ser. No. 15/349,780, filed Nov. 11, 2016, both of which prior applications claim priority to U.S. Provisional Application No. 62/255,175, filed Nov. 13, 2015, all of which applications are incorporated by reference herein in their entireties.

TECHNICAL FIELD

The present disclosure generally relates to an apparatus and system for producing a three-dimensional object in an additive manufacturing technique and method for operating the apparatus and system, and more specifically, to an apparatus, system, and method that uses a roller in contact with a flowable resin or other precursor material in building each layer of the object.

BACKGROUND

Current techniques for additive manufacturing of three-dimensional objects (e.g., stereolithography, 3-D printing, etc.) can produce excellent quality products with high fidelity, but such techniques have significant limitations. Typically, such techniques work in one of three ways: (a) continually polymerizing layers at or near the surface of liquid resin contained in a stationary vat, (b) continually polymerizing layers of resin at or near the bottom of a stationary vat of resin, or (c) continually polymerizing layers of resin that has been jetted downward by one or more single-nozzle or multi-nozzle print heads. Such techniques are generally limited to small sizes, with maximum sizes for various machines being only a few feet in width or length or even smaller. This limits the size of objects that can be produced. Jet-based processes have significant size limitations and waste a great deal of resin material during production.

Vat-based techniques require that the object is partially or fully submerged during manufacturing, thus requiring the vat of resin to be maintained at a significant volume. This can be costly, as such resins are typically very expensive, and maintenance of resin vats in a collection of machines can be extremely costly. The size of the vat also limits the size of the object that can be produced, as noted above. Additionally, submersion of the object during production often results in cavities within the object being filled with uncured liquid resin, which must be drained, often requiring drilling a drainage hole and subsequent repair. Further, the vat generally only contains a single resin, so manufacture of multi-material parts is not possible. Vat-based techniques have production speed limitations as well, due to wait times for new resin to flow over or under the areas to be polymerized.

The present disclosure seeks to overcome certain of these limitations and other drawbacks of existing apparatuses, systems, and methods, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention and the disclosure in a general form as a prelude to the more detailed description provided below.

Aspects of the disclosure relate to an assembly for producing a three-dimensional object, including a support assembly including a build platform defining a build area for producing a three-dimensional object on the build platform, a track extending through the build area, where the track has an open end, and a deposition mechanism engaged with the track. The deposition mechanism includes a carriage configured for movement along the track through the build area, a supply of a flowable resin mounted on the carriage, an applicator in communication with the supply of flowable resin and configured for application of the flowable resin, and an exposure device mounted on the carriage and configured for emitting electromagnetic waves to solidify the flowable resin. The deposition mechanism also includes a track engagement mechanism configured for releasably engaging the track and moving the deposition mechanism along the track for producing the three-dimensional object. Additionally, the deposition mechanism is engageable with and disengageable from the track by passing through the open end of the track, and the deposition mechanism further includes a ground engagement mechanism configured to move the deposition mechanism separately from the track when the deposition mechanism is disengaged from the track.

According to one aspect, the ground engagement mechanism includes wheels configured for movement of the deposition mechanism separately from the track. The ground engagement mechanism may additionally or alternately include extendible stabilizers, where the stabilizers are configured to be movable between an extended position for stabilizing the deposition mechanism when the deposition mechanism is disengaged from the track and a retracted position when the deposition mechanism is engaged with the track.

According to another aspect, the track includes first and second rails on opposite sides of the build platform, where the first and second rails are configured to be engaged by the deposition mechanism and support the deposition mechanism for movement through the build area, and where an opening is defined between the first and second rails at the open end, such that the deposition mechanism can engage with and disengage from the track by passing through the opening. In one configuration, the track engagement mechanism includes rollers configured to engage inner and outer surfaces of the first and second rails and gears configured to drive movement of the deposition mechanism along the first and second rails.

According to a further aspect, the track extends below the build platform and the build area is defined below the build platform.

According to yet another aspect, the deposition mechanism may further include an onboard power source to power operation of the deposition mechanism and/or a processor configured to control movement of the carriage and operation of the applicator and the exposure device in an autonomous manner, according to computer-executable instructions.

According to a still further aspect, the build platform is moveable between a build position and a tending position, where the build platform faces toward the track in the build position to permit production of the three dimensional object by the deposition mechanism located on the track, and where the build platform faces away from the track in the tending position to permit a tending operation to be performed on the three dimensional object. In one configuration, the support assembly further includes a rotating base configured for rotation on an axis and a support platform extending from the rotating base in a direction parallel to the axis, where the build platform is supported by the support platform, and where the build platform is moveable between the build position and the tending position by rotation of the rotating base, which causes the support platform to orbit the axis.

Additional aspects of the disclosure relate to an assembly for producing a three-dimensional object, including a support assembly having a build platform defining a build area for producing a three-dimensional object on the build platform, and a track extending through the build area, wherein the track is configured for supporting a moveable deposition mechanism to pass through the build area for producing the three-dimensional object on the build platform using a flowable resin in a layer-by-layer technique. The track includes a bus bar configured for supplying power to the deposition mechanism when the deposition mechanism is supported by the track. The apparatus may further include the deposition mechanism, where the deposition mechanism includes a carriage configured for movement along the track, an applicator in communication with the supply of flowable resin, where the applicator is mounted on the carriage and configured for applying the flowable resin to an application site within the build area to produce a three-dimensional object on the build platform as the carriage passes through the build area, and where the deposition mechanism has an electrical contact configured for drawing power by contact with the bus bar of the track.

According to one aspect, the deposition mechanism further includes wheels configured for autonomous movement of the deposition mechanism separately from the track and/or a track engagement mechanism configured for releasably engaging the track, such that the deposition mechanism is configured for movement by the wheels separately from the track and the deposition mechanism is further configured for movement by the track engagement mechanism along the track for producing the three-dimensional object.

According to another aspect, the track includes first and second rails on opposite sides of the build platform, where the first and second rails are configured to be engaged by the deposition mechanism and support the deposition mechanism for movement through the build area, and where the bus bar is connected to one of the first and second rails. In one configuration, the track further includes a second bus bar connected to the other of the first and second rails.

According to a further aspect, the track extends below the build platform and the build area is defined below the build platform.

Further aspects of the disclosure relate to an assembly for producing a three-dimensional object, including a support assembly having a build platform defining a build area for producing a three-dimensional object on the build platform and a track extending through the build area. The track is configured for supporting a moveable deposition mechanism to pass through the build area for producing the three-dimensional object on the build platform using a flowable resin in a layer-by-layer technique. The build platform is moveable between a build position and a tending position, where the build platform faces toward the track in the build position to permit production of the three dimensional object by the deposition mechanism located on the track, and where the build platform faces away from the track in the tending position to permit a tending operation to be performed on the three dimensional object.

According to one aspect, the support assembly further includes a rotating base configured for rotation on an axis and a support platform extending from the rotating base in a direction parallel to the axis, where the build platform is supported by the support platform, and where the build platform is moveable between the build position and the tending position by rotation of the rotating base, which causes the support platform to orbit the axis. In one configuration, the rotating base is positioned at a first end of the support platform, and the support assembly further includes a second rotating base at a second end of the support platform opposite the first end. The second rotating base is also configured for rotation on the axis, such that the rotating base and the second rotating base rotate in unison to move the build platform between the build position and the tending position. In an additional configuration, the rotating base is configured to rotate 180° in moving the build platform between the build position and the tending position.

According to another aspect, the build platform is moveable between the build position and the tending position by rotation.

According to a further aspect, the assembly further includes the deposition mechanism, where the deposition mechanism includes a carriage configured for movement along the track, an applicator in communication with the supply of flowable resin, where the applicator is mounted on the carriage and configured for applying the flowable resin to an application site within the build area to produce a three-dimensional object on the build platform as the carriage passes through the build area.

According to yet another aspect, the track extends below the build platform and the build area is defined below the build platform.

According to a still further aspect, the build platform may further be moveable between the build position and a plurality of tending positions, where the build platform faces at different orientations in each of the plurality of tending positions. The movement and/or orientation of the build platform in the tending position(s) may be manually controlled by a user in one configuration.

Still further aspects of the disclosure relate to an assembly for producing a three-dimensional object, including a carriage configured for movement through a build area defined by a build platform, a supply of a flowable resin mounted on the carriage, a roller in communication with the supply of flowable resin, and an exposure device mounted on the carriage and configured for emitting electromagnetic waves through an outlet toward an exposure site within the build area to solidify applied resin applied by the roller to produce the three-dimensional object. The roller is rotatably mounted on the carriage and configured for rotating to carry the flowable resin to an application site within the build area for application to produce the three-dimensional object as the carriage passes through the build area, where the roller and the supply of flowable resin are provided as a resin application module that is removable from the carriage and replaceable with a second resin application module.

According to one aspect, the supply of flowable resin includes a reservoir, and the roller is at least partially disposed within the reservoir to be in communication with the supply of flowable resin. In one configuration, the roller is elongated between first and second ends, and where the first end of the roller is connected to a side wall of the reservoir. In an additional configuration, the roller is permeable to the electromagnetic waves, and the outlet of the exposure device is positioned within the roller such that the electromagnetic waves pass through the roller in traveling from the outlet to the applied resin, and the outlet of the exposure device is configured to be removed from within the roller when the resin application module is removed from the carriage. In a further configuration, the outlet of the exposure device is defined by an array of optical fibers having ends located within the roller, and the optical fibers pass through the side wall of the reservoir to enter the roller through the first end.

According to another aspect, the carriage includes a track engagement mechanism configured for releasably engaging a track passing through the build area, such that the carriage is configured for movement by the track engagement mechanism along the track for producing the three-dimensional object.

Still further aspects of the disclosure relate to an assembly or apparatus for producing a three-dimensional object, including a carriage configured for movement through a build area defined by a build platform, a supply of a flowable resin mounted on the carriage, an applicator in communication with the supply of flowable resin, a vertical adjustment mechanism configured for adjusting a vertical position of the applicator relative to the carriage, and an exposure device mounted on the carriage and configured for emitting electromagnetic waves through an outlet toward an exposure site within the build area to solidify applied resin applied by the roller to produce the three-dimensional object. The applicator is mounted on the carriage and configured for applying the flowable resin to an application site within the build area to produce a three-dimensional object on the build platform as the carriage passes through the build area.

According to one aspect, the apparatus is automated, such that the carriage has a processor configured to control movement of the carriage according to computer-executable instructions. In one configuration, the carriage has a memory storing the computer-executable instructions. In an additional configuration, the carriage has a receiver configured for receiving the computer-executable instructions from an external device and a transmitter configured for transmitting information to the external device.

According to another aspect, the vertical adjustment mechanism is further configured for adjusting a vertical position of the supply and the outlet of the exposure device along with the applicator as a single unit.

According to a further aspect, the carriage has wheels configured for moving on a flat surface and a track engagement mechanism configured for engaging a track that extends through the build area and moving the carriage along the track.

According to yet another aspect, the carriage has a track engagement mechanism configured for engaging a track that extends through the build area and moving the carriage along the track, and the track engagement mechanism may further include electrical contacts to permit the apparatus to draw electrical power from the track in a bus arrangement.

Additional aspects of the disclosure relate to an assembly or apparatus for producing a three-dimensional object, including a carriage configured for movement through a build area defined by a build platform, a supply of a flowable resin mounted on the carriage, and an applicator in communication with the supply of flowable resin. The roller is rotatably mounted on the carriage and configured for rotating to carry the flowable resin to an application site within the build area for application to produce a three-dimensional object on the build platform as the carriage passes through the build area. The apparatus further includes an exposure device mounted on the carriage and configured for emitting electromagnetic waves through an outlet toward an exposure site within the build area to solidify applied resin applied by the roller to produce the three-dimensional object, and a processor configured to control movement of the carriage and operation of the applicator and the exposure device in an autonomous manner, according to computer-executable instructions.

According to one aspect, the apparatus further includes a memory storing the computer-executable instructions.

According to another aspect, the computer-executable instructions further include instructions for producing the three-dimensional object in a layer-by-layer configuration.

According to a further aspect, the apparatus includes a receiver configured for receiving the computer-executable instructions from an external device and a transmitter configured for transmitting information to the external device.

According to yet another aspect, the carriage has wheels for moving on a flat surface and a track engagement mechanism configured for engaging a track that extends through the build area and moving the carriage along the track.

According to a still further aspect, the carriage has a track engagement mechanism configured for engaging a track that extends through the build area and moving the carriage along the track, and the track engagement mechanism further includes electrical contacts to permit the apparatus to draw electrical power from the track in a bus arrangement.

According to an additional aspect, the apparatus includes a vertical adjustment mechanism configured for adjusting a vertical position of the applicator relative to the carriage.

Additional aspects of the disclosure relate to an assembly or apparatus for producing a three-dimensional object, including a carriage configured for movement through a build area defined by a build platform, a supply of a flowable resin mounted on the carriage, and an applicator in communication with the supply of flowable resin, where the applicator is mounted on the carriage and configured for applying the flowable resin to an application site within the build area to produce a three-dimensional object on the build platform as the carriage passes through the build area. The apparatus also includes an exposure device mounted on the carriage and configured for emitting electromagnetic waves through an array of outlets toward an exposure site within the build area to solidify applied resin applied by the applicator to produce the three-dimensional object, where the array of outlets is arranged in a laterally-extending staggered arrangement, such that each outlet of the array of outlets is laterally overlapped by at least one other outlet.

According to one aspect, the staggered arrangement includes at least two parallel rows of outlets that are laterally offset from each other.

According to another aspect, the applicator includes a roller in communication with the supply of flowable resin, where the roller is rotatably mounted on the carriage and configured for rotating to carry the flowable resin to the application site. In one configuration, the roller is permeable to the electromagnetic waves, and the array of outlets is positioned within the roller such that the electromagnetic waves pass through the roller in traveling from the outlets to the applied resin.

According to a further aspect, the applicator is configured for applying the flowable resin to the application site within the build area when the build area is located above the applicator.

Additional aspects of the disclosure relate to an assembly or apparatus for producing a three-dimensional object, including a carriage configured for movement through a build area defined by a build platform, a supply of a flowable resin mounted on the carriage, and an applicator in communication with the supply of flowable resin, where the applicator is mounted on the carriage and configured for applying the flowable resin to an application site within the build area to produce a three-dimensional object on the build platform as the carriage passes through the build area. The apparatus further includes an exposure device mounted on the carriage and configured for emitting electromagnetic waves through an array of outlets toward an exposure site within the build area to solidify applied resin applied by the applicator to produce the three-dimensional object, where the exposure device is configured for varying the power output of the electromagnetic waves in order to adjust an exposure size of at least one of the outlets.

Additional aspects of the disclosure relate to an assembly or apparatus for producing a three-dimensional object, including a carriage configured for movement through a build area defined by a build platform, a supply of a flowable resin mounted on the carriage, and an applicator in communication with the supply of flowable resin, wherein the applicator is mounted on the carriage and configured for applying the flowable resin to an application site within the build area to produce a three-dimensional object on the build platform as the carriage passes through the build area. The apparatus further includes an exposure device mounted on the carriage and configured for emitting electromagnetic waves through a first outlet and a second outlet toward an exposure site within the build area to solidify applied resin applied by the applicator to produce the three-dimensional object, where the exposure device is configured for emitting the electromagnetic waves through the first outlet at a first power level and emitting the electromagnetic waves through the second outlet at a second power level that is greater than the first power level.

According to one aspect, the exposure device is configured for emitting the electromagnetic waves alternately through the first outlet or the second outlet.

According to another aspect, the exposure device is configured for emitting the electromagnetic waves through a plurality of first outlets at the first power level and through a plurality of second outlets at the second power level, where the first outlets are arranged in a first row and the second outlets are arranged in a second row parallel to the first row.

Additional aspects of the disclosure relate to an assembly or apparatus for producing a three-dimensional object, including a carriage configured for movement through a build area defined by a build platform, a supply of a flowable resin mounted on the carriage, and an applicator in communication with the supply of flowable resin, where the applicator is mounted on the carriage and configured for applying the flowable resin to an application site within the build area to produce a three-dimensional object on the build platform as the carriage passes through the build area. The apparatus further includes an exposure device mounted on the carriage and configured for emitting electromagnetic waves selectively through a first outlet or a second outlet toward an exposure site within the build area to solidify applied resin applied by the applicator to produce the three-dimensional object, where the exposure device includes a first wave source configured to emit a first type of the electromagnetic waves through the first outlet and a second wave source configured to emit a second type of the electromagnetic waves through the second outlet.

According to one aspect, the exposure device is further configured for emitting electromagnetic waves selectively through the first outlet, the second outlet, or a third outlet toward the exposure site within the build area, and the exposure device includes a third wave source configured to emit a third type of the electromagnetic waves through the third outlet.

According to another aspect, the exposure device further includes a mechanical switching mechanism for selectively directing the first outlet, the second outlet, or the third outlet toward the exposure site within the build area.

Additional aspects of the disclosure relate to an assembly or apparatus for producing a three-dimensional object, including a carriage configured for movement in a travel direction through a build area defined by a build platform, a supply of a flowable resin mounted on the carriage, and an applicator in communication with the supply of flowable resin, where the applicator is mounted on the carriage and configured for applying the flowable resin to an application site within the build area to produce a three-dimensional object on the build platform as the carriage passes through the build area. The apparatus also includes an exposure device mounted on the carriage and configured for emitting electromagnetic waves through an outlet toward an exposure site within the build area to solidify applied resin applied by the applicator to produce the three-dimensional object, where the exposure device includes an aim adjustment mechanism configured for adjusting an aim of the outlet in the travel direction during application of the resin to permit the aim of the outlet to be focused on a defined point within the build area as the applicator passes the defined point.

Other aspects of the disclosure relate to systems that include an assembly apparatus as described above, with a computer controller configured for controlling one or more operations of the assembly or apparatus to produce the object.

Other aspects of the disclosure relate to methods of operating the systems and apparatuses described above to produce a three-dimensional object. For example, aspects of the disclosure relate to a method used in connection with an apparatus provided that includes a support assembly comprising a build platform defining a build area, a track extending through the build area, and a deposition mechanism mounted on the track, the deposition mechanism including a carriage configured for movement along the track through the build area, a supply of a flowable resin mounted on the carriage, an applicator in communication with the supply of flowable resin and configured for application of the flowable resin, and an exposure device mounted on the carriage and configured for emitting electromagnetic waves. The build platform is moveable between a build position and a tending position, where the build platform faces toward the track in the build position, and where the build platform faces away from the track in the tending position. The method also includes moving the deposition mechanism through the build area along the track while the build platform is in the build position, and applying the flowable resin to an application site within the build area, using the applicator, to produce first and second three-dimensional objects simultaneously on the build platform in a layer-by-layer technique as the carriage passes through the build area. The method further includes selectively activating the exposure device to emit the electromagnetic waves toward an exposure site within the build area to solidify applied resin applied by the applicator to produce the first and second three-dimensional objects simultaneously, moving the build platform from the build position to the tending position, removing the first three-dimensional object from the build platform while the build platform is in the tending position, returning the build platform to the build position with the second three-dimensional object still supported by the build platform, and continuing production of the second three-dimensional object by moving the deposition mechanism through the build area along the track while the build platform is in the build position, and applying the flowable resin to an application site within the build area, using the applicator, to produce the second three-dimensional object on the build platform in a layer-by-layer technique as the carriage passes through the build area.

According to one aspect, the support assembly further includes a rotating base configured for rotation on an axis and a support platform extending from the rotating base in a direction parallel to the axis, where the build platform is supported by the support platform, and where moving the build platform between the build position and the tending position is performed by rotating the rotating base, which causes the support platform to orbit the axis. In one configuration, the rotating base is positioned at a first end of the support platform, and the support assembly further includes a second rotating base at a second end of the support platform opposite the first end, where the second rotating base is also configured for rotation on the axis, such that the rotating base and the second rotating base rotate in unison to move the build platform between the build position and the tending position. In an additional configuration, the rotating base rotates 180° in moving the build platform between the build position and the tending position.

According to another aspect, the build platform moves between the build position and the tending position by rotating.

According to a further aspect, the track extends below the build platform and the build area is defined below the build platform, such that the build platform faces downward in the build position and faces upward in the tending position.

According to yet another aspect, the method further includes connecting the first three-dimensional object to the second three-dimensional object while the build platform is in the tending position.

Additional aspects of the disclosure relate to a method that is usable with a provided apparatus that includes a support assembly including a build platform defining a build area for producing a three-dimensional object on the build platform, a track extending through the build area, and a deposition mechanism mounted on the track, the deposition mechanism including a carriage configured for movement along the track through the build area, a supply of a flowable resin mounted on the carriage, an applicator in communication with the supply of flowable resin and configured for application of the flowable resin, and an exposure device mounted on the carriage and configured for emitting electromagnetic waves. The build platform is moveable between a build position and a tending position, where the build platform faces toward the track in the build position, and the build platform faces away from the track in the tending position. The method includes moving the deposition mechanism through the build area along the track while the build platform is in the build position, and applying the flowable resin to an application site within the build area, using the applicator, to produce the three-dimensional object on the build platform in a layer-by-layer technique as the carriage passes through the build area. The method also includes selectively activating the exposure device to emit the electromagnetic waves toward an exposure site within the build area to solidify applied resin applied by the applicator to produce the three-dimensional object. The method further includes moving the build platform from the build position to the tending position, performing a tending operation on the three dimensional object, returning the build platform to the build position with the three-dimensional object still supported by the build platform, and continuing production of the three-dimensional object using the apparatus.

According to one aspect, the support assembly further includes a rotating base configured for rotation on an axis and a support platform extending from the rotating base in a direction parallel to the axis, where the build platform is supported by the support platform, and where moving the build platform between the build position and the tending position is performed by rotating the rotating base, which causes the support platform to orbit the axis. In one configuration, the rotating base is positioned at a first end of the support platform, and the support assembly further includes a second rotating base at a second end of the support platform opposite the first end. The second rotating base is also configured for rotation on the axis, such that the rotating base and the second rotating base rotate in unison to move the build platform between the build position and the tending position. In an additional configuration, the rotating base rotates 180° in moving the build platform between the build position and the tending position.

According to another aspect, the build platform moves between the build position and the tending position by rotating.

According to a further aspect, the track extends below the build platform and the build area is defined below the build platform, such that the build platform faces downward in the build position and faces upward in the tending position.

According to a still further aspect, the tending operation includes connecting a secondary component to the three-dimensional object. In one configuration, the secondary component is connected in a configuration such that the secondary component is not exposed to the electromagnetic waves during the continuing production of the three-dimensional object.

Further aspects of the disclosure relate to a method that is usable with a provided apparatus that includes a support assembly including a build platform defining a build area for producing a three-dimensional object on the build platform, a track extending through the build area, and a deposition mechanism mounted on the track, the deposition mechanism including a carriage configured for movement along the track through the build area, a supply of a flowable resin mounted on the carriage, an applicator in communication with the supply of flowable resin and configured for application of the flowable resin, and an exposure device mounted on the carriage and configured for emitting electromagnetic waves. The method includes moving the deposition mechanisms through the build area sequentially in a first pass along the track while the build platform is in the build position to produce the three-dimensional object on the build platform in a layer-by-layer technique as each carriage passes through the build area. This action involves applying the flowable resin to an application site within the build area, using the applicator of each deposition mechanism, and selectively activating the exposure devices of each deposition mechanism to emit the electromagnetic waves toward an exposure site within the build area to solidify applied resin applied by the applicator to produce the three-dimensional object.

According to one aspect, each deposition mechanism applies a separate layer of the three-dimensional object in the first pass.

According to another aspect, at least two of the deposition mechanisms apply different portions of a same layer of the three-dimensional object in the first pass.

According to a further aspect, the method also includes moving the deposition mechanisms through the build area sequentially in plurality of additional passes along the track while the build platform is in the build position to produce the three-dimensional object on the build platform.

According to yet another aspect, the method also includes moving the deposition mechanisms through the build area sequentially along the track while the build platform is in the build position produces a second three-dimensional object on the build platform in the layer-by-layer technique as each carriage passes through the build area simultaneously with the three-dimensional object.

Further aspects of the disclosure relate to a method that is usable with a provided apparatus that includes a carriage configured for movement through a build area defined by a build platform, a supply of a flowable resin mounted on the carriage, an applicator in communication with the supply of flowable resin, where the applicator is mounted on the carriage and configured for applying the flowable resin, and an exposure device mounted on the carriage and configured for emitting electromagnetic waves through an array of outlets. The method includes moving the carriage through the build area, and applying the flowable resin to an application site within the build area, using the applicator, to produce a three-dimensional object on the build platform in a layer-by-layer technique as the carriage passes through the build area. The method also includes selectively activating the exposure device to emit the electromagnetic waves toward an exposure site within the build area to solidify applied resin applied by the applicator to produce the three-dimensional object simultaneously, where selectively activating the exposure device comprises varying the power output of the electromagnetic waves in order to adjust an exposure size of at least one of the outlets.

Other features and advantages of the invention will be apparent from the following description taken in conjunction with the attached drawings.

BRIEF DESCRIPTION OF THE DRAWINGS

To understand the present invention, it will now be described by way of example, with reference to the accompanying drawings in which:

FIGS. 2A and 2B are side schematic views of a support assembly of the system and apparatus of FIG. 1, with a three-dimensional object produced on the support assembly;

FIG. 3 is a side schematic view of another embodiment of a system and apparatus for producing a three-dimensional object in operation, according to aspects of the disclosure;

FIGS. 6A and 6B are side schematic views of the system and apparatus of FIG. 1 in operation, according to aspects of the present disclosure;

FIG. 25 is a side schematic view of another embodiment of a system and apparatus for producing a three-dimensional object in operation, according to aspects of the disclosure;

FIG. 40 is a partial perspective view of the deposition mechanism of FIG. 31, showing movement of the deposition mechanism separately of the support assembly;

FIGS. 48A and 48B are side schematic views of another embodiment of an apparatus for producing a three-dimensional object in operation, according to aspects of the disclosure;

FIGS. 49A and 49B are rear schematic views of another embodiment of an apparatus for producing a three-dimensional object in operation, according to aspects of the disclosure;

DETAILED DESCRIPTION

Figure 1:
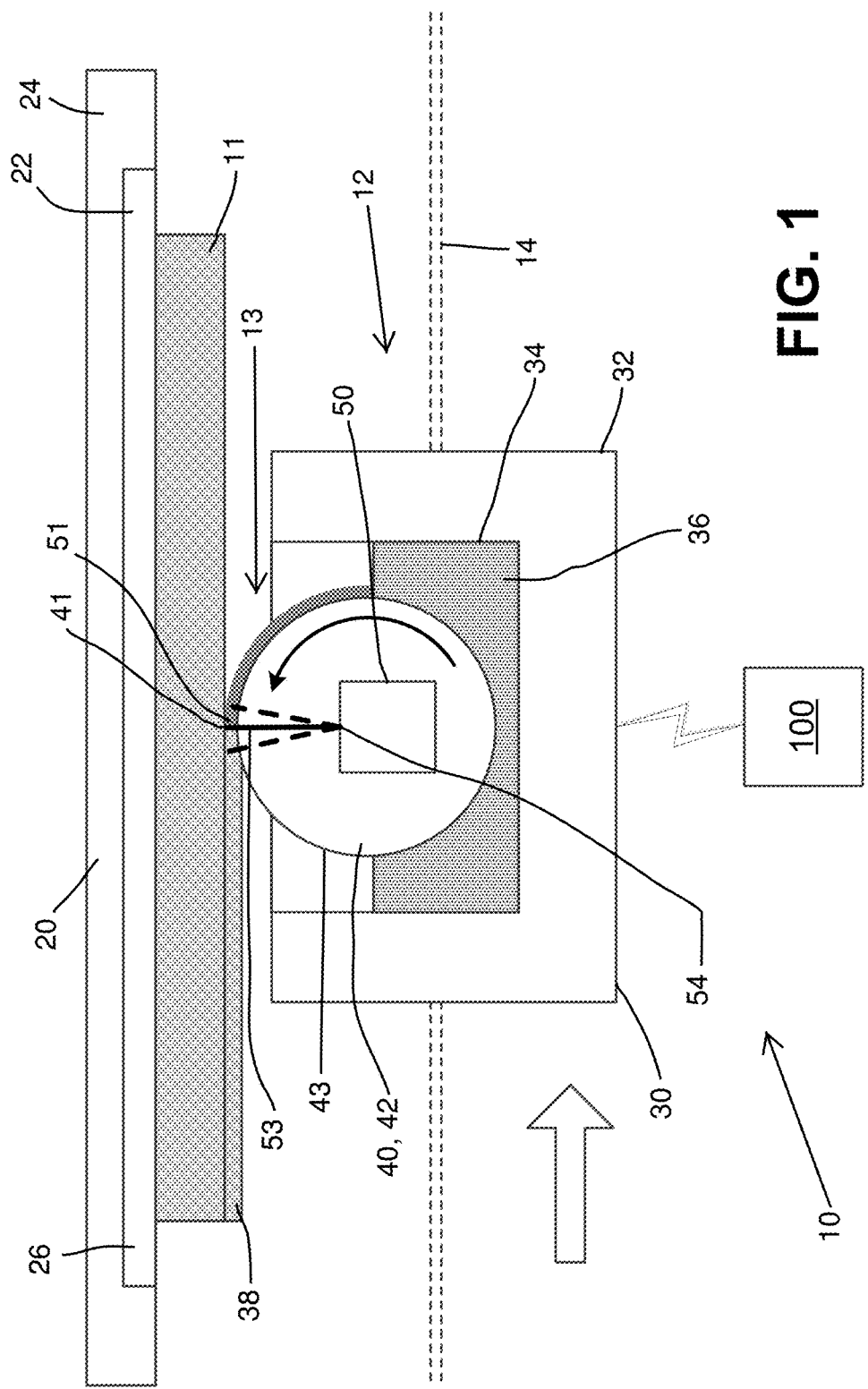
FIG. 1 is a side schematic view of one embodiment of a system and apparatus for producing a three-dimensional object in operation, according to aspects of the disclosure.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

Figure 4:
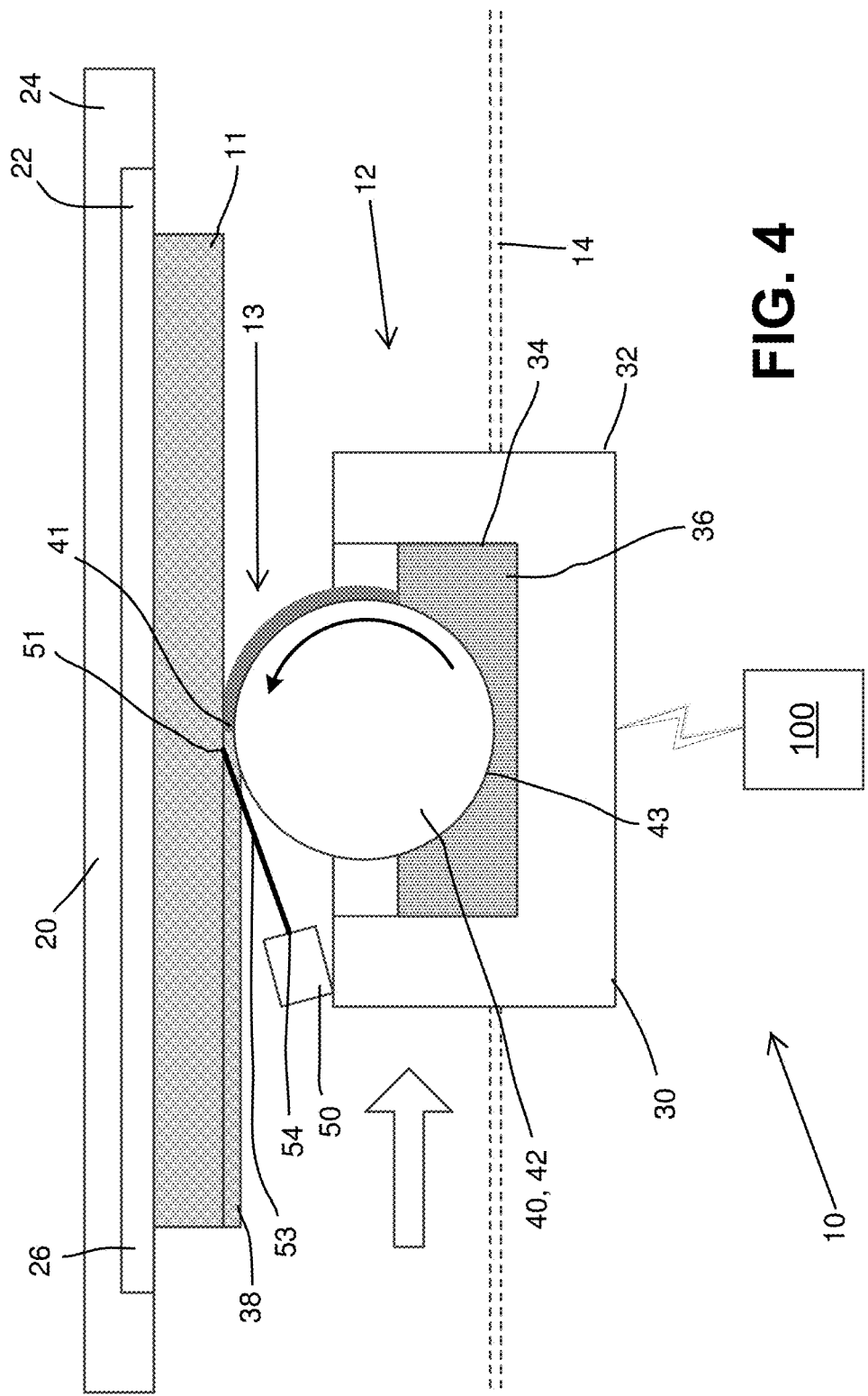
FIG. 4 is a side schematic view of another embodiment of a system and apparatus for producing a three-dimensional object in operation according to aspects of the disclosure.

In general, the disclosure relates to systems, apparatuses, and methods for producing three-dimensional objects in a layer-by-layer technique, such as additive manufacturing, 3-D printing, stereolithography, or other rapid prototyping techniques. Referring first to FIG. 1, there is schematically shown an example embodiment of a system 10 that includes a manufacturing apparatus 12 and a computer controller 100 in communication with one or more components of the apparatus 12 and configured for controlling operation of the apparatus 12 and/or the components thereof to manufacture an object 11. The apparatus 12 includes a support assembly 20 for supporting the object 11 within a build area 13 during manufacturing, a track 14 extending through the build area 13, and a material deposition mechanism 30 mounted on the track 14 and configured for producing the object 11 within the build area 13 through layer-by-layer application of a material. The material applied by the deposition mechanism 30 may be any flowable material (e.g., liquids, powders or other particulate solids, and combinations thereof) that are capable of being solidified to manufacture the object 11, such as by polymerization, phase change, sintering, and other techniques or combinations of such techniques. In one example, the material may be or include a resin that can be polymerized by exposure to electromagnetic waves such as light (visible, IR, or UV). When using a resin-based material for manufacturing, the deposition mechanism 30 may be referred to as a "resin deposition mechanism". FIGS. 3-4 and 25 illustrate additional schematic embodiments of the system 10 and apparatus 12, and FIGS. 8-13, and 15-19 illustrate structural embodiments of the apparatus 12. FIGS. 2A-B, 5A-7, 14, and 20-29 illustrate schematic embodiments of components and/or methods and configurations for operation of the system 10 and apparatus 12. Consistent reference numbers are used throughout this description to refer to structurally or functionally similar or identical components throughout the drawing figures, and it is understood that features and aspects of some embodiments that have already been described in sufficient detail may not be specifically re-described with respect to each embodiment for the sake of brevity.

Production of objects 11 through additive manufacturing often involves the production of support structure, which is formed during manufacturing and supports the object 11 during manufacturing, to be removed later. Such support structure can be formed of the same or a different material from the desired final portions of the object 11. Removal of such support structures can be accomplished using mechanical means (e.g., separation, breakage, machining), solvent-based means (e.g., use of a water-soluble polymer that can be washed away), or other means. Any support structure manufactured along with an object 11 as described herein will be considered to be part of the "object" as defined herein.

The support assembly 20 generally includes at least a build platform 22 that is configured to support the object 11 within the build area 13 during manufacturing. The build area 13 is defined in the area adjacent to the build platform 22, which is immediately below the build platform 22 in the embodiment of FIG. 1. The support assembly 20 in FIG. 1 includes a support platform 24 that is movable in the vertical (z) direction and supports a removable insert 26 that defines the build platform 22. The insert 26 may be removably connected to the support assembly 20 by mechanical connectors, such as clamps 28 as shown in FIGS. 2A and 2B or other mechanical structures, or various other removable connection mechanisms such as vacuum suction, magnetic attraction, releasable adhesive, and combinations of such mechanisms in certain embodiments. In one embodiment, as shown in FIGS. 2A and 2B, the insert 26 is removably connected to the support assembly 20 primarily by application of vacuum suction by a vacuum apparatus 21, with clamps 28 used as a backup or redundant connection structure in case of malfunction, power outage, etc. As shown in FIG. 2A, when the object 11 is to be supported by the support assembly 20, such as during manufacturing, the vacuum apparatus 21 applies suction to the insert 26 and the clamps 28 are closed to retain the insert 26 in connection with the support platform 24. As shown in FIG. 2B, when the object 11 is to be removed, the vacuum suction is ceased and the clamps 28 are released in order to permit removal of the insert 26 and the object 11 from the support assembly 20. The insert 26 may be flexible, in order to ease release of the object 11 from the insert 26 after removal. Further, it is understood that other removable configurations for the build platform 22 may exist, and may or may not use a definable support platform 24. For example, in the embodiments of FIGS. 8-11 and 15-19, the entire support platform 24 is removable to permit removal of the build platform 22 from the support assembly 20. It is also understood that the object 11 may be removed from the build platform 22 without removal of the build platform 22, and that the build platform 22 may include no removable structure in other embodiments.

In one embodiment, the support assembly 20 and the track 14 may be partially or completely modular. The support assembly 20 and track 14 in the embodiment of FIGS. 8-11 are configured in this manner. This permits ease of build-out and modification of the entire apparatus 12 as desired. This also permits assembling or disassembling the apparatus 12 to move it into or out of a room, even if the apparatus 12 is significantly larger than the door to the room, which can be an issue with current stereolithography machines.

Figure 15:
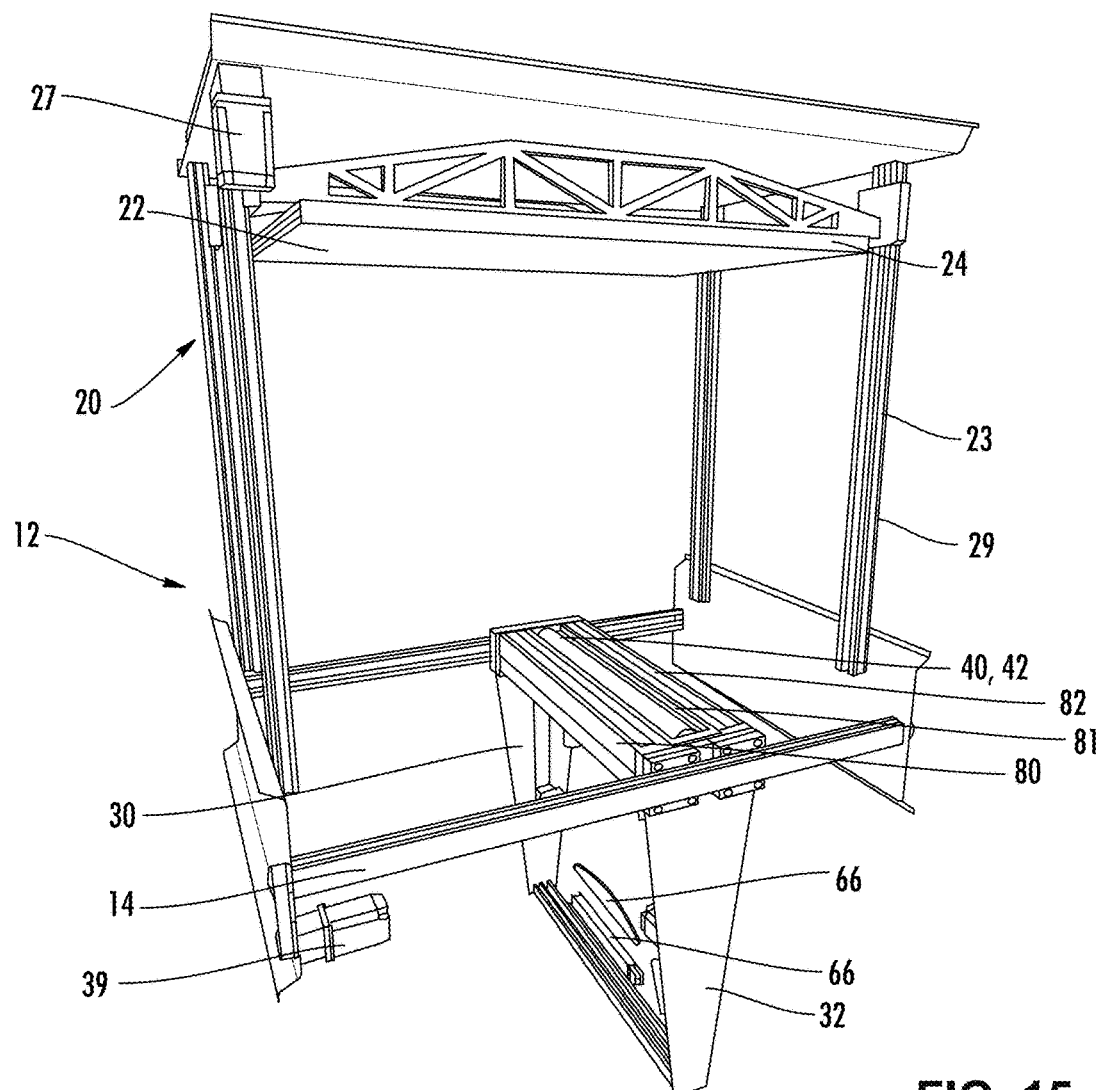
FIG. 15 is a perspective view of another embodiment of an apparatus for producing a three-dimensional object in operation, according to aspects of the disclosure.

The support assemblies 20 in the embodiments of FIGS. 8-11 and 15-19 include vertical positioning mechanisms 23 that are configured to change the height of the build platform 22 during manufacturing, as described elsewhere herein. In the embodiment shown in FIG. 8, the vertical positioning mechanism 23 includes multiple jack screws 25 positioned at opposite sides of the support assembly 20 and a support frame 27 that engages the jack screws 25 and connects to and supports the support platform 24. Vertical movement of the support platform 24 (and thereby, the build platform 22) is accomplished by rotation of the jack screws 25, and it is understood that the threading of the jack screws 25 may be angled to permit fine incremental changes in the vertical position of the build platform 22. The rotation of the jack screws 25 may be driven by a motor assembly (not shown) and controlled by the controller 100. In the embodiment of FIG. 15, the vertical positioning mechanism 23 includes four vertical drive mechanisms 29 located at four corners of the support assembly 20, with a support frame 27 that engages the vertical drive mechanisms 29 and connects to and supports the support platform 24. The vertical drive mechanisms 29 in FIG. 15 may be jack screws as described herein, or may use a different mechanical structure, such as chains, cables, belts, gears, sprockets, wheels, etc. The vertical drive mechanisms 29 may be driven by a motor assembly (not shown) and controlled by the controller 100.

FIG. 1 schematically illustrates an embodiment of the deposition mechanism 30, which generally includes a carriage 32 engaged with the track 14 and configured for movement along the track 14 and through the build area 13, a supply 34 of a flowable material 36 mounted on or otherwise operably connected to the carriage 32, an applicator 40 in communication with the supply 34 of the flowable material 36 and configured to apply the flowable material 36 to an application site 41 within the build area 13, and an exposure device 50 configured for emitting electromagnetic waves to solidify the applied material 36 to form the object 11. The application site 41 is generally defined as the area where the material 36 contacts the deposition surface, i.e., the build platform 22 or the surface of the object 11. Various embodiments of the deposition mechanism 30 are described herein, both schematically and with regard to specific structural embodiments. FIGS. 3 and 4 schematically illustrate embodiments of the deposition mechanism 30 that share many features in common with the embodiment of FIG. 1, and certain aspects of the embodiments of FIGS. 3 and 4 may be described only with respect to their differences from the embodiment of FIG. 1, for the sake of brevity. FIGS. 8-13 and 15-18 illustrate additional embodiments of the manufacturing apparatus 12 and the deposition mechanism 30 that include structures that may be more detailed than the schematic depictions and may have similar or different functionality.

The carriage 32 is configured to move along the track 14 to move the deposition mechanism 30 through the build area 13 during manufacturing. The track 14 is generally configured for guiding the carriage 32 of the deposition mechanism 30 through the build area 13 for creation of the object 11. The apparatus 12 may include a base frame 19 for supporting the track 14 and other components of the apparatus 12, as shown in FIGS. 8-11 and 15-19. The track 14 and the carriage 32 may have complementary engaging structure to permit movement of the carriage 32 along the track 14. For example, in the embodiments shown in FIGS. 8-11 and 15-19, the track 14 includes two parallel beams 15, and the carriage 32 and the track 14 have complementary gear surfaces 33 that allow the carriage 32 to roll along the beams 15 by rotation of the gear surfaces 33 on the carriage 32. The carriage 32 is powered for rotation of the gear surfaces 33 in the embodiments of FIGS. 8-11 and 15-19, and may otherwise be powered for movement in various embodiments, such as by wheels or other gear arrangements, etc. In other embodiments, the power for movement may be supplied by external mechanisms which may or may not be incorporated into the track 14, such as chains, cables, belts, sprockets, pistons, etc. An example of a drive motor 39 is shown in FIG. 15. The speed of the carriage 32 may be adjusted depending on the properties of the material 36, as materials 36 with different viscosities and/or solidification rates may benefit from faster or slower drive speeds. The carriage 32 may be configured to support other components of the deposition mechanism 30, such that the other components move with the carriage 32. For example, in the embodiments of FIGS. 1, 3, and 4, the carriage 32 supports at least the applicator 40, the exposure device 50, and the material supply 34. It is understood that these embodiments are depicted schematically and the carriage 32 may support additional components as well, including the controller 100 and/or other components not pictured. The carriage 32 may be configured for modular connection of components as well, as described elsewhere herein. The controller 100 may be configured to control the operation, speed, elevation, and other aspects of the carriage 32 and the manufacturing process. In one embodiment, numerous parameters may be determined prior to the commencement of the manufacturing process and/or prior to a single pass and executed by the controller 100. Such parameters may be manually determined, automatically determined, or a combination of the same. For example, before a pass is made the layer thickness, the build direction, the build speed, the roller direction and speed, the material-to-roller communication level (determined based on the viscosity of the material 36), and the power output of the exposure device 50 may be determined, and the deposition mechanism 30 may be located to a predetermined starting (registration) position.

In the embodiments of FIGS. 1, 3-4, 8-13, and 15-19, the applicator 40 includes or is in the form of a roller 42 that is in communication or contact with the material supply 34. In these embodiments, the roller 42 is cylindrical and has a cylindrical outer surface 43 in contact with the supply 34. In the embodiments of FIGS. 1 and 3, the roller 42 is hollow or otherwise has an inner chamber, but may alternately be a solid cylinder, e.g., in the embodiments of FIGS. 3-4. The roller 42 rotates so that material 36 is picked up on the outer surface 43 of the roller 42 and is carried to the application site 41 for manufacturing of the object 11. The roller 42 may be powered for rotation by any of various mechanisms, such as gears, sprockets, wheels, belts, etc. In one embodiment, the roller 42 is configured to rotate in conjunction with the movement of the carriage 32, i.e., such that the top of the roller 42 is moving in the opposite direction to and at approximately the same speed as the movement of the carriage 32. This is schematically shown in FIGS. 1 and 3-4 and avoids drag and/or shear on the surface of the object 11 and the applied material 36. In another embodiment, the roller 42 may be configured to rotate at a different speed, i.e., faster or slower than the translational movement speed across the deposition surface. It is contemplated that rotating the roller 42 faster than the translational movement speed can improve curing of the material 36 at the deposition surface, by increasing exposure time of the material 36 at the deposition surface relative to the material 36 on the surface 43 of the roller 42. The roller 42 may further be made from a material that is permeable to the electromagnetic waves that are emitted by the exposure device 50, such that the waves can pass through the roller 42 relatively unchanged. The application site 41 is generally defined between the outer surface 43 of the roller 42 and the deposition surface, i.e., the build platform 22 or the surface of the object 11. The spacing between the outer surface 43 of the roller 42 and the deposition surface may define the thickness of the material 36 that is deposited, and the ultimate thickness of the solidified material layer 38. It is understood that the material of the roller 42 may be customized to the specific wavelength of the electromagnetic waves to ensure sufficient permeability. The applicator 40 may have a different configuration in another embodiment, and may carry the material 36 to the application site 41 using a different mechanism. The applicator 40 may further have a different orientation relative to the build platform 22, such as shown in FIG. 25.

The use of the roller 42 in certain embodiments described herein creates a moving retention area at the apex of the roller 42, and the fixed distance between the apex of the roller 42 and the build surface (i.e., the build platform or the last-deposited layer 38) determines the thickness of the layer being produced. Additionally, because the roller 42 is in communication with the supply 34 of the material 36, any non-solidified material 36 is returned to the supply 34, reducing or eliminating waste.

When the applicator 40 is configured as a roller 42, the surface of the build platform 22 and/or the surface of the roller 42 may be selected or modified for desired adhesion properties. It is beneficial for the surface of the build platform 22 and/or the surface of any applied layer 38 of the object 11 to have greater adhesion to the solidified material 36 than the surface of the roller 42. If this does not occur, material may adhere to the roller 42 and solidify there, causing flaws in the manufactured object 11. In one embodiment, the roller 42 may be made from a low-adhesion material or treated with a coating to reduce adhesion. Likewise, the surface of the build platform 22 may be made from a high-adhesion material or treated with a coating to increase adhesion. In one embodiment, the roller 42 has a lower adhesion property with respect to the solidified material 36 than the adhesion property of the bonding surface for the material 36 (i.e., the build platform 22 or the last-deposited layer 38). The adhesive properties of the flowable material 36 may be different for different materials.

In the embodiments of FIGS. 1, 3-4, 8-13, and 15-19, the supply 34 is configured as a vat of the flowable material 36 that is in contact with the roller 42, such that rotation of the roller 42 carries the material 36 to the application site 41. In this configuration, the flowable material 36 should have sufficient viscosity that the roller 42 is able to carry a continuous layer of the uncured flowable material 36 to the application site 41. The desired viscosity of the flowable material 36 may depend on the desired build speed or rotation speed of the roller 42, or on the level of the roller 42 relative to the level of the material 36 in the supply 34. A slower rotation speed and/or a lower vat material 36 level may require higher viscosity material 36. It is understood that the power of the exposure device 50 may require a slower or faster speed, as more powerful waves 53 can solidify materials (e.g., polymerizing resins) more quickly. In another embodiment, the supply 34 may be more complex, such as by including injectors or nozzles to force the material 36 onto the roller 42. In the embodiment of FIGS. 15-19, the supply 34 includes fluid connectors 35 that may permit removable connection of a container of additional material 36 for refill or maintenance of the level of the material 36 in the vat. Additionally, the supply 34 of the flowable material 36 may be configured differently if the configuration of the applicator 40 is changed, and the supply 34 may be configured to be compatible with the design of the applicator 40, or vice-versa.

Figure 27:
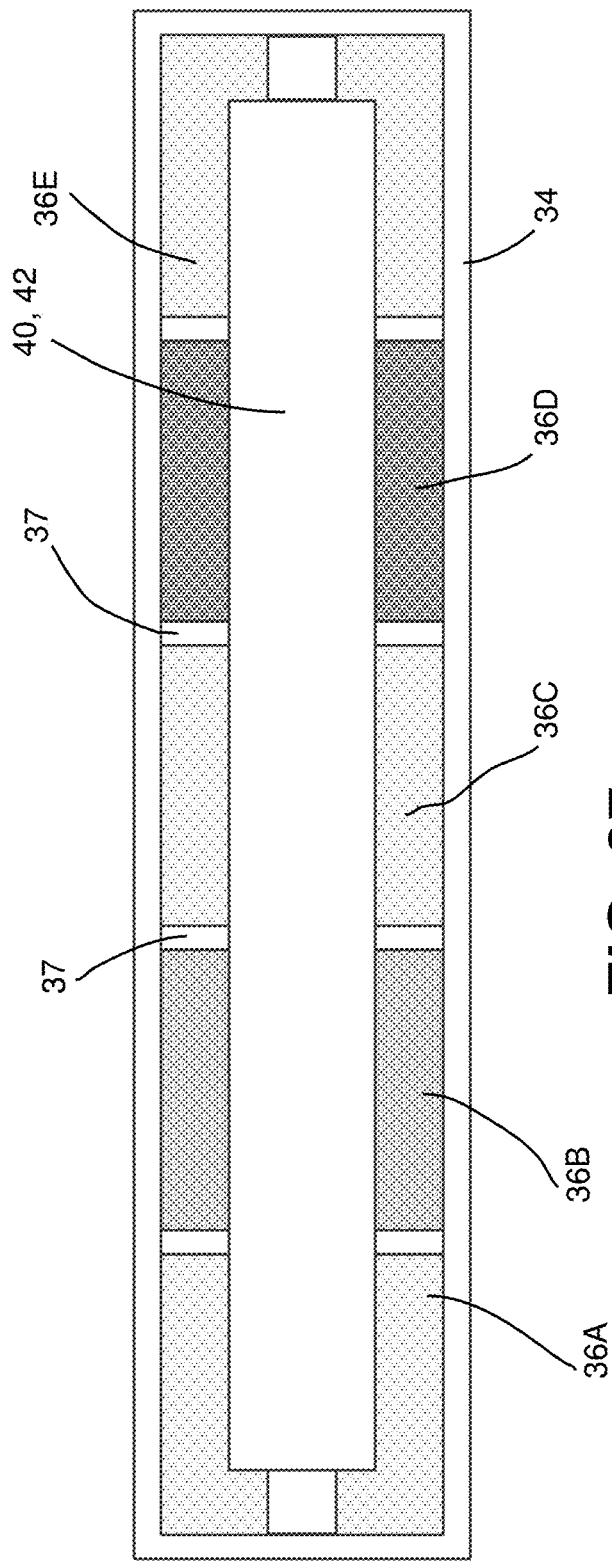
FIG. 27 is a top schematic view of another embodiment of an applicator and a supply of flowable material according to aspects of the disclosure.

In one embodiment, shown in FIG. 27, the supply 34 may be configured to hold multiple flowable materials 36A-E to permit the deposition mechanism 30 to build multiple objects 11 out of different materials 36A-E or a single object 11 out of different materials 36A-E simultaneously. As shown in FIG. 27, the supply 34 may be configured as a vat that has partitions 37 to separate the different materials 36A-E. The partitions 37 may be adjustable to alter the ratios and boundaries of the different materials 36A-E as desired. It is understood that descriptions of using "different materials" as used herein may also enable usage of the same material with different colorings.

The exposure device 50 is generally configured for emitting electromagnetic waves 53 to solidify the applied material 36 to form the object 11. The wavelength and intensity of the electromagnetic waves may be selected based on the material 36 to be solidified and the speed or mechanism of solidification. For example, when a light-curable resin is used as the material 36, the exposure device 50 may be configured to emit light (visible, IR, UV, etc.) that is an appropriate wavelength for curing/polymerizing the resin to form a solid material layer 38. As another example, if a sintering process is used to solidify the flowable material 36, the waves 53 emitted by the exposure device 50 may have sufficient power to sinter the material 36 to form a solid material layer 38. The exposure device 50 may also include various components and structures to direct the emitted waves toward an exposure site 51 within the build area 13, where the material 36 is exposed to the waves at the exposure site 51. The waves may be directed so that the exposure site 51 is located approximately at the application site 41 in one embodiment, or so that the exposure site 51 is offset from the application site 41 (ahead or behind the application site 41 in the direction of travel) in another embodiment. FIGS. 1 and 3 illustrate (with solid lines) the waves 53 being directed to an exposure site 51 approximately at the application site 41, and further illustrate (with broken lines) the waves 53 alternately being directed to an exposure site 51 offset behind or ahead of the application site 41. FIG. 4 illustrates the waves 53 being directed to an exposure site 51 offset behind the application site 41.

Figure 5A:
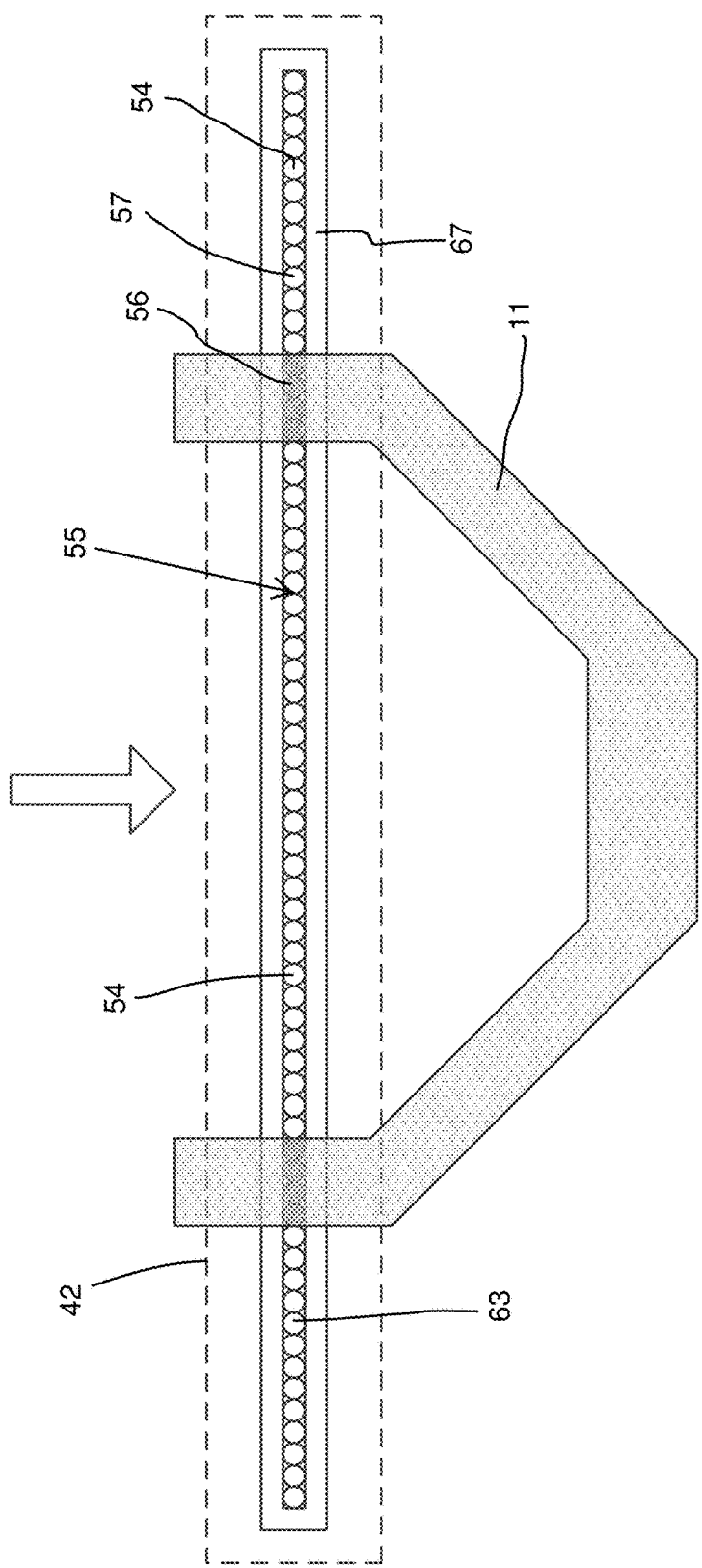
FIGS. 5A and 5B are top schematic views of the system and apparatus of FIG. 1 in operation, according to aspects of the present disclosure.
Figure 5B:
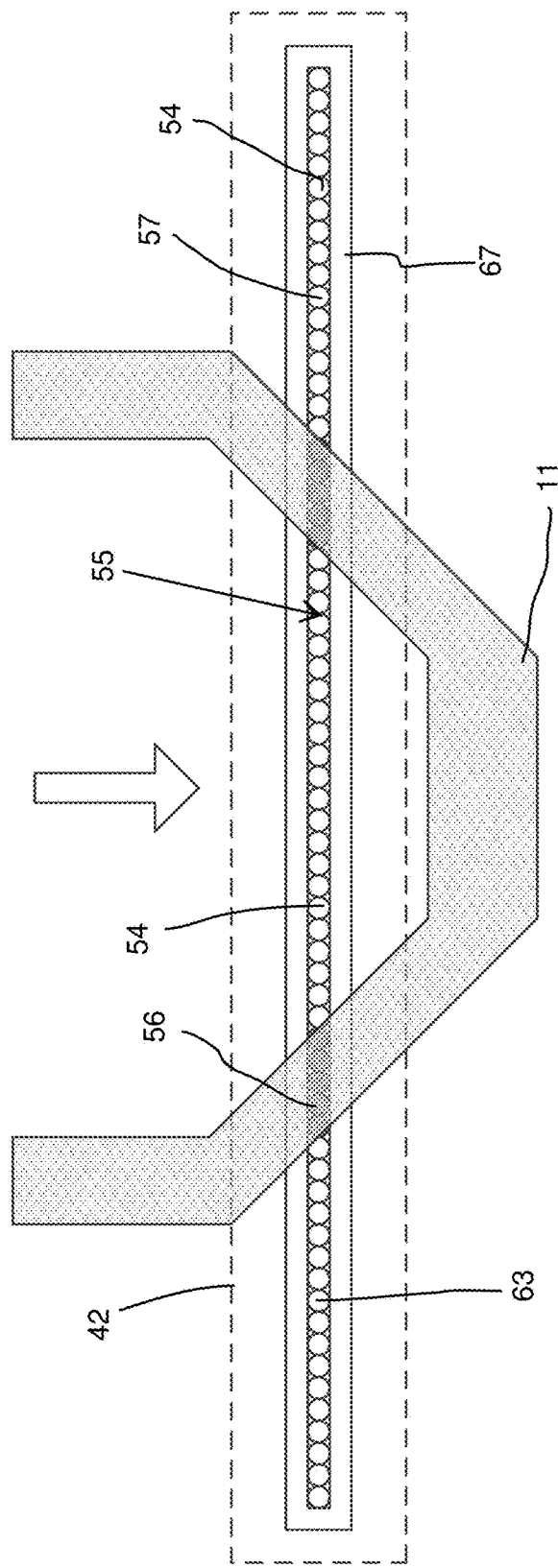

In general, the exposure device 50 is configured such that waves generated by the exposure device exit through outlets 54 and are directed toward specific areas of the exposure site 51 to permit selective solidification of the material 36 at the selected areas of the exposure site 51 as the deposition mechanism 30 passes. In one embodiment, the exposure device 50 is part of an exposure assembly 60 that includes components designed to direct and/or focus the waves 53 toward the exposure site 51. The outlets 54 may be arranged in an array 55, and specific outlets 54 along the array 55 may be selectively activated to selectively solidify portions of the material 36, as shown in FIGS. 5A and 5B. FIGS. 5A and 5B illustrate the active outlets 56 as being darkened, and the inactive outlets 57 as being light. As seen in FIGS. 5A and 5B, the active outlets 56 and inactive outlets 57 are changed when the roller 42 reaches a point where the shape or contour of the object 11 changes. The selective activation and deactivation of the outlets 54 may be controlled by the controller 100, as described herein. The array 55 in FIGS. 5A and 5B is illustrated as a single horizontal row of outlets 54. In other embodiments, the array 55 may be arranged differently, such as in multiple, offset horizontal rows. The use of multiple rows in the array 55 can permit closer lateral spacing between the outlets 54 than the use of a single row. The array 55 in FIG. 14 may similarly be configured and arranged according to any of these embodiments.

Figure 16:
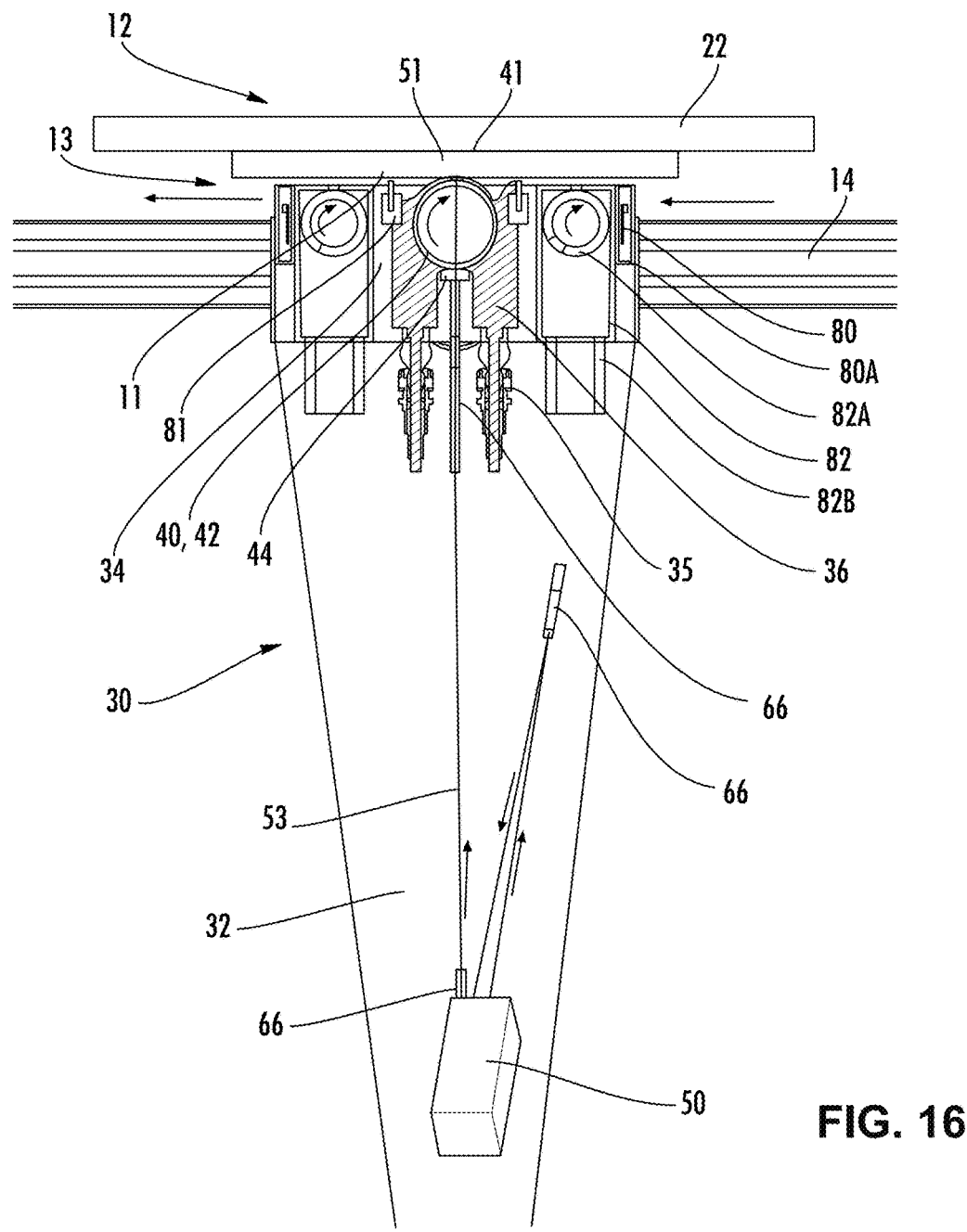
FIG. 16 is a side view of a deposition mechanism of the apparatus of FIG. 15.
Figure 17:
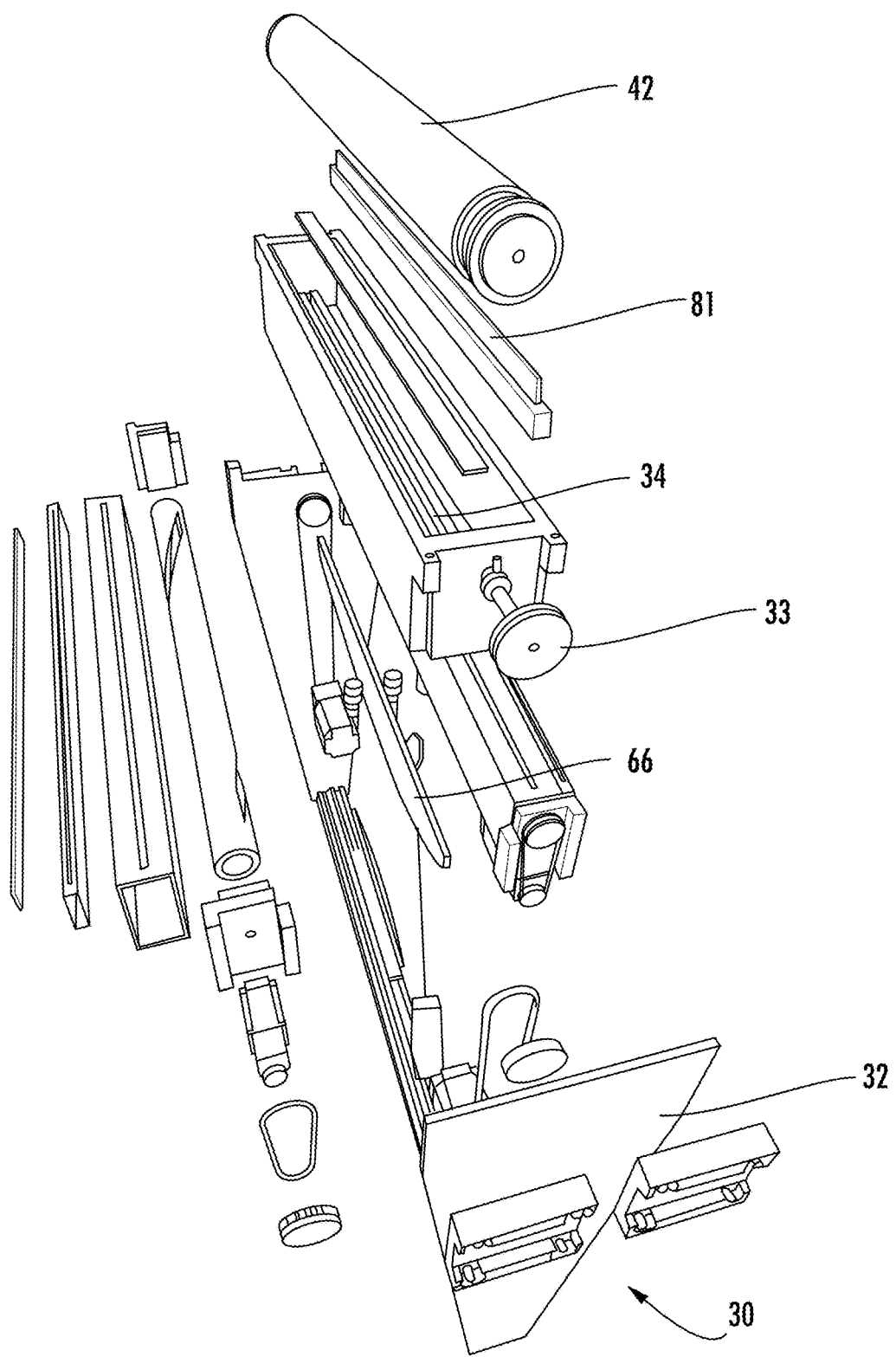
FIG. 17 is an exploded view of the deposition mechanism of FIG. 16.
Figure 18:
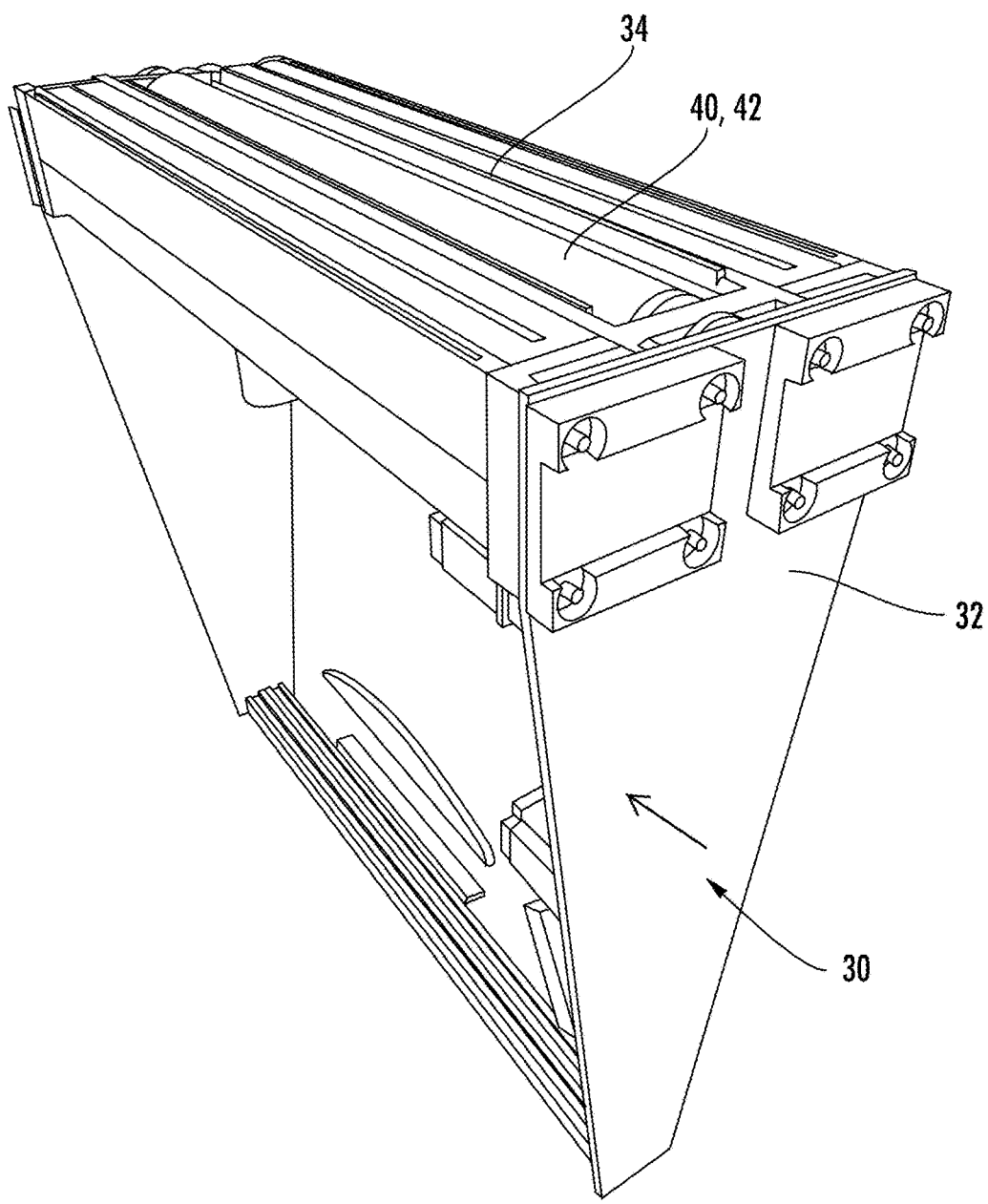
FIG. 18 is a perspective view of the deposition mechanism of FIG. 16.

As described above, the waves 53 may penetrate the roller 42 on their path to the exposure site 51. In the embodiment of FIG. 1, the outlets 54 are located inside the roller 42 and the emitted waves 53 penetrate the surface of the roller 42 once on their paths to the exposure site 51. In the embodiment of FIG. 1, the exposure device 50 itself may be located within the roller 42, or the exposure device 50 may be located outside the roller 42, with the outlets 54 positioned within the roller, as in the embodiment of FIGS. 8-13. In the embodiment of FIG. 3, the outlets 54 are located below the roller 42 and the emitted waves 53 penetrate entirely through the roller 42 in their paths to the exposure site 51. The embodiment of FIGS. 15-18 is similarly configured. In this configuration, the deposition mechanism 30 may include a window 44 configured to permit the waves 53 to pass through the wall of the supply vat 34, as shown in FIGS. 16-17. Additional structures such as squeegees, gaskets, or other sealing structures may be used to resist resin ingress between the roller 42 and the window 44. In the embodiment of FIG. 4, the outlets 54 are positioned and directed to an exposure site 51 located immediately behind the application site 41, and the waves 53 do not need to pass through the roller 42 in this embodiment. It is understood that the waves 53 in the embodiment of FIG. 4 may be directed to pass through a portion of the roller 42 if so desired.

Figure 12:
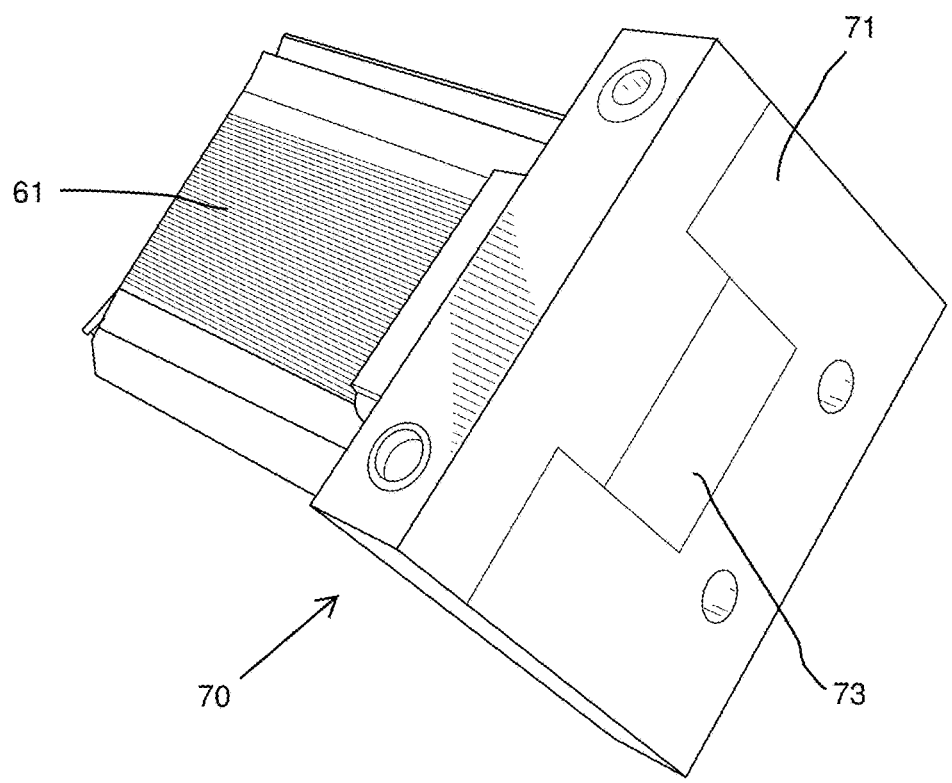
FIG. 12 is a perspective view of one embodiment of a collector for use with the deposition mechanism of FIG. 8, according to aspects of the disclosure.
Figure 13:
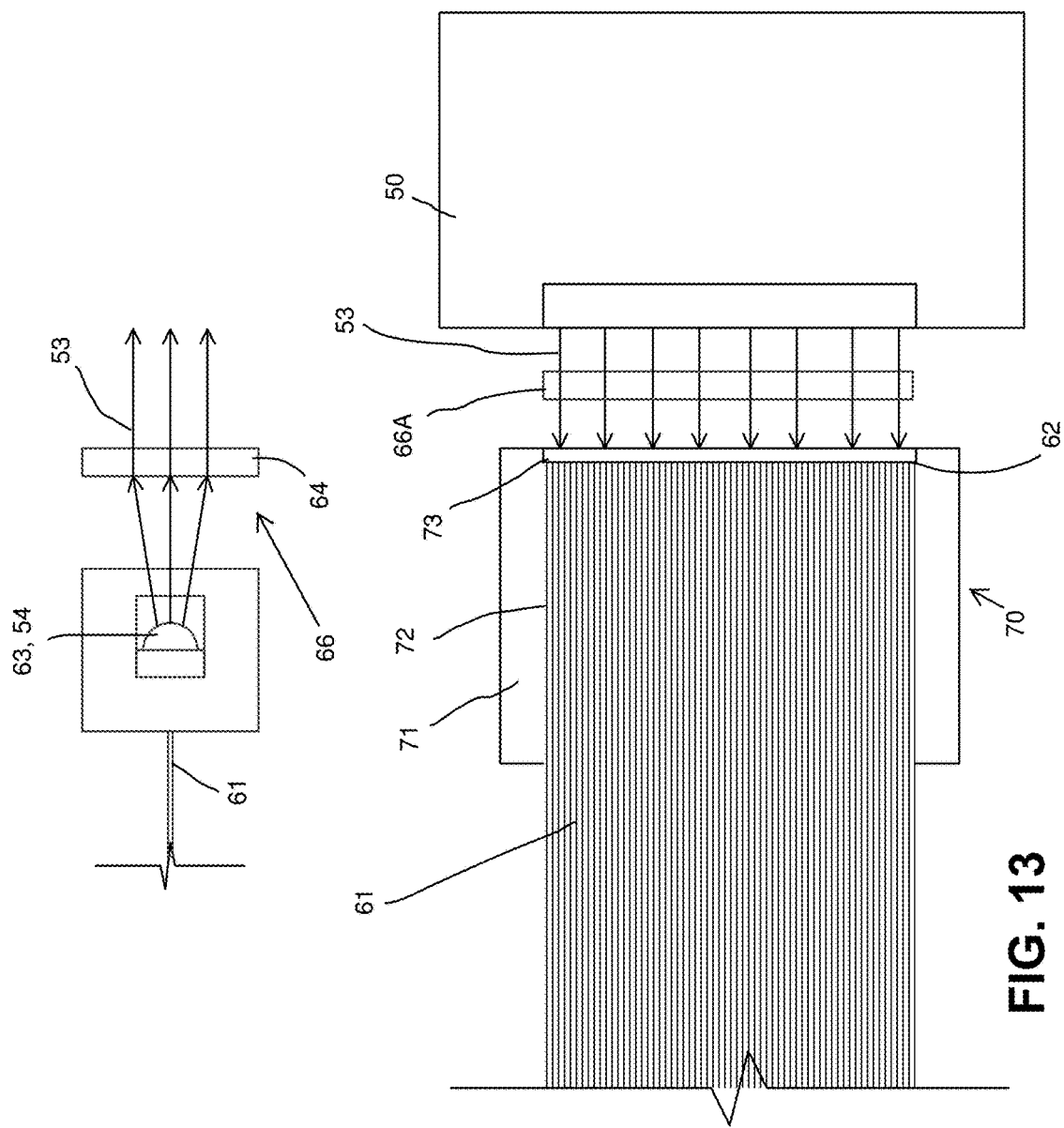
FIG. 13 is a schematic view of the collector of FIG. 12 shown in operation with one embodiment of an exposure device according to aspects of the disclosure.

In one embodiment, the exposure device 50 is a projector, such as a Digital Light Processing (DLP) projector, as the source of the waves 53, and the exposure assembly 60 may also use optical fibers 61 to direct the waves 53 to the exposure site 51, as shown in FIGS. 8-13. In this embodiment, the projector 50 is configured such that the light emitted by the projector 50 enters the entrance ends 62 of the optical fibers 61, travels down the optical fibers 61, and exits through the exit ends 63 of the optical fibers 61, directed at the exposure site 51. The outlets 54 in this embodiment are formed by the exit ends 63 of the optical fibers 61, and may be located inside the roller 42 and arranged as an array 55 inside the roller, as shown in FIGS. 1, 5A-B, and 8-12. In such an embodiment, the optical fibers 61 may extend into the roller 42 from one or both ends of the cylinder, and appropriate sealing and bracing components may be used around the optical fibers 61 in this case. For example, in the embodiment of FIGS. 8-12, the exit ends 63 of the optical fibers 61 may be gathered and held in place by a casing or similar structure 67 (see FIGS. 5A-5B). The exposure assembly 60 may further use a focusing mechanism 66 to focus the light waves 53 after they exit the exit ends 63 of the optical fibers 61, as illustrated in FIG. 13. In one embodiment, the focusing mechanism 66 includes a micro-lens array 64 between the exit ends 63 of the optical fibers 61 and the object 11, such as a Selfoc Lens Array (SLA) micro-lens array, that focuses the waves 53 and avoids diffraction on the path to the exposure site 51. FIGS. 8-12 illustrate a micro-lens array 64 being held in place within the roller 42 by braces 65. In other embodiments, various other lenses, mirrors, and other focusing equipment may be used. It is understood that such a focusing mechanism 66 may be used in other embodiments described herein, such as the embodiments of FIGS. 3, 4, 15-18, and 25. It is also understood that the use of the optical fibers 61 permit the wave source of the exposure device 50 to be positioned remotely from the applicator 40, e.g., elsewhere on the deposition mechanism 30 or even away from the deposition mechanism 30 in some embodiments. In this configuration heat produced by the exposure device is not transmitted to the applicator or the material 36, which can avoid undesired solidification, change of properties of the material 36, or thermal distortion of the applicator 40. This configuration also permits an exposure device 50 to use a much larger and/or more powerful wave source (e.g., high power LED's or a high-power DLP projector) without regard for physical limitations, e.g., fitting inside the roller 42.

The exposure assembly 60 in the embodiment of FIGS. 8-13 uses a collector 70 engaged with the entrance ends 62 of the optical fibers 61 to fix the entrance ends 62 in position with respect to the exposure device 50, such that the waves 53 enter the entrance ends 62 of the optical fibers 61 at the collector 70. One embodiment of the collector 70 is illustrated in FIG. 12 and schematically in FIG. 13. The collector 70 includes a frame 71 that engages the entrance ends 62 of the optical fibers 61 and holds the entrance ends 62 within a chamber or passage 72, with a window 73 (which may be configured as a lens in one embodiment) positioned at the end of the passage 72. Waves 53 exiting the exposure device 50 pass through the window 73 to enter the entrance ends 62 of the optical fibers 61. A lens 66A may be positioned between the exposure device 50 and the window 73 to focus the waves 53 at this stage. The frame 71 is held firmly in place relative to the exposure device 50, so that the entrance ends 62 of the optical fibers 61 do not move relative to the exposure device 50. This fixed relative positioning permits the exposure device 50 to selectively activate and deactivate the outlets 54 by use of pixel mapping. In other words, the entrance end 62 of each optical fiber 61 is mapped to one or more specified pixels of the exposure device 50, such that activating the specified pixel(s) causes waves 53 emitted by the specified pixel(s) to travel down the optical fiber 61, thereby activating the outlet 54 associated with that optical fiber 61. The pixel mapping also incorporates mapping of the specific area of the exposure site 51 toward which the outlet 54 of each optical fiber 61 is directed. In one embodiment, where a DLP projector is used as the exposure device 50, each optical fiber 61 is mapped to a plurality of pixels (potentially hundreds or more) of the DLP projector. In such a configuration, loss or inactivation of multiple pixels can occur without affecting the ability of the optical fiber 61 to maintain sufficient functionality and power for operation. The use of the collector 70 and optical fibers 61 as described herein achieves the conversion of a two-dimensional projection into a roughly one-dimensional (linear) exposure. This mapping may be stored in computer memory and executed by a computer processor, such as by the controller 100.

Figure 14:
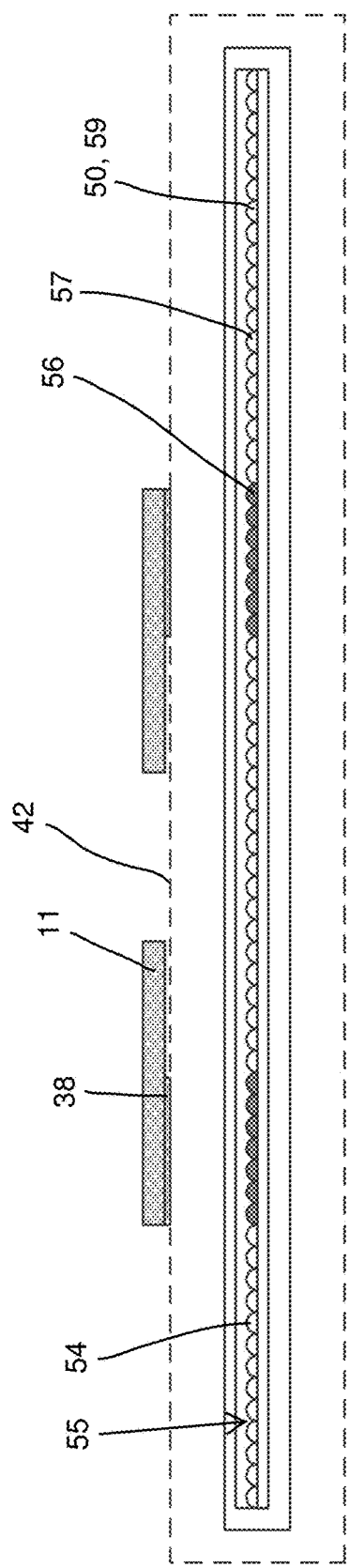
FIG. 14 is a side schematic view of another embodiment of an exposure device according to aspects of the disclosure.
Figure 66:
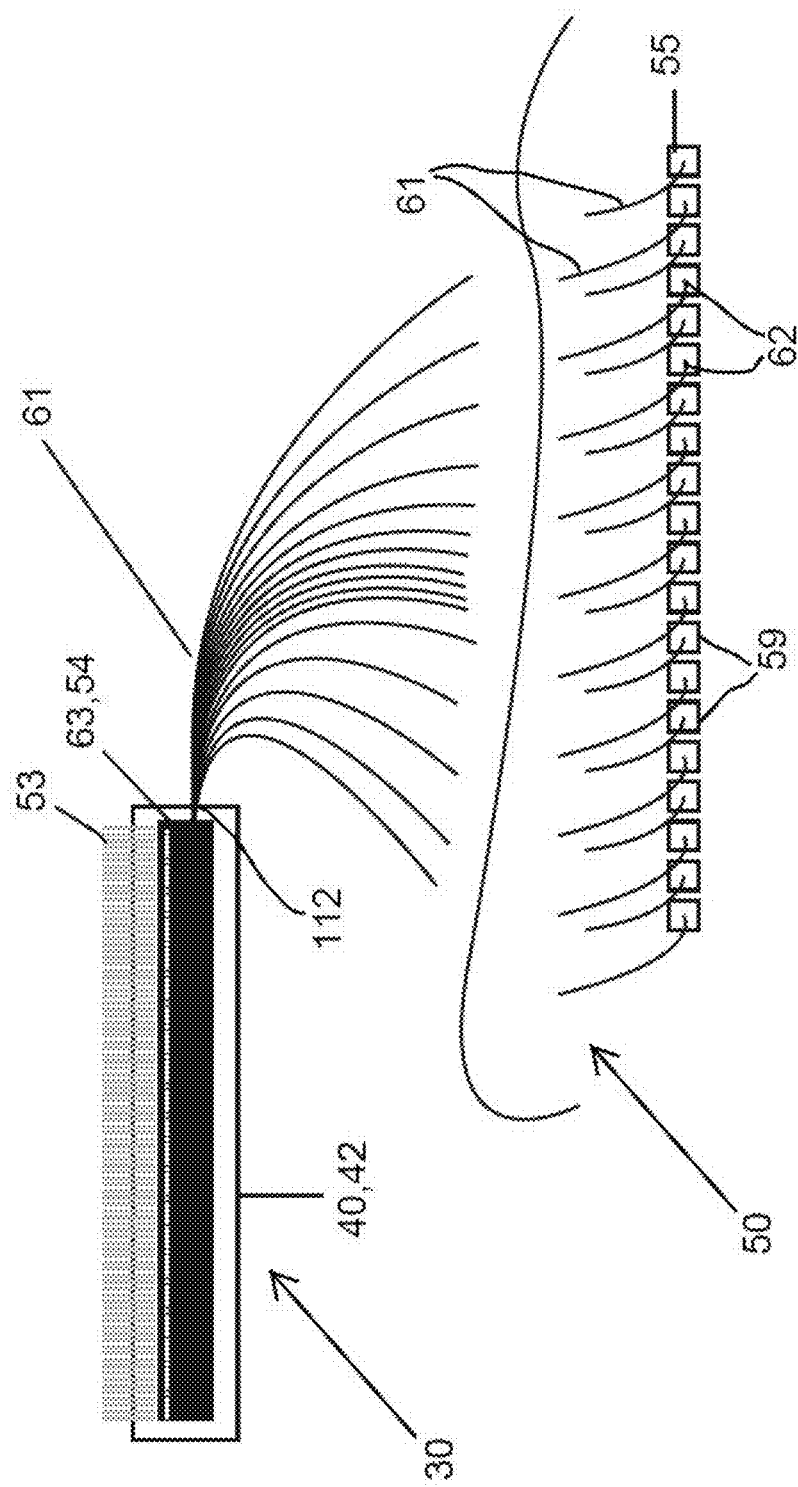
FIG. 66 is a partially-magnified schematic view of another embodiment of an exposure device and a deposition mechanism according to aspects of the disclosure, with the exposure device shown magnified and a break line illustrating separation between the magnified and non-magnified portions.

In another embodiment, the exposure device 50 is in the form of an array 55 of LEDs 59 that function as the sources of the waves 53, as shown in FIG. 14. The LEDs 59 may be designed to emit waves 53 of the proper wavelength and intensity for solidifying the material 36. The array 55 of LEDs 59 can be positioned within the roller 42 as shown in FIG. 14, or outside the roller 42 as described herein, and may use a focusing mechanism 66 as also described herein. In either case, a micro-lens array 64 at the outlets 54 as described above may assist in focusing the waves 53. Each of the LEDs 59 in this embodiment constitutes a separate outlet 54 that is directed at a specific area of the exposure site 51, and the LEDs 59 can be selectively activated and deactivated to expose that specific area of the exposure site 51 to the waves 53. The activated LEDs 59 constitute active outlets 56 and are shown as being darkened in FIG. 14, and the inactive LEDs 59 constitute inactive outlets 57 that are shown as being light. As seen in FIG. 14, the material 36 aligned with the active outlets 56 is being solidified to form a layer 38. The LEDs 59 may be mapped to the specific areas of the exposure site 51 toward which they are directed, and this mapping may be stored in computer memory and executed by a computer processor, such as by the controller 100. If the LEDs 59 are positioned outside the roller 42, a plurality of optical fibers 61 may be used in conjunction with the LEDs 59, forming the outlets 54. FIG. 66 schematically illustrates one embodiment of this configuration, with an array 55 of LEDs 59 positioned separately from the applicator 40, where the optical fibers 61 have their entrance ends 62 fixed in position relative to the LEDs 59 so that waves 53 from the LEDs 59 enter the optical fibers 61 and are emitted at the exit ends 63, forming outlets 56 as described above. The outlets 56 may be configured in the same manner as shown and described herein with respect to the embodiment of FIGS. 1-13 and other embodiments, including the use of a focusing mechanism 66 and mechanisms for adjusting the direction of the waves 53 forward or rearward in the direction of travel of the deposition mechanism 30, which are not shown in FIG. 66. The entrance ends 62 of the optical fibers 61 may be fixed in position relative to the LEDs 59 using various fixing and bundling structures as appropriate for the size and arrangement of the LED array 55, and it is understood that the LED array 55 may not be linearly arranged in some configurations. In one embodiment, no lens or other focusing structure may be necessary between the LEDs 59 and the entrance ends 62 of the optical fibers 61. Each LED 59 may be mapped to an individual optical fiber 61 in the embodiment shown in FIG. 66, although in other embodiments, multiple optical fibers 61 may be mapped to each LED 59. This configuration permits the use of an array of LEDs that is larger than can be incorporated inside the applicator 40. In further embodiments, a different type of exposure device 50 may be used, and the deposition mechanism 60 may include components configured to direct the waves 53 from the exposure device to the proper areas of the exposure site 51. For example, in the embodiment of FIGS. 15-19, the exposure device 50 is in the form of a laser, and a focusing mechanism 66 including lenses and/or mirrors is used to focus the beam. The focusing mechanism 66 in FIGS. 16-17 includes one or more lenses 66A and one or more mirrors 66B. In still further embodiments, the exposure device 50 may be in the form of an LCD source or a high-speed positionable mechanical shutter system.

During operation of the apparatus 12, the spacing between the applicator 40 and the deposition surface must be changed for each new layer 38 of the object 11 that is deposited. The applicator 40 in the embodiments of FIGS. 1, 3-4, 8-11, and 15-19 is oriented so that the roller 42 is positioned vertically below the deposition surface and forms the layer 38 vertically above the roller 42. In this embodiment, relative vertical translation (i.e., parallel to the layer-by-layer build direction) occurs between the applicator 40 and the deposition surface during manufacturing of successive layers 38. This vertical translation is illustrated, e.g., in FIGS. 6A and 6B, which illustrate the deposition mechanism 30 making a first pass (FIG. 6A) from left to right to deposit a first layer 38 and a second pass (FIG. 6B) from right to left to deposit a second layer 38, where the vertical translation between the first and second passes is shown in phantom lines. This relative change in positioning can be accomplished using one or more different methods and mechanisms or combinations thereof. In the embodiments of FIGS. 8-11 and 15-19, this vertical translation can be accomplished by changing the elevation of the build platform 22, using a vertical positioning mechanism 23 as described herein. In another embodiment, this vertical translation can instead be accomplished by changing the elevation of the track 14, which may be accomplished using similar vertical positioning mechanisms 23 as described herein. In a further embodiment, the deposition mechanism 30 may include a mechanism for changing the vertical position of the applicator 40 relative to the build platform 22, such as by raising or lowering the applicator 40 and/or the entire chassis 32. For example, in the embodiment of FIGS. 20A-B, the deposition mechanisms 30 each are capable of vertical translation relative to the track 14 through a limited range of motion by raising or lowering the carriage 32 relative to the track 14. The vertical translation may be accomplished by switching the carriage 32 between pre-set vertical positions, such as by vertically moving the drive structure that engages the track 14 with respect to the roller 42. The primary vertical translation of the build platform 22 relative to the applicator 40 in this embodiment is accomplished by movement of the build platform 22 as described herein, and the vertical positioning range of the deposition mechanism 30 permits multiple deposition mechanisms 30 to make passes through the build area 13 without adjusting the position of the build platform 22, which is more time-consuming. The operation of these embodiments are described in further detail herein.

Figure 7:
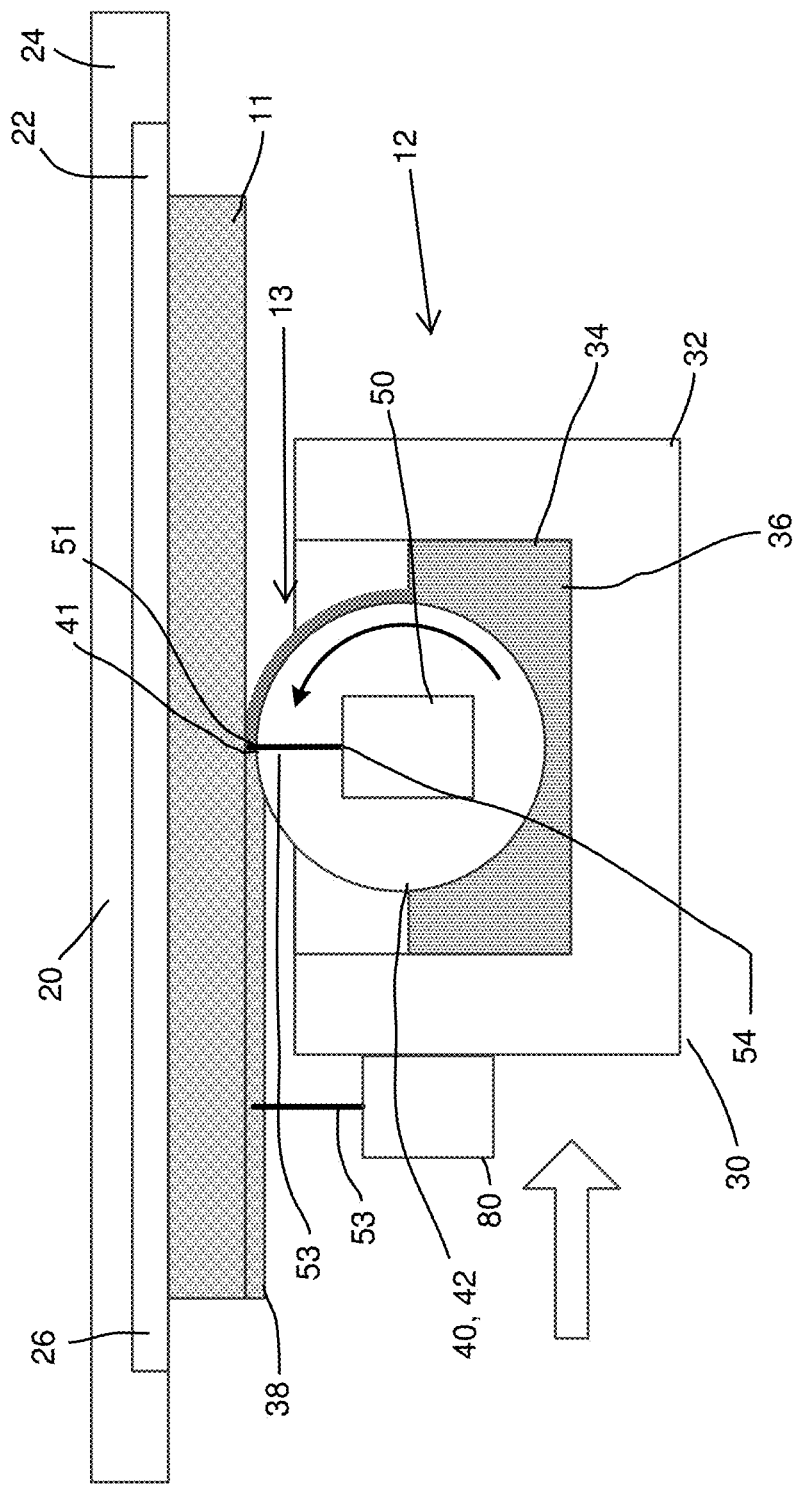
FIG. 7 is a side schematic view of the apparatus of FIG. 1, further including a secondary exposure device.
Figure 8:
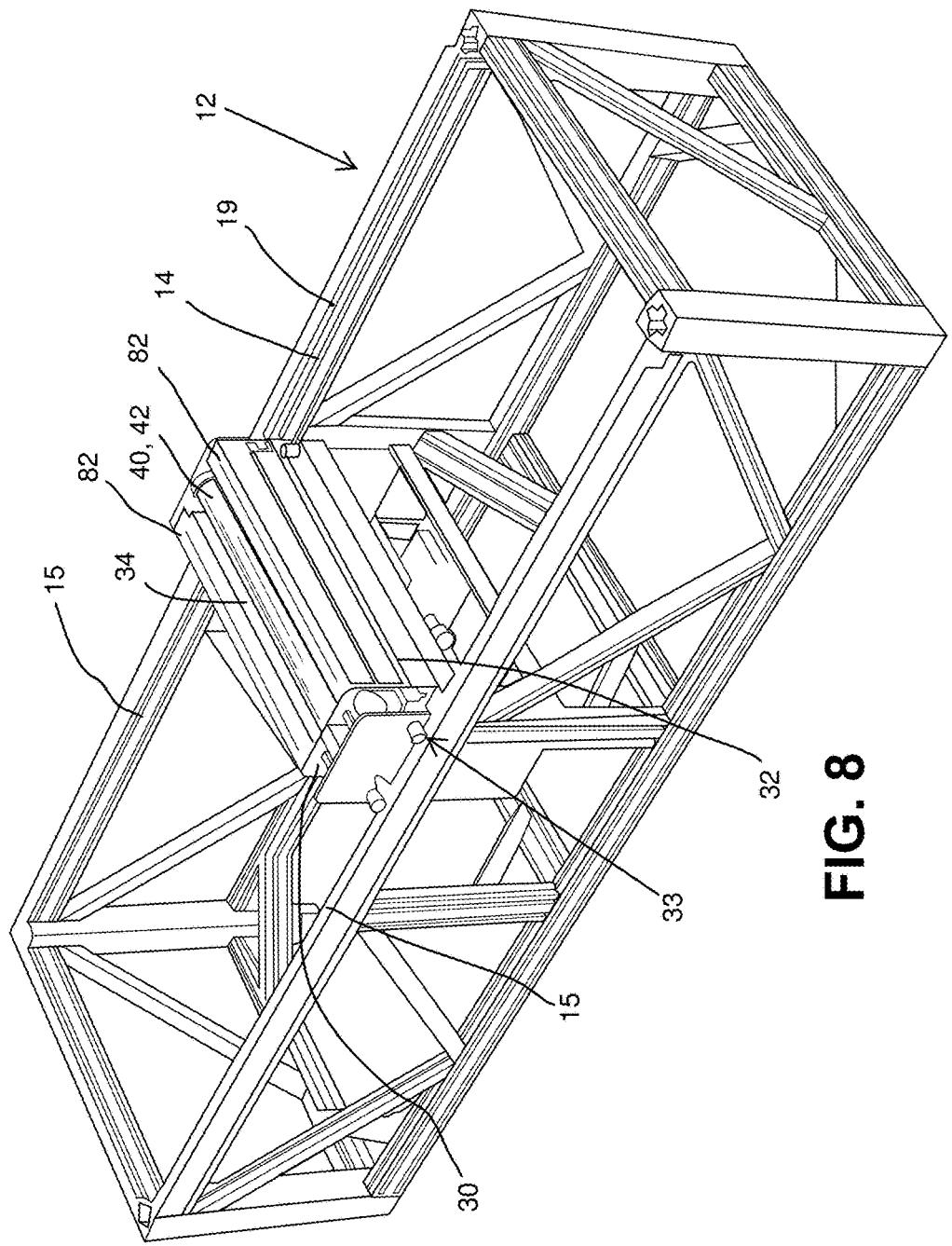
FIG. 8 is a top perspective view of another embodiment of an apparatus for producing a three-dimensional object, according to aspects of the disclosure.
Figure 9:
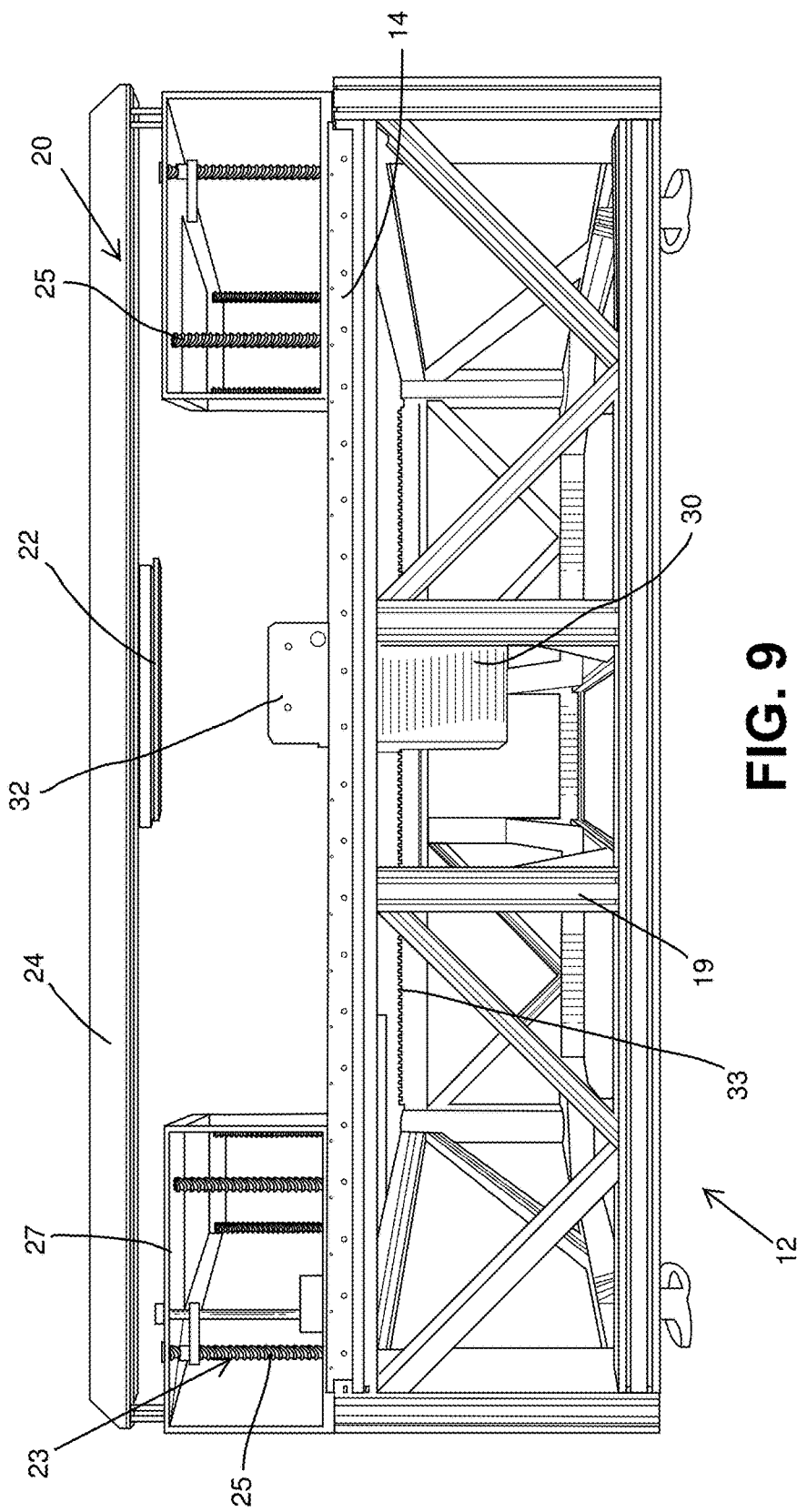
FIG. 9 is a side view of the apparatus as shown in FIG. 8.
Figure 10:
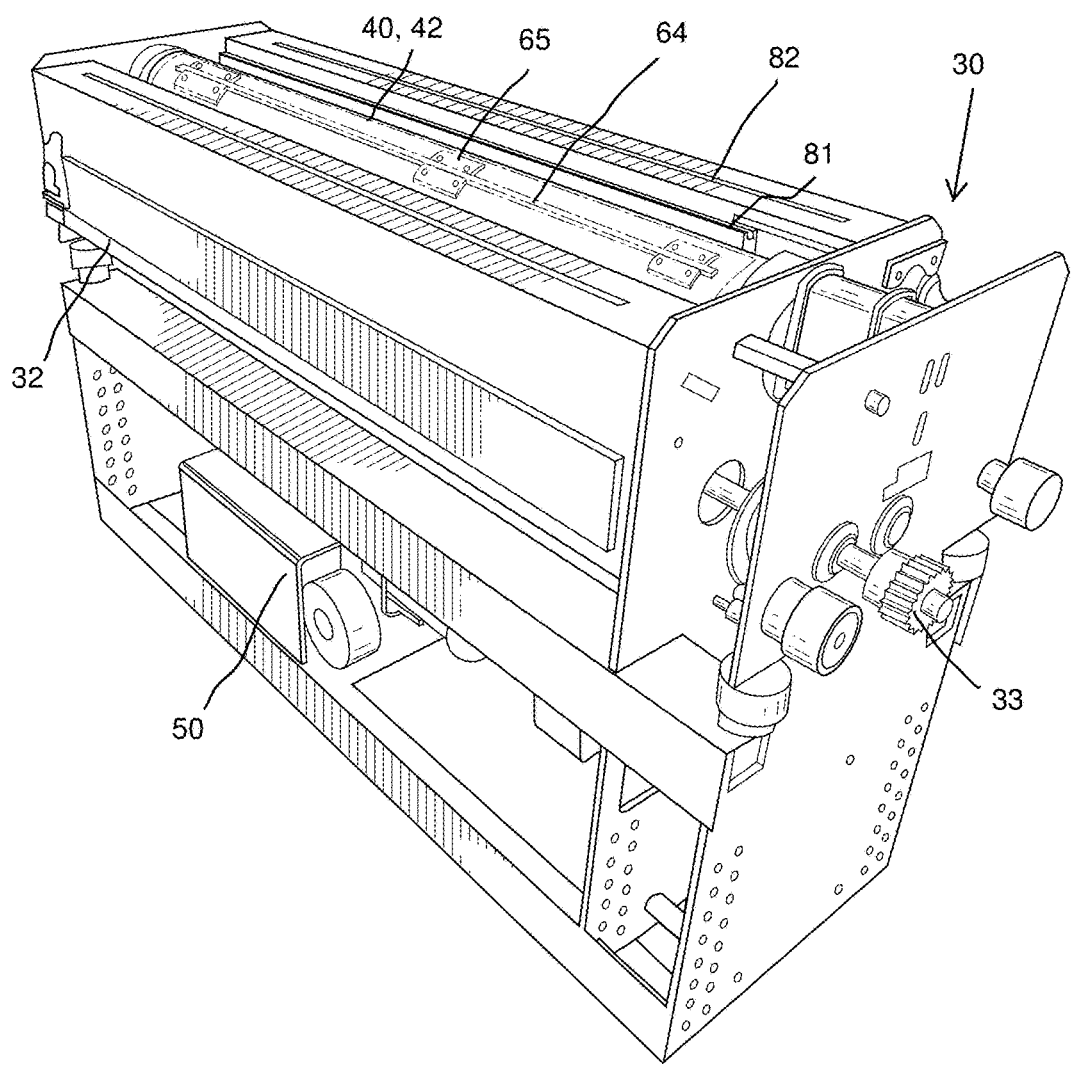
FIG. 10 is a top perspective view of a deposition mechanism of the apparatus as shown FIG. 8.
Figure 11:
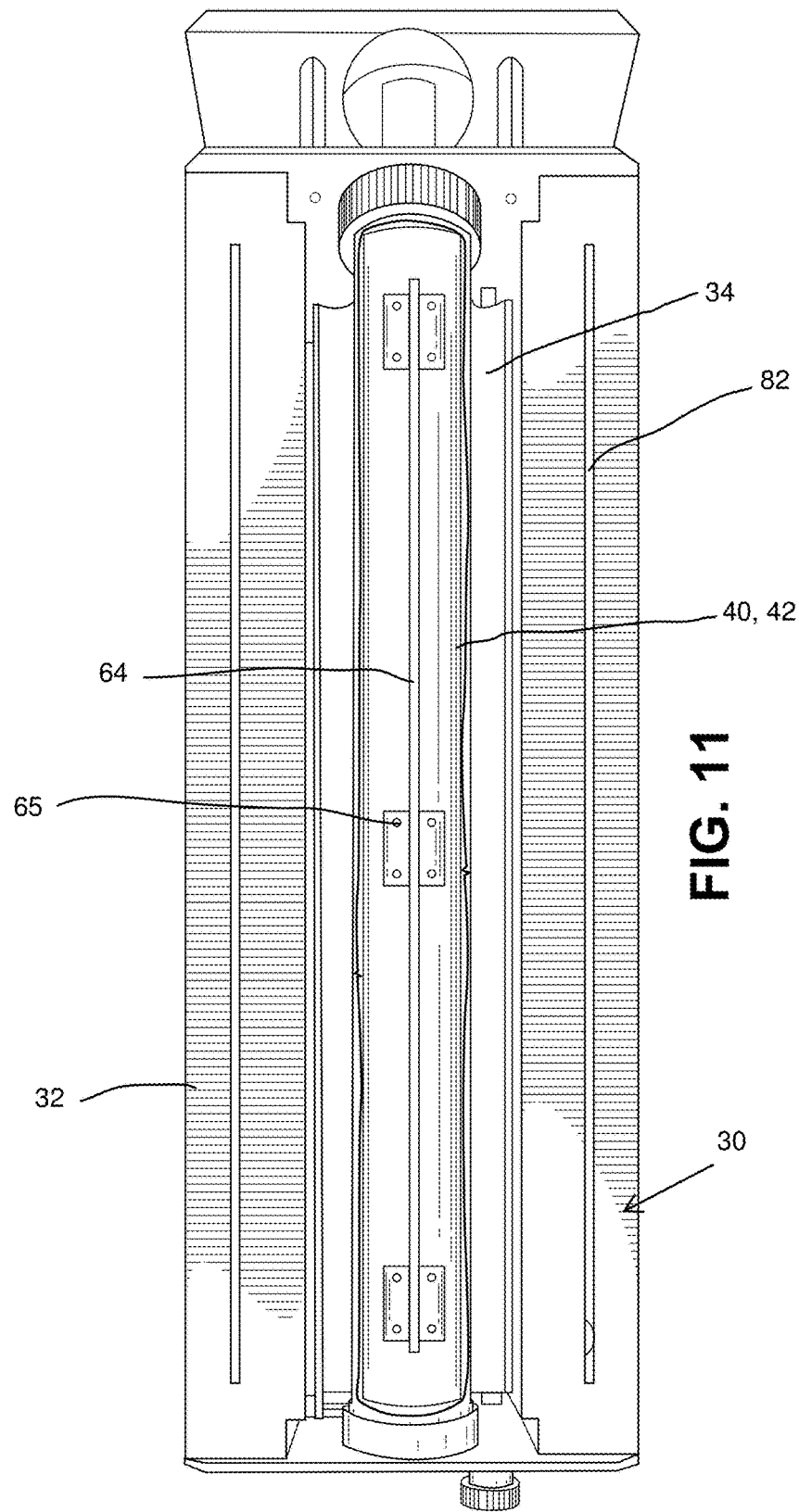
FIG. 11 is a top view of the deposition mechanism of the apparatus as shown in FIG. 10.

The deposition mechanism 30 may include further additional components to provide additional functionality in producing a high-quality object 11. It is understood that any of the example embodiments herein may include any combination of these additional components, even if not specifically illustrated herein. For example, the deposition mechanism 30 may include one or more secondary exposure devices 80, configured to trail the applicator 40 in the direction of movement, as shown in FIG. 7. The secondary exposure device 80 emits additional electromagnetic waves 53 to further solidify the material, which waves 53 may have the same or different wavelength and intensity as the waves 53 from the exposure device 50. In one embodiment, the secondary exposure device 80 does not need to be precisely focused, as it is acceptable for the entire surface of the object 11 to be irradiated. In this configuration, the waves 53 from the exposure device 50 may be configured to only solidify the material 36 enough to form a stable layer 38 (known as a "green state"), and the secondary exposure device 80 then further solidifies the layer 38 to the desired final degree of solidification. This presents a significant efficiency advantage over existing processes, where objects 11 are typically produced in the green state and require a subsequent separate irradiation step for full curing. In one embodiment, the power levels of the exposure device 50 and the secondary exposure device 80 may be set so that each exposure device 50, 80 partially solidifies the material 36 and the combined exposure is sufficient to completely solidify the material 36. This setting avoids overexposure of the material 36, which could cause aesthetic and/or mechanical damage. The embodiment of FIGS. 15-19 includes two secondary exposure devices 80, to permit secondary exposure of the layer 38 while the carriage 32 is traveling in two opposite directions without making a 180° turn. The leading secondary exposure device 80 may be deactivated for each pass of the carriage 32, with the trailing secondary exposure device 80 being active, or both secondary exposure devices 80 may be active. Components 80A of the secondary exposure device 80 are illustrated in FIG. 16. The controller 100 may control activation of the secondary exposure device(s) 80.

As another example, the deposition mechanism 30 may include one or more material removal and/or relocation mechanisms configured to remove or relocate excess and/or unsolidified material, such as one or more squeegees 81 or one or more contactless vacuum squeegees 82. For example, the embodiment in FIGS. 15-19 includes two squeegees 81 positioned on alternate sides of the roller 42, which wipe the surface of the layer 38 to remove excess and/or unsolidified material 36 after the solidification process. In one embodiment, the squeegees 81 may be configured to be raised and lowered, so that only the trailing squeegee 81 engages the surface of the object 11, which operation may be controlled by the controller 100. As another example, the embodiment in FIGS. 15-19 also includes two vacuum squeegees 82 positioned on alternate sides of the roller 42, which remove or relocate excess and/or unsolidified material 36 after the solidification process through application of vacuum airflow through blowing or suction. Components 82A-B of the vacuum squeegees 82 are shown in FIG. 16. In one embodiment, the vacuum squeegees 82 may be configured to be activated and deactivated, so that only the trailing vacuum squeegees 82 affects the surface of the object 11, which operation may be controlled by the controller 100. In one embodiment, the vacuum squeegees 82 can relocate remaining flowable material 36 located on vertical surfaces of the object 11 to adjacent horizontal surfaces of the applied layer 38, where the material 36 can either be removed and reclaimed into the supply 34 by the mechanical squeegees 81 or solidified to become part of the applied layer 38, e.g., by a secondary exposure device 80. Moving any remaining material 36 to the surface of the object 11 to be solidified has the added benefits of creating additional edge volume and an irregular surface at the edges of the layer, which can aid in retention and bonding of the next applied layer 38. In one embodiment, the vacuum squeegees 82 may not be activated until one or more foundation layers of the object 11 are completed. The vacuum squeegees 82 may alternately be configured to completely remove excess and/or unsolidified material in another embodiment. The embodiment in FIGS. 8-11 includes squeegees 81 and vacuum squeegees 82 configured similarly to those in the embodiment of FIGS. 15-19.

Figure 65:
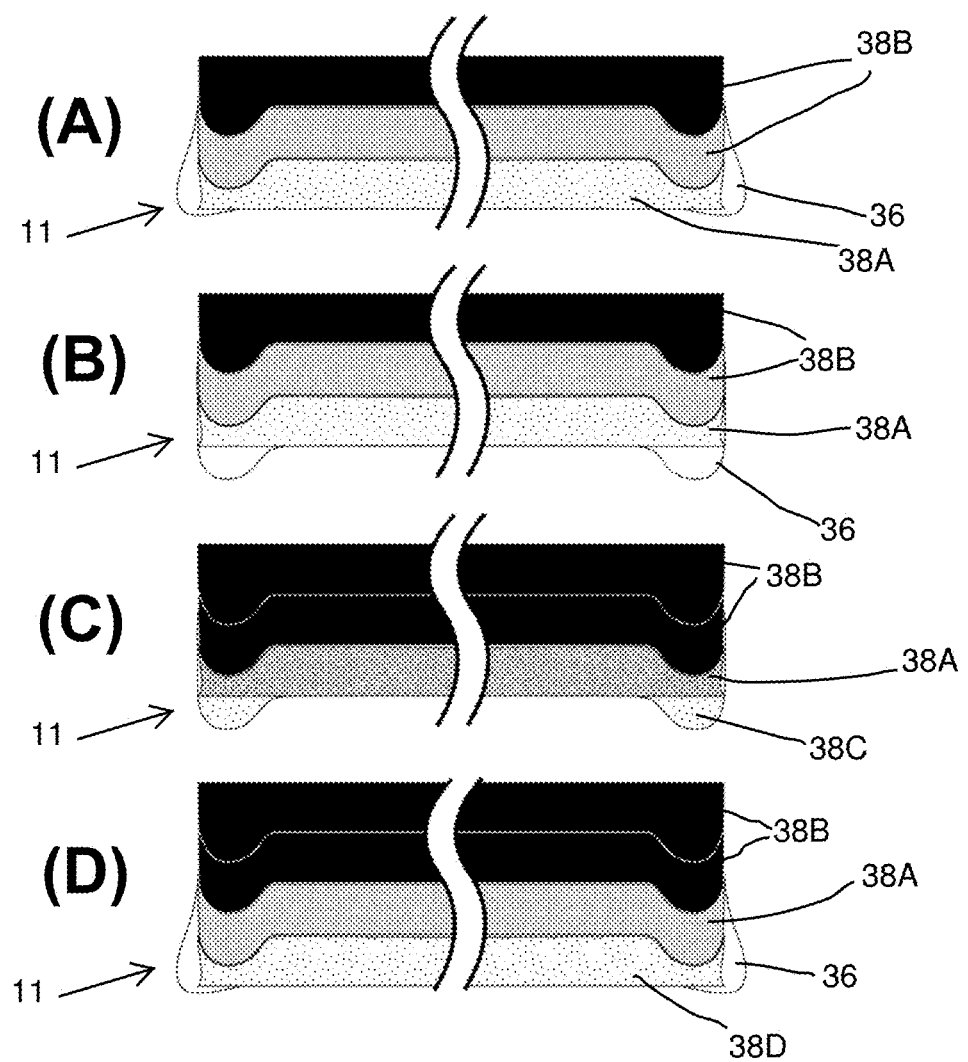
FIG. 65 is a schematic view illustrating a process for relocating and solidifying additional material according to aspects of the disclosure.

FIG. 65 illustrates relocation and subsequent solidification of unsolidified flowable material 36 using the vacuum squeegee 82 as described herein that can occur according to one embodiment. In FIG. 65, Step A depicts the unsolidified material 36 remaining around the edges of the last solidified layer 38A that was solidified by the exposure device 50, which is stacked onto previous layers 38B that were previously solidified. The shading in the layers 38A-B in FIG. 65 illustrate different degrees of solidification/curing of the material 36. Step B in FIG. 65 depicts the relocation of the unsolidified material 36 by the vacuum squeegee 82 as described herein. The unsolidified material 36 has been relocated from the vertical surfaces 93 of the layer 38A to the horizontal surface 94 of the layer 38A, and remains near the edges of the horizontal surface 94. Step C in FIG. 65 depicts the solidification of the material 36 by a secondary exposure device 80 as described herein, to form solidified material 38C. The solidified material 38C in this configuration forms uneven portions near the edges of the previous layer 38A. Step D in FIG. 65 depicts the object 11 after application and solidification of the following layer 38D, for which binding to the previous layer 38A is enhanced by the edge portions of the solidified material 38C. Additional unsolidified material 36 is illustrated in Step D, and it is understood that the process may then return to Step B in a cycle until the build is completed.

Figure 19:
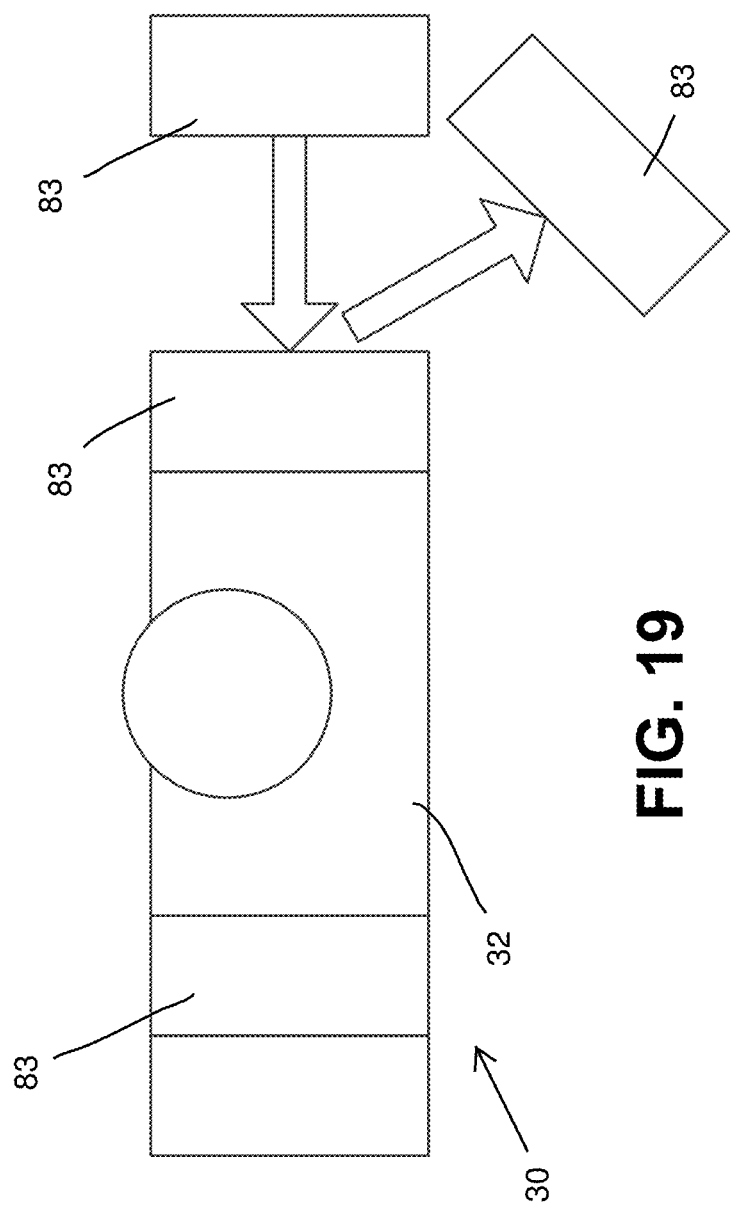
FIG. 19 is a side schematic view of another embodiment of a deposition mechanism configured for modular connection of modular connection of components, according to aspects of the disclosure.

Further additional components may be included in other embodiments. In one embodiment, one or more additional components 83 may be modularly connectable to the carriage 32 and to each other to provide the desired functionality, as shown in FIG. 19. Removable connections such as fasteners, clamps, interlocking structures (e.g., tabs/slots), or other structures may be used to effect these modular connections. As illustrated in FIG. 19, each of the additional components 83 is connectable to the carriage 32 and connectable to the outer side of each other additional component 83 in order to provide a fully modular and customizable structure. Such additional components 83 may include one or more secondary exposure devices 80, squeegees 81, or vacuum squeegees 82 as described herein. Such additional components 83 may also include other functional components, such as a solvent or liquid washing apparatus, mechanical wipers/cleaners, a color applicator, or an apparatus for additional material deposition. A color applicator used in this configuration can allow coloring to be applied on a layer-by-layer basis, giving the final object 11 a coloring that penetrates internally through the thickness of the object 11, instead of simply a surface coating. An apparatus for additional material deposition may include an apparatus for deposition of conductive materials or traces within the body of the object 11, providing conductivity and/or circuit functionality to the object 11.

Figure 20A:
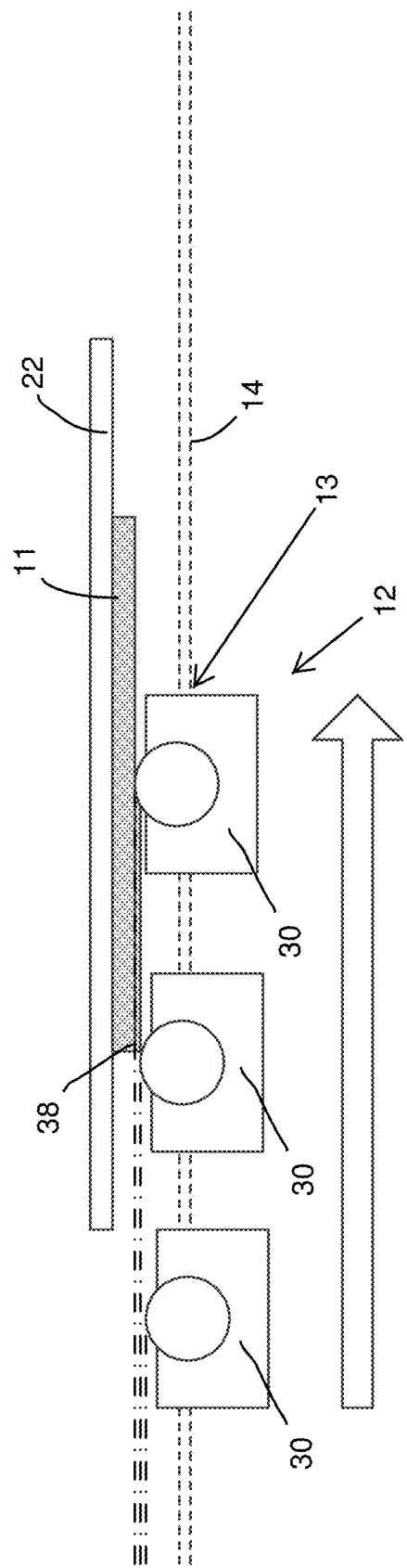
FIGS. 20A and 20B are side schematic views of another embodiment of an apparatus for producing a three-dimensional object in operation, according to aspects of the disclosure.
Figure 20B:
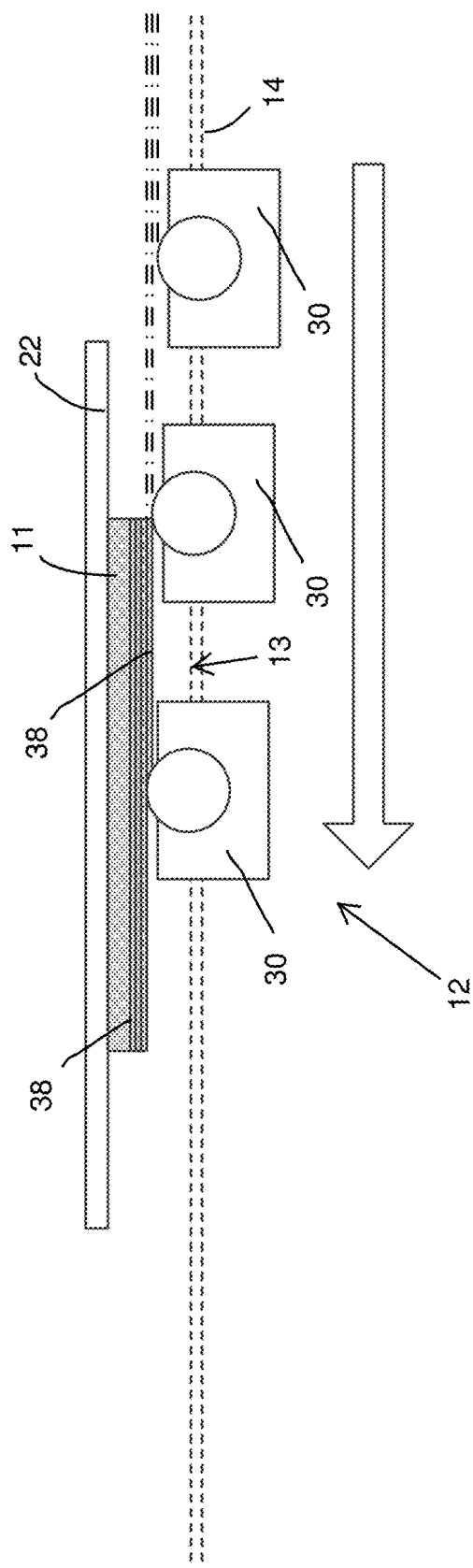
Figure 21:
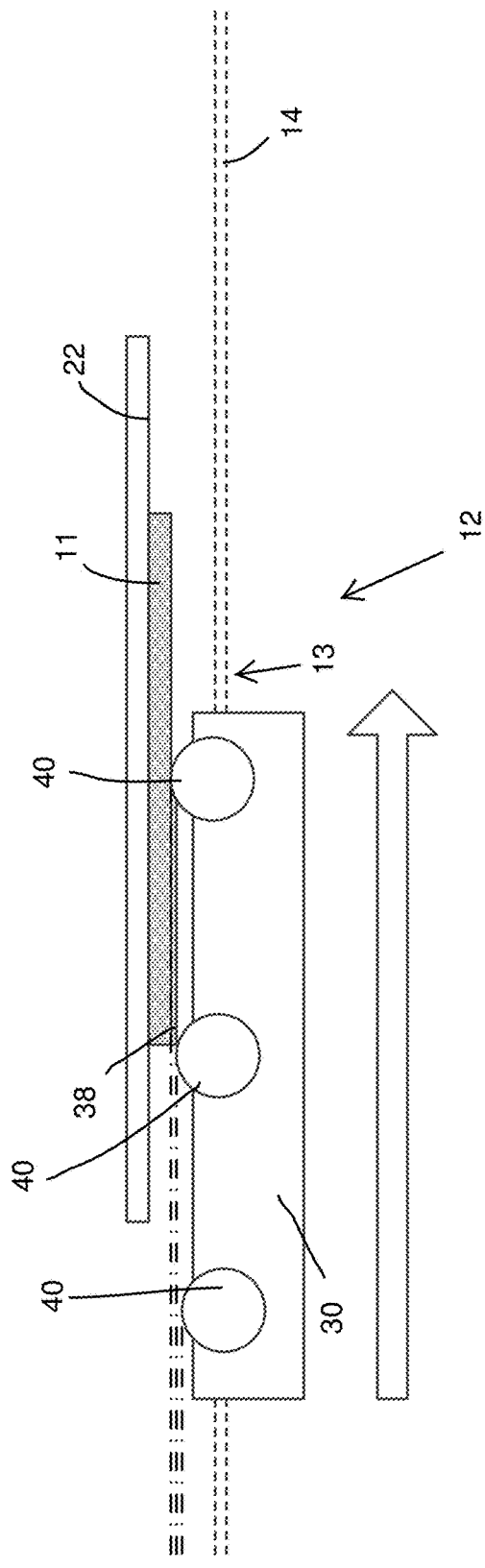
FIG. 21 is a side schematic view of another embodiment of an apparatus for producing a three-dimensional object in operation, according to aspects of the disclosure.
Figure 22:
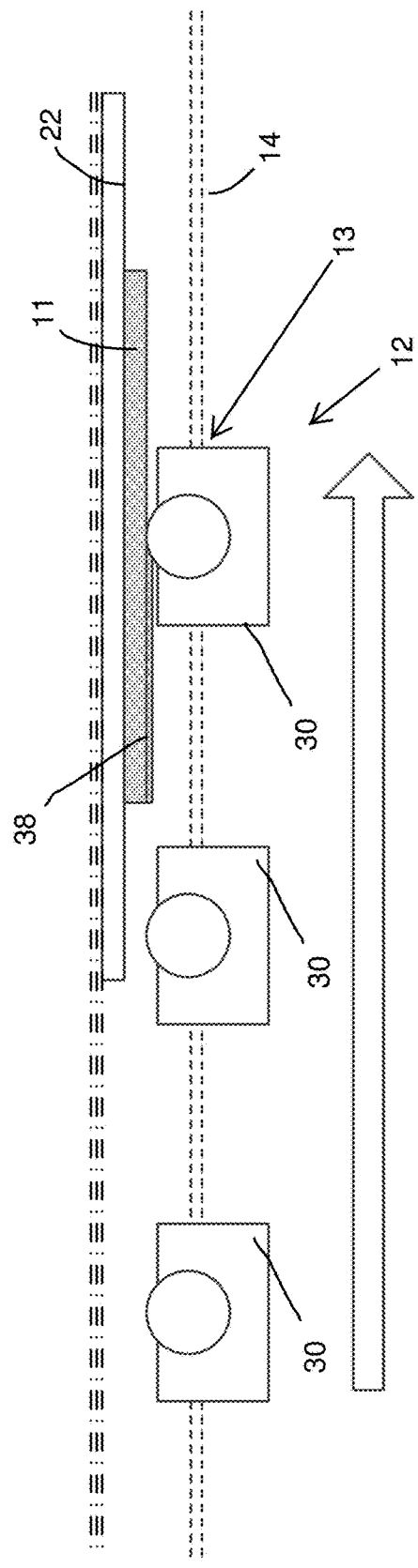
FIG. 22 is a side schematic view of another embodiment of an apparatus for producing a three-dimensional object in operation, according to aspects of the disclosure.
Figure 23:
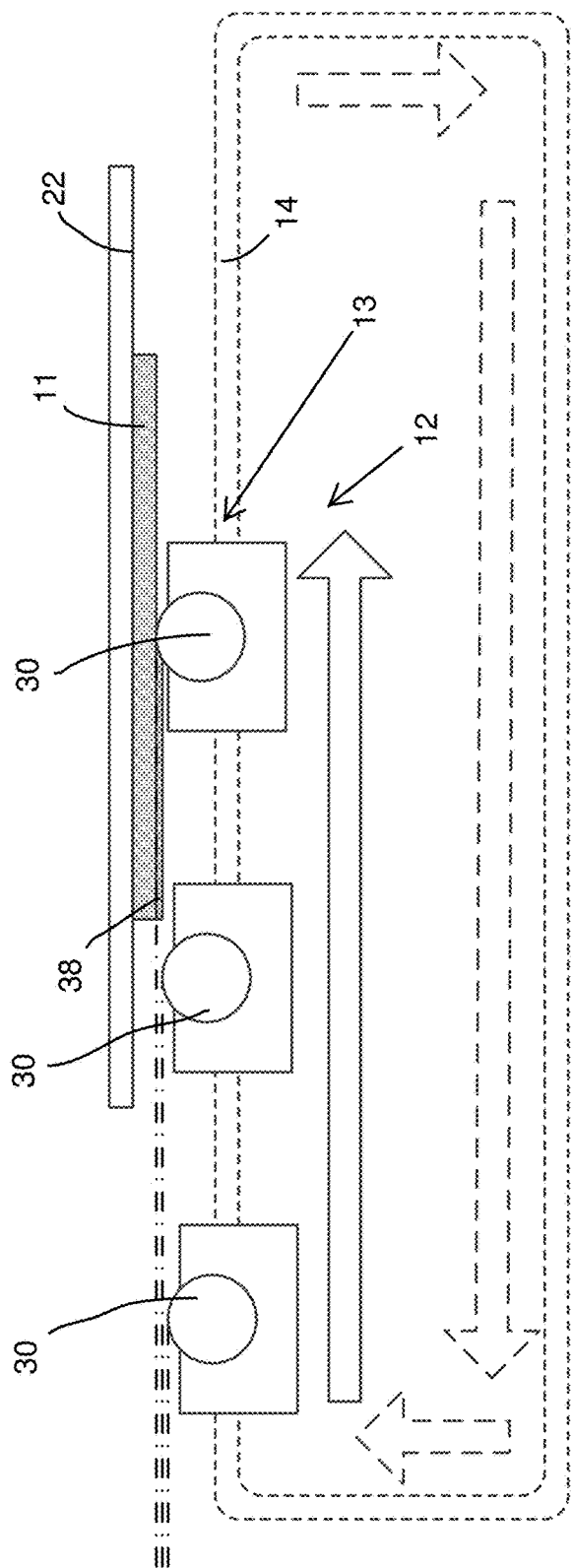
FIG. 23 is a side schematic view of another embodiment of an apparatus for producing a three-dimensional object in operation, according to aspects of the disclosure.

The apparatus 12 may be configured to use multiple deposition mechanisms 30 and/or multiple applicators 40 to pass through the build area 13 in sequence, such as illustrated in FIGS. 20-23. The multiple deposition mechanisms 30 in FIGS. 20-23 are illustrated as being connected to the same track 14, but multiple tracks 14 may be used in another embodiment. In one embodiment, as illustrated in FIGS. 20A-B, multiple deposition mechanisms 30 may be configured to pass through the build area 13 sequentially, with each deposition mechanism 30 having the applicator 40 at different vertical positions. The different applicator 40 positions are indicated by phantom lines in FIGS. 20A-B, and each successive deposition mechanism 30 is spaced lower than the preceding deposition mechanism 30. This configuration may be accomplished using vertical positioning structures described elsewhere herein. It is understood that the difference in vertical positioning among the multiple deposition mechanisms 30 may be substantially the same as the desired thickness of each applied layer 38. As shown in FIG. 20A, multiple deposition mechanisms 30 passing through the build area 13 each deposit a layer 38, one on top of the next, in a single pass that does not require re-positioning of the support assembly 20. This configuration results in multiplicative efficiency and time savings, as each pass in FIG. 20A deposits 3× as many layers as a single pass with a single deposition mechanism 30. Further, the multiple deposition mechanisms 30 may be configured to adjust their heights in the reverse order to enable a pass in the opposite direction to deposit three additional layers 38, after repositioning of the build platform 22, as shown in FIG. 20B. In another embodiment, the support assembly 20 may be configured for rapidly adjusting the positioning of the build platform 22 between each deposition mechanism 30 passing, to enable multiple passes, as shown in FIG. 22. In a further embodiment, the track 14 may be arranged in a loop or carousel configuration to enable passes by one or more deposition mechanisms 30 at the same relative build platform 22 height, without reversing the direction of the deposition mechanism(s) 30. This can remove the necessity for re-adjusting the relative heights of the deposition mechanisms 30 relative to each other, and only adjustment of the build platform 22 relative to the track 14 is necessary. This can also remove the need for duplicative components such as secondary exposure devices 80, squeegees 81, vacuum squeegees 82, etc., to permit opposite directional passes. The loop of the track 14 may be horizontal, vertical, or a more complex configuration. When multiple deposition mechanisms 30 are used, all deposition mechanisms 30 may use the same material 36, or different deposition mechanism 30 may be configured to apply different materials 36. Due to differences in properties of different materials 36, the deposition mechanism 30 may need to pass at different speeds. A self-propelled carriage 32 as described herein permits this operation. Still further, the track 14 may include a complex structure (not shown) with rest areas for unused deposition mechanisms and track-switching mechanisms, to permit switching between deposition mechanisms 30 as desired.

In another embodiment, multiple deposition mechanisms 30 may be configured as illustrated in FIGS. 20A-B to pass through the build area 13 sequentially, with the deposition mechanisms 30 having the applicators 40 at the same vertical positions. This can be used to build different portions of the same layer of an object 11, and in particular, the deposition mechanisms 30 can be configured to deposit different materials 36 in the layer. For example, different deposition mechanisms 30 can produce portions with different colors, or one deposition mechanisms 30 may produce the body of the object 11 while another produces the support structure to be later removed.

In another embodiment, shown in FIG. 21, a single deposition mechanism 30 may include multiple applicators 40 positioned at different heights to define separate application sites 41, with sufficient outlets 54 for the waves 53 emitted by one or more exposure devices 50 to define a separate exposure site 51 for each applicator 40. The multiple applicators 40 may be configured with a single supply 34 of the flowable material 36 or multiple supplies 34 of one or more flowable materials 36, and it is understood that other components may be duplicated if desired. The rollers 42 in FIG. 21 may be vertically adjustable relative to each other in one embodiment.

Figure 24A:
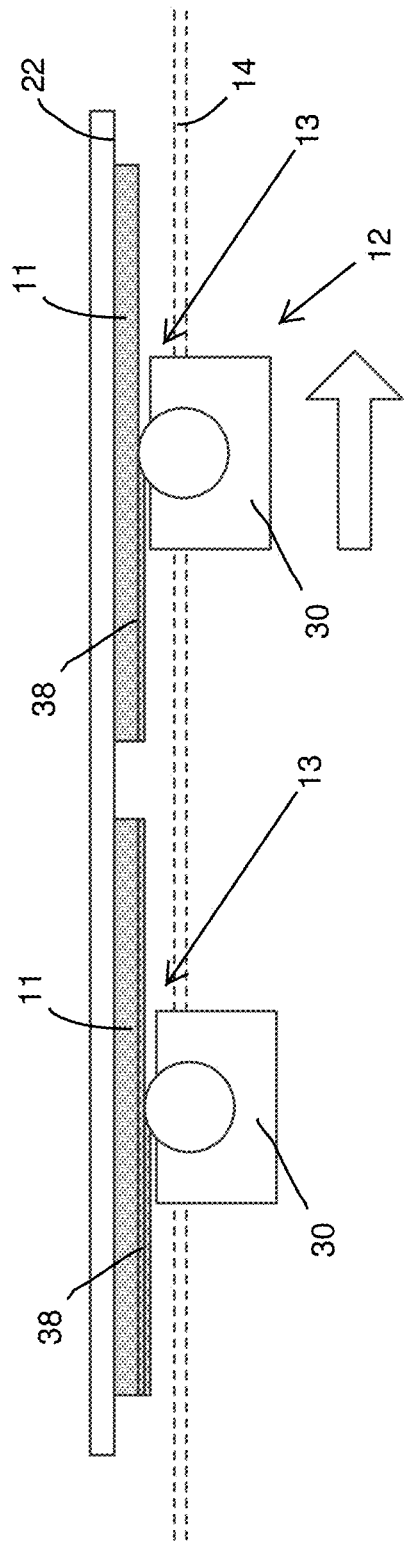
FIG. 24A is a side schematic view of another embodiment of an apparatus for producing a three-dimensional object in operation, according to aspects of the disclosure.
Figure 24B:
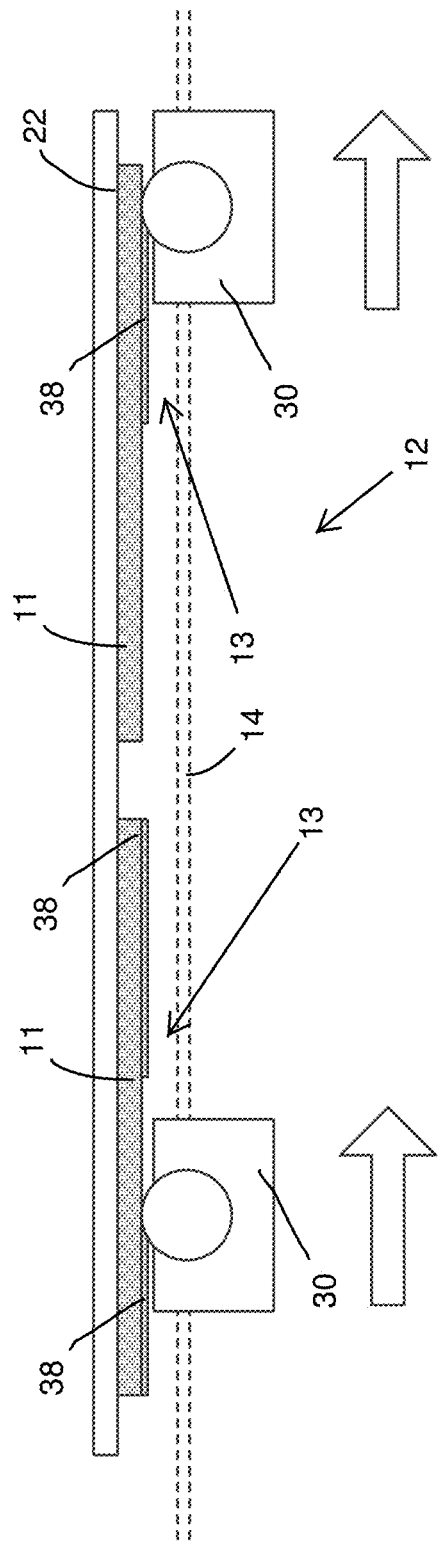
FIG. 24B is a side schematic view of another embodiment of an apparatus for producing a three-dimensional object in operation, according to aspects of the disclosure.

In other embodiments, shown in FIGS. 24A-B, a single or multiple deposition mechanisms 30 may be configured to build multiple objects 11 in a single pass, such as by using multiple build platforms 22 or multiple objects 11 built on the same build platform 22, with each separate object 11 having a separate build area 13 through which the track 14 passes. As shown in FIG. 24A, multiple deposition mechanisms 30 may apply multiple consecutive layers 38 to multiple objects 11 in a single pass. As shown in FIG. 24B, multiple deposition mechanisms 30 may apply different portions of the same layer 38 to each of multiple objects 11 in a single pass. This configuration may be particularly useful for a part where multiple materials need to be deposited in the same layer, such as for a multi-material object 11 or an object 11 that includes support structure being manufactured along with the object 11 that will be later removed. It is understood that the height(s) of the build platform(s) 22 relative to the applicator(s) 40 may be adjusted between passes as described herein. Additionally, the use of multiple deposition mechanisms 30 and/or multiple applicators 40 as shown in FIGS. 20-23 with an embodiment as shown in FIG. 24 may enable dually multiplicative efficiency and time savings. Further, the use of multiple deposition mechanisms 30 and/or multiple applicators 40 as shown in FIGS. 20-23 in combination with an embodiment as shown in FIG. 24A or 24B may enable different parts of multiple identical objects 11 to be simultaneously manufactured in a single pass of each deposition mechanism 30. For example, a first deposition mechanism 30 may be loaded with a first material 36 for manufacturing a first part of an object 11, and a second deposition mechanism 30 may be loaded with a second material 36 for manufacturing a second part of the object 11, and each of these deposition mechanisms 30 can be configured make a single pass depositing a layer 38 (or partial layer) of the desired material 36 in the same location on a plurality of identical objects 11 sequentially as shown in FIG. 24A-B. It is understood that different deposition mechanisms 30 may also include different exposure devices 50 if different materials 36 are used.

Figure 28:
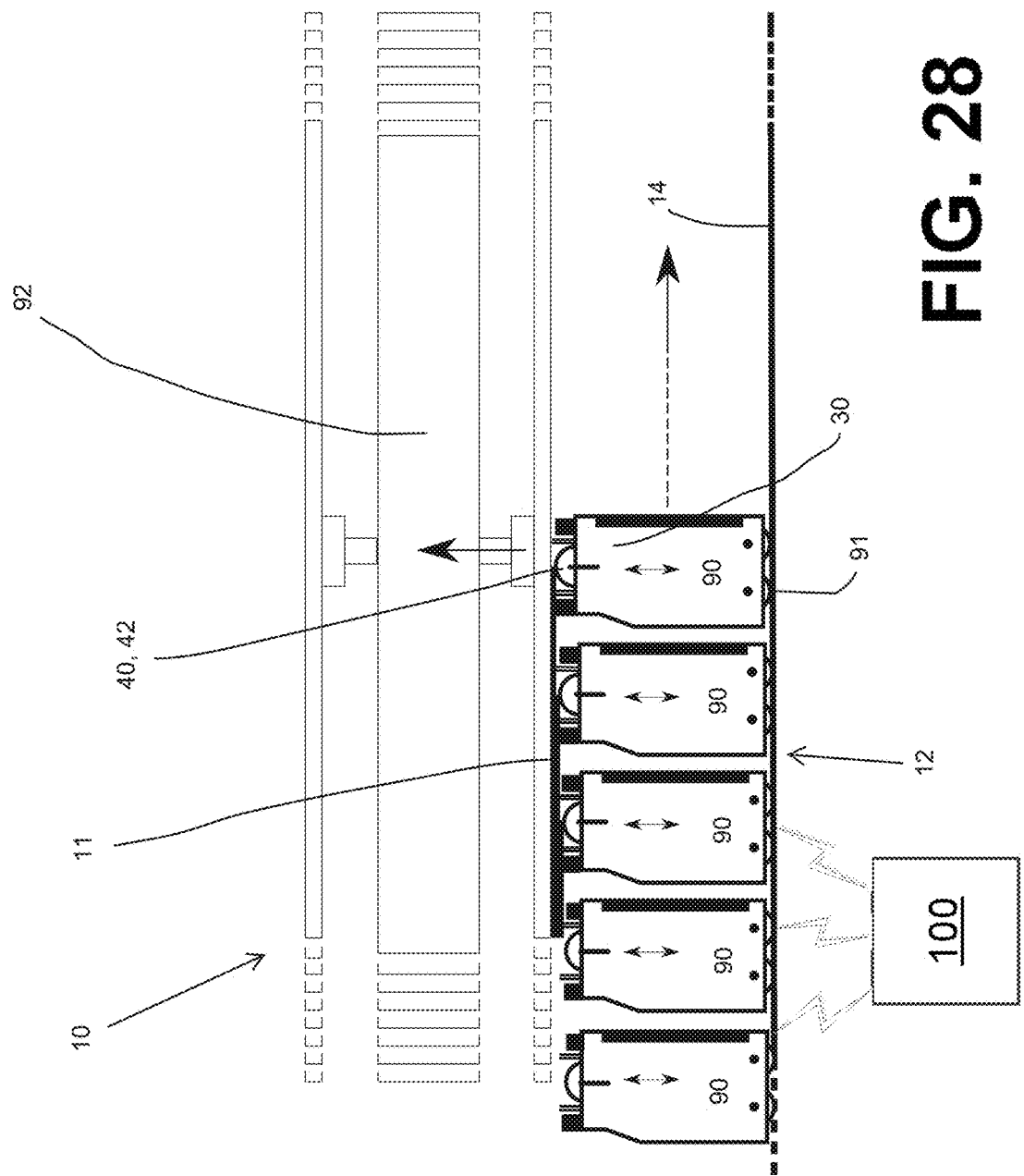
FIG. 28 is a side schematic view of another embodiment of a system and apparatus for producing a three-dimensional object in operation, according to aspects of the disclosure.

FIG. 28 illustrates an additional embodiment of a system 10 for manufacturing one or more objects 11 utilizing an apparatus 12 and deposition mechanisms 30 according to embodiments described herein. In particular, the embodiment of FIG. 28 may be configured for producing a number of objects 11 in sequence, similar to the embodiment of FIG. 24. Each deposition mechanism 30 in the embodiment of FIG. 28 may be configured as an autonomous unit 90 with an individual sub-controller, where all of the sub-controllers for all of the units 90 are integrated with the controller 100, such that the controller 100 controls the sub-controllers and thereby controls all of the units 90. Each unit 90 may further include one or more positioning systems, including a local positioning system and/or a global positioning system (GPS). Each unit 90 may further include a deposition mechanism 30 and a drive mechanism 91 configured for moving the unit 90 around during manufacturing. As shown in FIG. 28, the units 90 are all connected to a carousel 92 that moves the units 90 around to a plurality of stations. The stations may each be configured for a specialized purpose. For example, some stations may be manufacturing stations where the unit 90 makes a pass through one or more build areas 13 for manufacturing one or more objects 11 on one or more build platforms 22. Such stations may also include robotic components, such as robotic arms that hold a build platform 22 in the proper location for building by the units 90. Other stations may be maintenance stations, such as stations configured for refilling the supply 34 the unit 90. The carousel 92 may have one or more tracks 14 as described herein for guiding movement of the units 90 during building. The drive mechanism 91 may be multifunctional, such that the units 90 are autonomously powered and capable of engaging and disengaging from the track 14 and moving separately from the track 14 when not in the building process, such as for visiting refilling or maintenance stations. In the configuration illustrated in FIG. 28, each unit 90 may be loaded with a different material 36 for manufacturing different parts of a single object 11 or different objects, as described above with respect to FIG. 24. This configuration therefore provides the ability for rapid manufacturing of a series of objects 11, either identical objects 11 or different objects 11.

Figure 29:
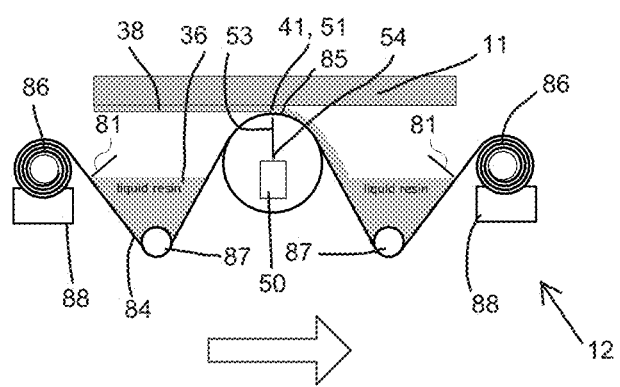
FIG. 29 is a side schematic view of another embodiment of an apparatus for producing a three-dimensional object in operation, according to aspects of the disclosure.
Figure 30:
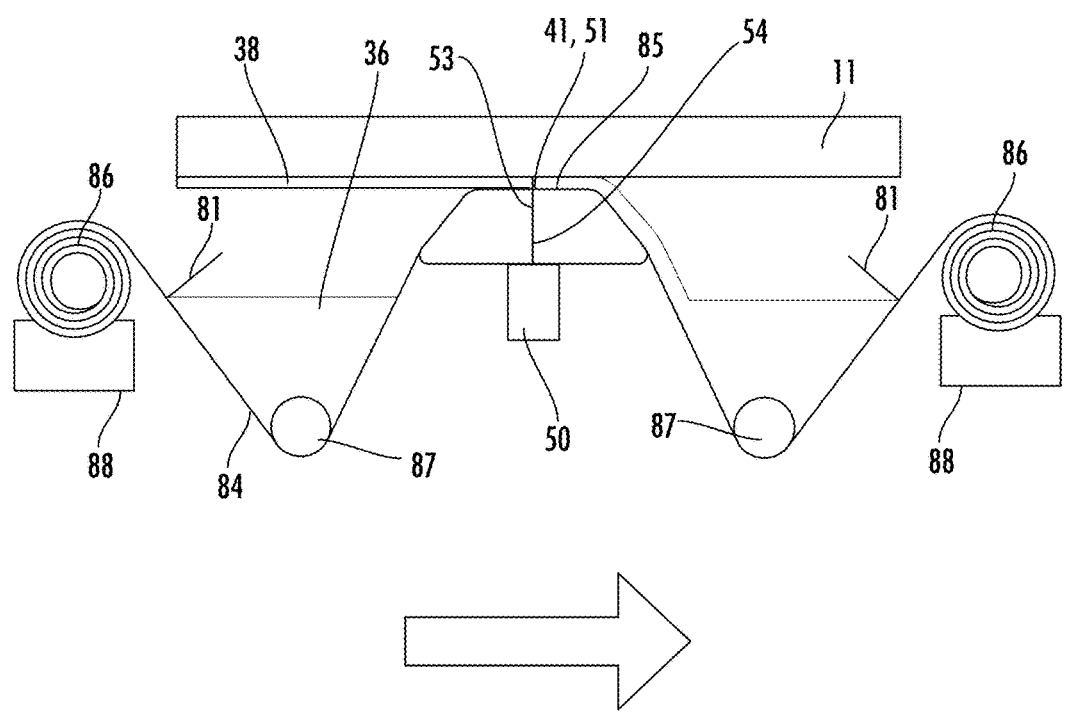
FIG. 30 is a side schematic view of another embodiment of an apparatus for producing a three-dimensional object in operation, according to aspects of the disclosure.
Figure 31:
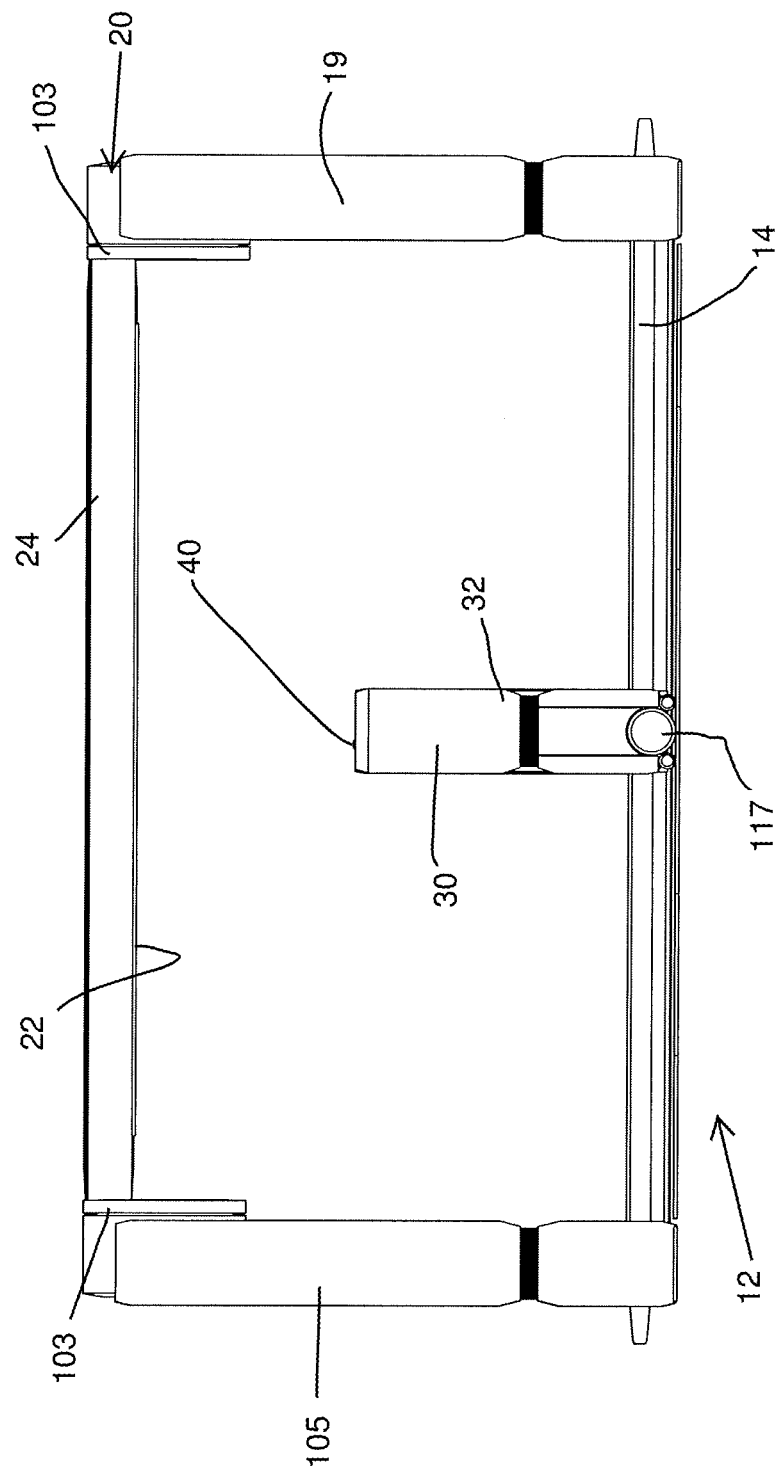
FIG. 31 is a side view of another embodiment of an apparatus for producing a three-dimensional object in operation, according to aspects of the disclosure.
Figure 32:
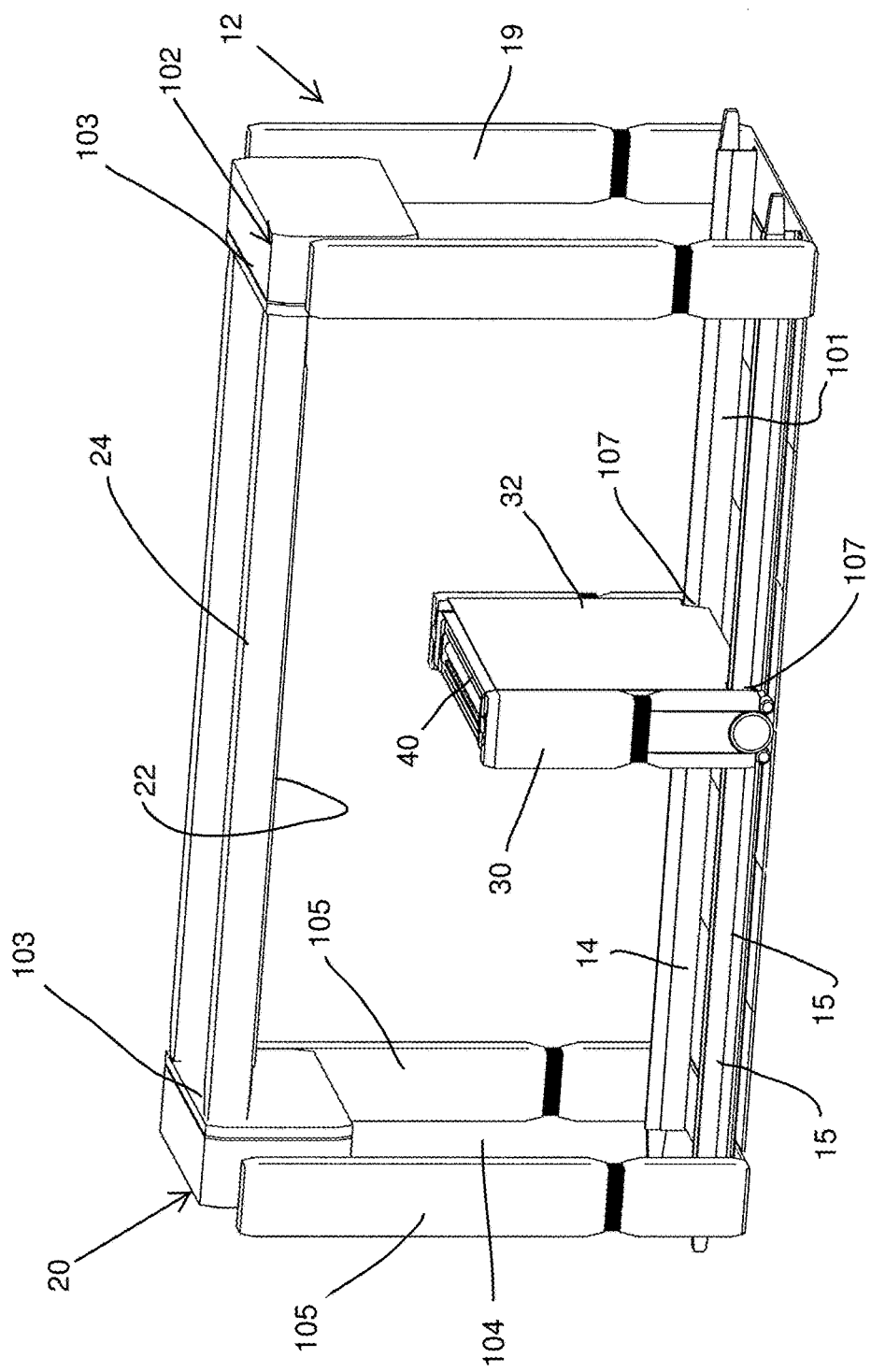
FIG. 32 is a perspective view of the apparatus of FIG. 31.
Figure 33:
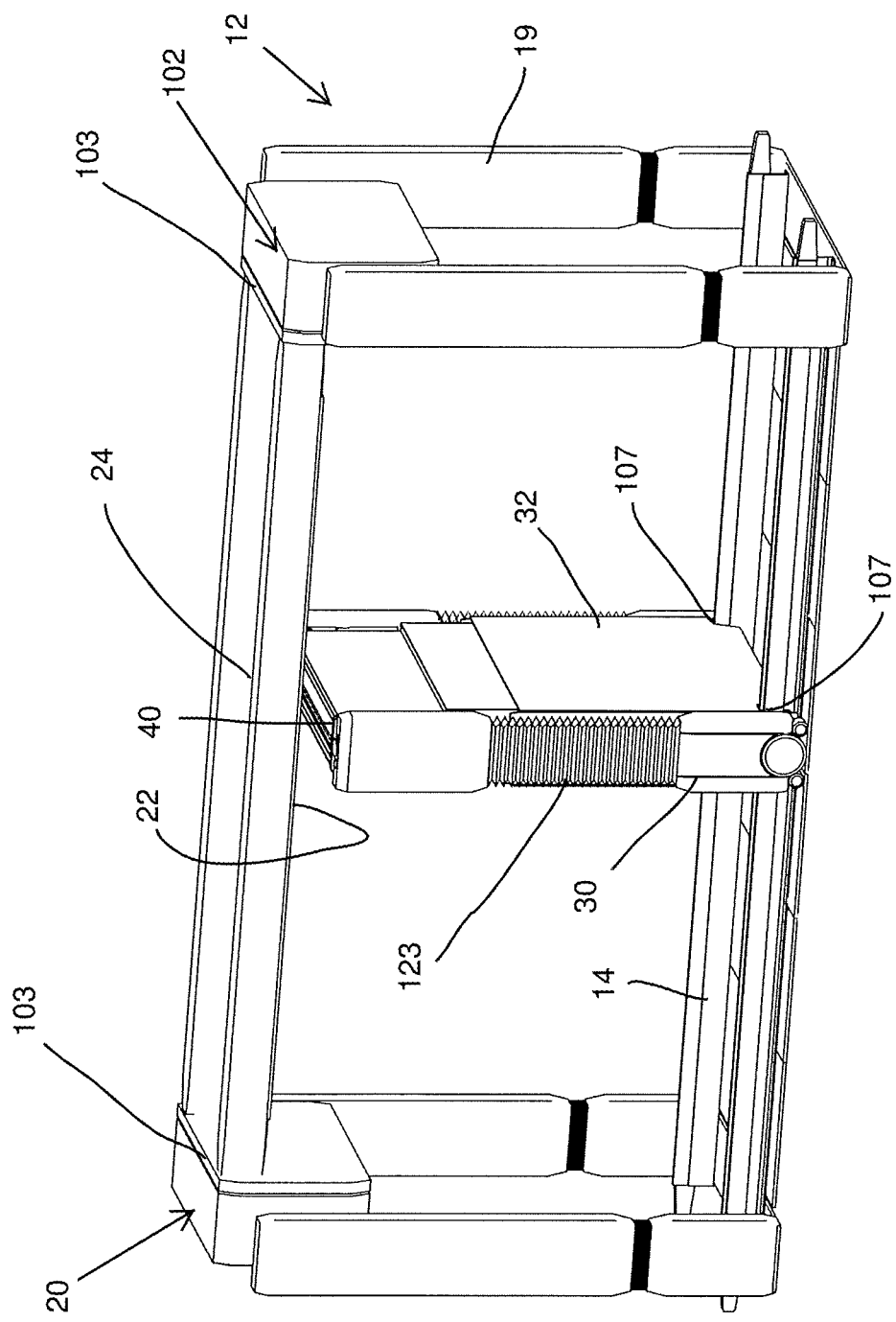
FIG. 33 is a perspective view of the apparatus of FIG. 31, showing vertical adjustment of a deposition mechanism of the apparatus to a new vertical application location.

FIG. 29 illustrates an additional embodiment of a system 10 for manufacturing one or more objects 11 utilizing an apparatus 12 and a deposition mechanism 30 with an applicator 40 that is different from the roller 42 described herein. In the embodiment of FIG. 29, the applicator 40 includes a moveable film 84 that is in communication with the supply 34 of the flowable material 36 and carries the flowable material 36 to the application site 41 by lateral movement to form a layer 38 of the object 11. The deposition mechanism 30 in FIG. 29 has a static surface 85 that defines the location of the application site 41 and the thickness of the applied layer 38 as described above, and the film 84 carries the material 36 to the application site 41 by moving over the static surface 85. The static surface 85 is formed by a cylinder in FIG. 29, but may be formed by a ridge or other structure in other embodiments. For example, FIG. 30 illustrates an embodiment of a system 10 as shown in FIG. 29 with a flattened static surface 85 that is formed by a trapezoidal structure. An oval, obround, or other structure with an elongated or flattened surface may be used in other embodiments. The deposition mechanism in FIG. 29 also has two rolls 86 on opposite sides of the application site 41, which serve as take-up or supply stations, depending on the direction of movement. For example, in FIG. 29, the deposition mechanism is moving from left to right as indicated, and the film 84 is moving from right to left, with the left hand roll 86 serving as a take-up station and the right-hand roll 86 serving as the supply station. This will be reversed when moving from right to left. Other components are also included such as guide rollers 87 or other guides for the film 84, squeegees 81 or other material removal devices to remove the flowable material 36 from the film 84 before reaching a take-up roller 86, and a cleaning station 88 for cleaning the film 84 stored on the rolls 86. While the carriage 32 is not shown in FIG. 29, it is understood that all of these components may be mounted on a carriage 32 as described herein. As shown in FIG. 29, the exposure device 50, or at least the outlets 54 thereof, may be located beneath the static surface 85 and within the cylinder that defines the static surface 85, although any configuration and positioning of the exposure device 50 and the outlets 54 thereof described herein can be used in connection with this embodiment. In the illustrated configuration, the waves 53 from the exposure device 50 pass through both the static surface 85 and the film 84 on the path to the exposure site 51. In an additional embodiment, the static surface 85 may have a gap that permits the waves 53 to pass to the exposure site 51 without passing through the static surface 85. In a further embodiment, the static surface 85 may have an array 55 of outlets 54 mounted within such a gap, which may place the outlets 54 in such close proximity to the exposure site 51 that no lenses or other focusing equipment may be necessary.

FIG. 25 illustrates an alternate embodiment of the system 10 and apparatus 12 that uses a traditional vat supply 34 of the flowable material 36, with the deposition mechanism 30 positioned above the build platform 22. The deposition mechanism 30 in this embodiment generally includes a carriage 32 that is configured for movement along a track 14, with a roller 42 and an exposure device 50 that emits waves 53 that pass through the roller 42 on their path to the exposure site 51. In this embodiment, the roller 42 does not act as an applicator as in the embodiments of FIGS. 1 and 3-4, but does define the thickness of the applied layer 38 of the material 36, similarly to the such previous embodiments. As such, the roller 42 in this embodiment acts as a layer-defining mechanism, and differently configured structures may be used for this purpose in other embodiments, such as a block shape that slides along or through the material 36. The build platform 22 in FIG. 25 and associated structures may be configured to have a removable structure as described elsewhere herein. Additionally, the deposition mechanism 30 and/or the build platform 22 may have adjustment mechanisms (not shown) for relative vertical positional adjustment of the build platform 22 and the roller surface 42. The adjustment mechanism may include structures described herein and/or structures used in existing vat-based rapid prototyping technologies, such as moving the build platform 22 gradually deeper into the vat supply 34. This embodiment enables the object 11 to be manufactured below the surface of the flowable material 36 if so desired, with a controllable layer 38 thickness. However, this embodiment does not provide some of the advantages of the other embodiments described herein, such as eliminating the requirement to maintain a large vat supply 34 of the flowable material 36. It is understood that the embodiment of FIG. 25 may include additional structure, components, and features described herein. For example, the system 10 illustrated in FIG. 25 also includes a controller 100 configured for controlling and/or monitoring components of the apparatus 12 as described herein. As another example, the exposure device 50, or at least the outlets 54 thereof, are illustrated in FIG. 25 as being located inside the roller 42, but the exposure device 50 may be configured similar to that in FIG. 3 to project completely through the roller 42 in another embodiment.

FIGS. 31-46 illustrate another embodiment of a system 10 that includes a manufacturing apparatus 12 that may be connected to a computer controller 100 in communication with one or more components of the apparatus 12 and configured for controlling operation of the apparatus 12 and/or the components thereof to manufacture an object 11. The apparatus 12 of FIGS. 31-46 includes a support assembly 20 for supporting the object 11 within a build area 13 during manufacturing, a track 14 extending through the build area 13, and a material deposition mechanism 30 mounted on the track 14 and configured for producing the object 11 within the build area 13 through layer-by-layer application of a material. Many components of the system 10 and apparatus 12 of FIGS. 31-46 are similar in structure and operation to other components described herein with respect to other embodiments, and such components may not be described again in detail with respect to the embodiment of FIGS. 31-46. It is understood that similar reference numbers may be used to indicate such similar components. The deposition mechanisms 30 in FIGS. 31-46 are configured for operation as autonomous units 90 as described herein, and each autonomous unit 90 may have onboard a processor 2604, a memory 2612, and/or other computer components necessary for executing computer-executable instructions to automate the autonomous unit 90 and/or communicate with the computer controller 100.

The support assembly 20 in FIGS. 31-46 includes a base frame 19 for supporting some or all of the track 14, the build platform 22, and other components of the apparatus 12. In the embodiment of FIGS. 31-46, the track 14 is not supported by the base frame 19 and is fixed separately to the floor, but the track 14 may be connected to and supported by the base frame 19 in another embodiment. The track 14 includes two parallel beams or rails 15 and at least one bus bar 101 configured for supplying power to the deposition mechanism 30. The bus bar(s) 101 may be part of one or both of the rails 15 in one embodiment. Additionally, the substantial entirety of one or both rails 15 may act as the bus bar(s) 101 in one embodiment. One or more bus bars 101 may be provided separate from the rails 15 in another embodiment. The track 14 may not contain any bus bar 101 in another embodiment, and the deposition mechanism 30 (i.e., the autonomous unit 90) may be self-powered for movement and operation, such as by an internal battery. It is understood that the track 14, the build platform 22, the support assembly 20, and other components may be constructed in any desired size, including lengths and widths that are significantly larger than those illustrated in FIGS. 31-42.

Figure 42:
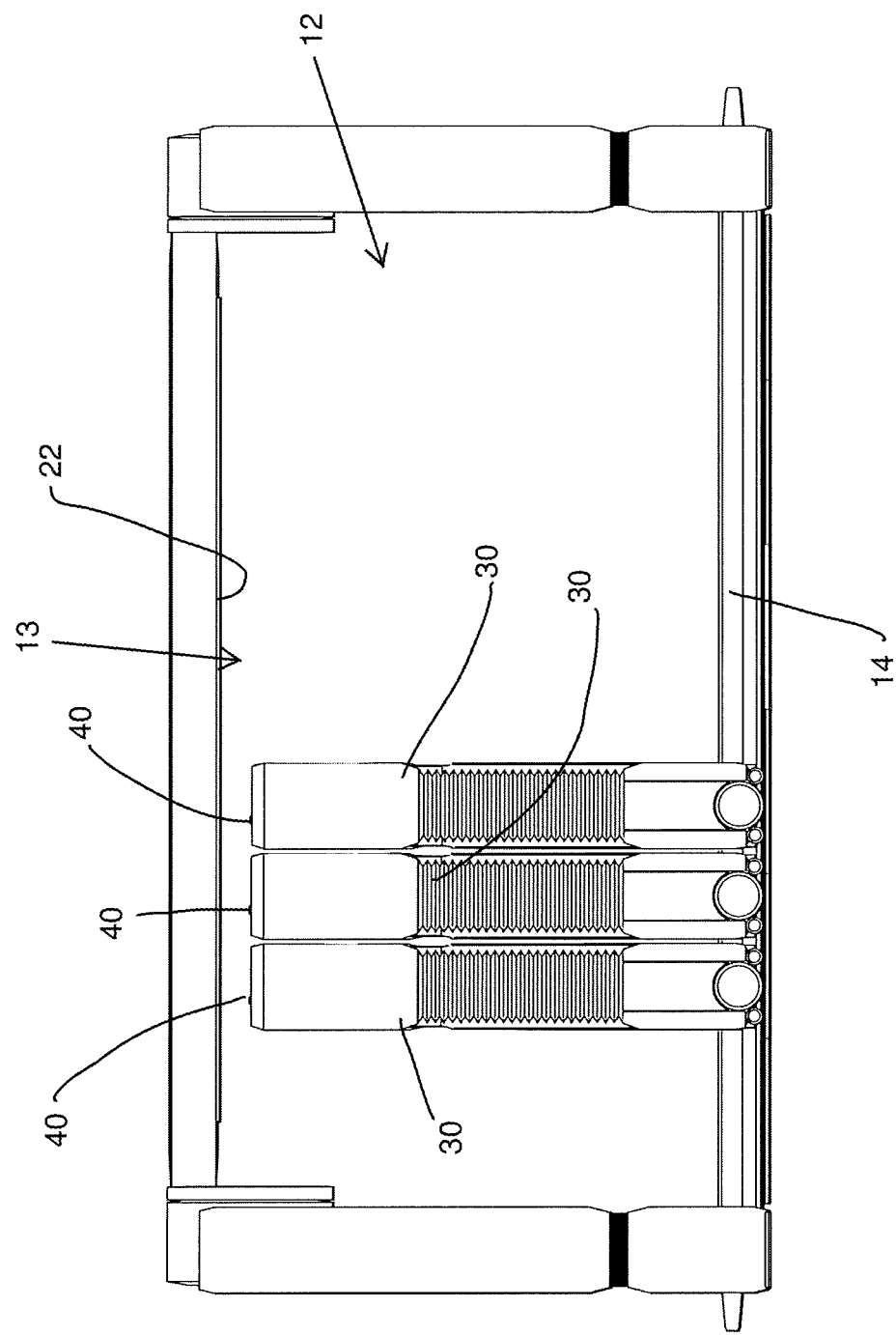
FIG. 42 is a side view of the apparatus of FIG. 31 with multiple deposition mechanisms operating simultaneously.
Figure 43:
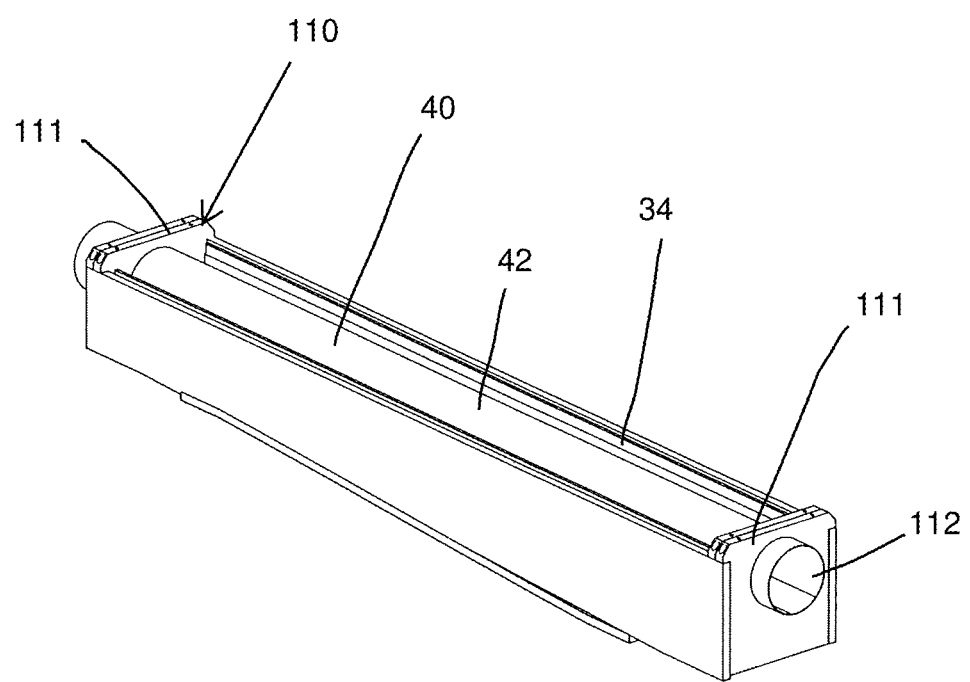
FIG. 43 is a perspective view of a portion of a removable resin application module of the deposition mechanism of FIG. 38.
Figure 44:
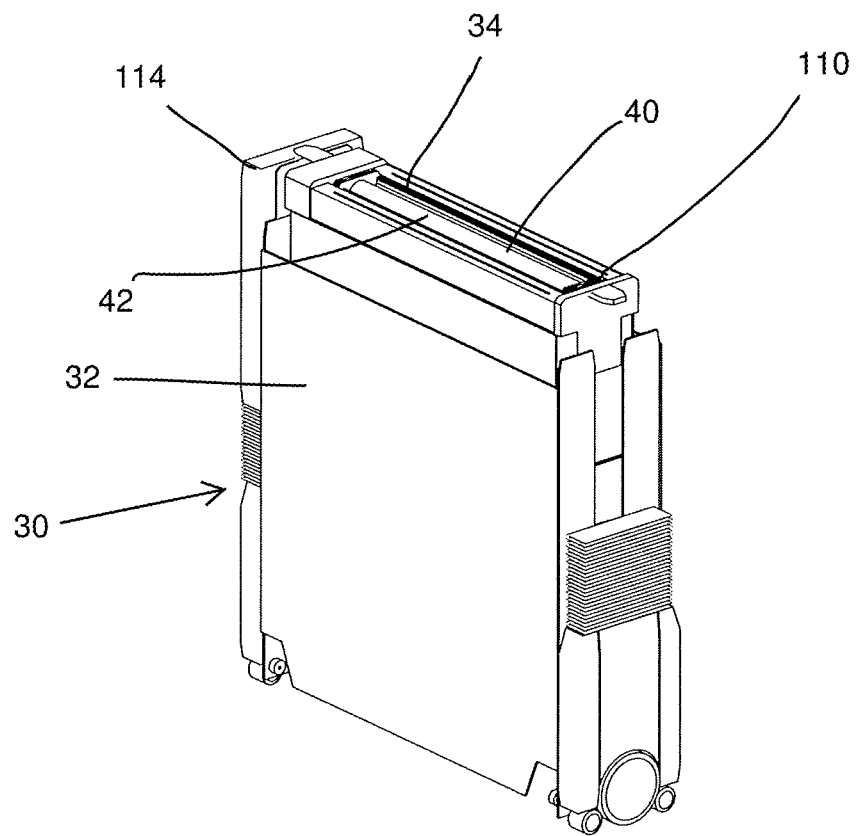
FIG. 44 is a perspective view illustrating removal of a resin application module from the resin deposition mechanism of FIG. 38.
Figure 45:
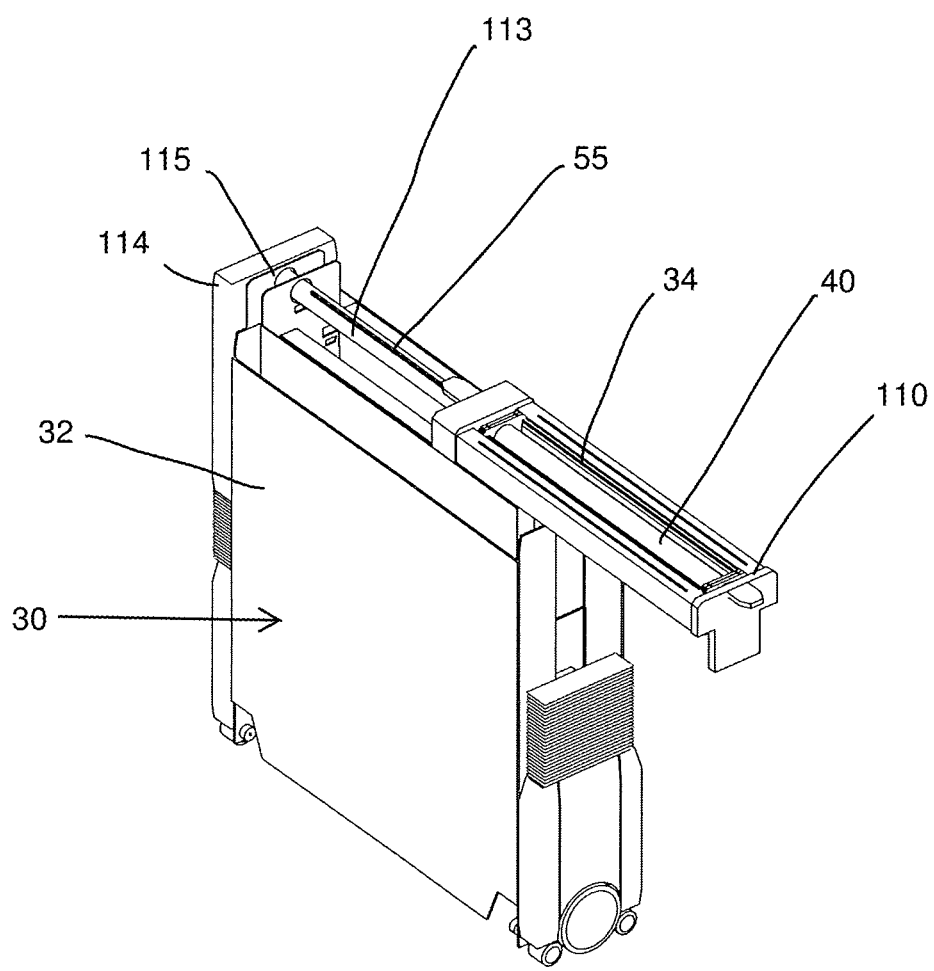
FIG. 45 is a perspective view illustrating removal of the resin application module of FIG. 44 from the resin deposition mechanism of FIG. 38.
Figure 46:
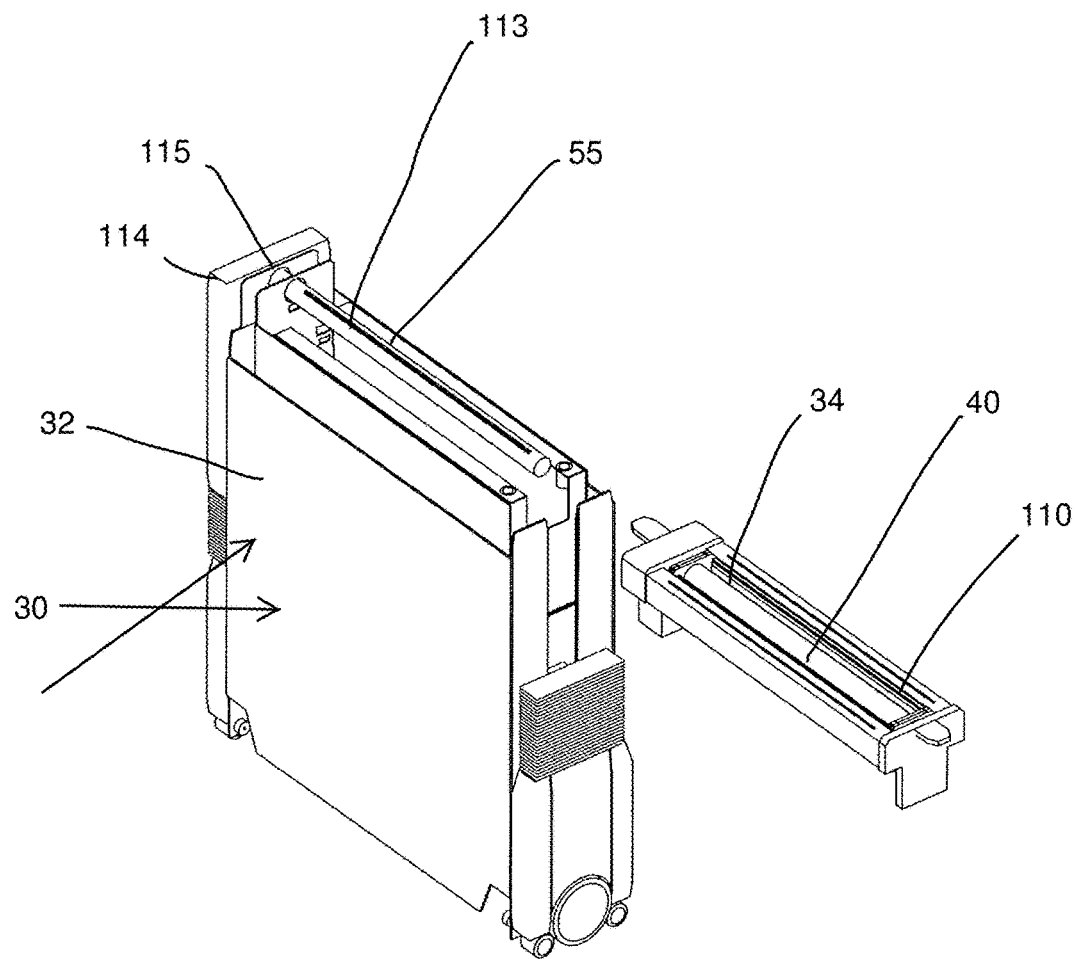
FIG. 46 is a perspective view illustrating interchanging of a second resin application module for the resin deposition mechanism of FIG. 38.
Figure 47:
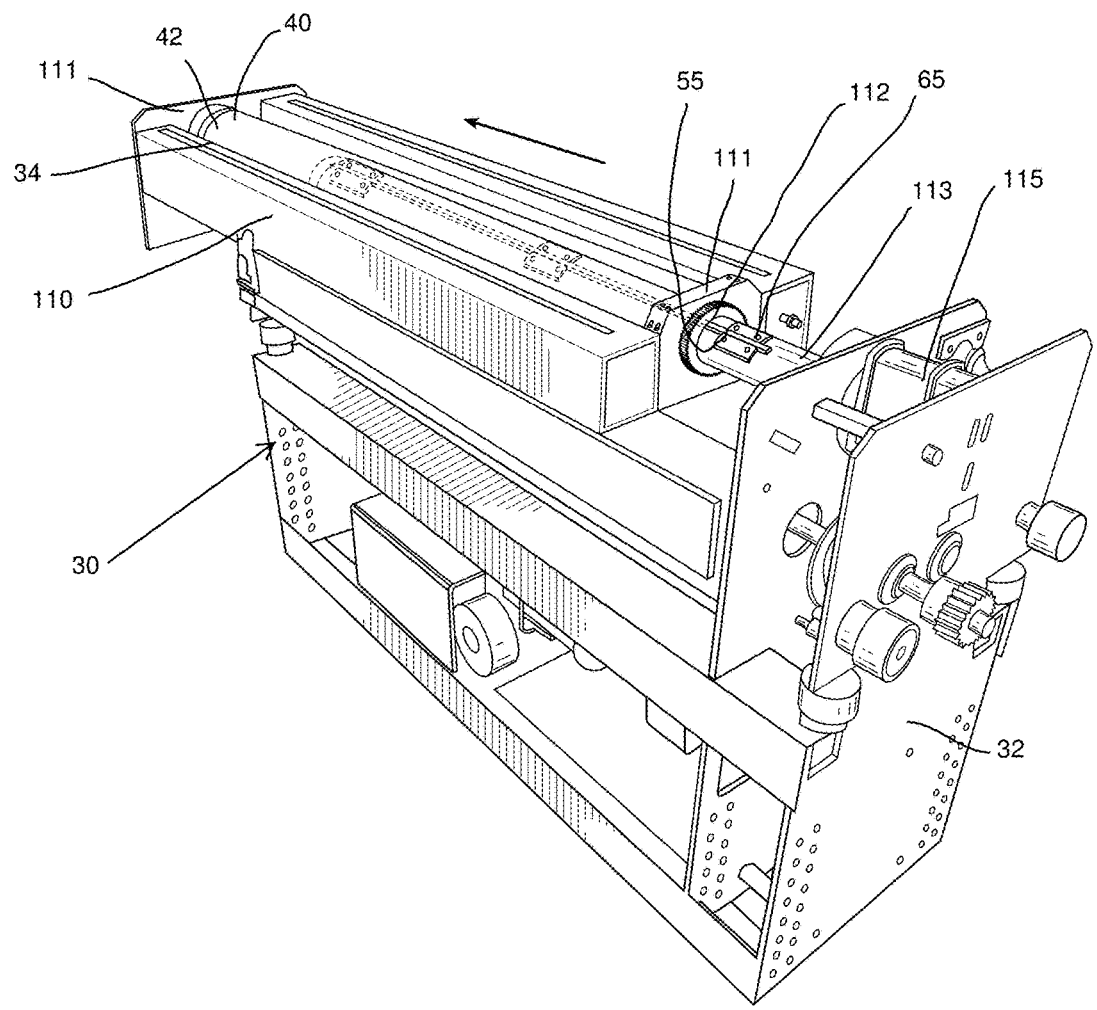
FIG. 47 is a perspective view of the deposition mechanism of FIG. 10 illustrating removal of a resin application module from the deposition mechanism.

The deposition mechanism 30 in the embodiment of FIGS. 31-46 includes a carriage 32 engaged with the track 14 and configured for movement along the track 14 and through the build area 13, a supply 34 of a flowable material 36 mounted on or otherwise operably connected to the carriage 32, an applicator 40 in communication with the supply 34 of the flowable material 36 and configured to apply the flowable material 36 to an application site 41 within the build area 13, and an exposure device 50 configured for emitting electromagnetic waves to solidify the applied material 36 to form the object 11. The supply 34 of the flowable material 36, the applicator 40, and the exposure assembly 60 in the embodiment of FIGS. 31-46 are similar or identical in function and structure to the same components in the embodiment of FIGS. 8-13 and need not be re-described herein in detail. The supply 34 of the flowable material 36 and the applicator 40 in the embodiment of FIGS. 31-46 are connected so as to form an integrated application module 110, also referred to as a resin application module 110, which is removable from the carriage 32 and replaceable with a second application module 110. FIGS. 44-46 illustrate an example of such an application module 110 and the process of removing and replacing the application module 110. FIG. 43 illustrates a portion of the application module 110, including the roller 42 and the structures defining the supply 34. As seen in FIGS. 43-46, the supply 34 is provided in the form of a vat or reservoir with the roller 42 at least partially disposed within the reservoir to be in communication with the flowable resin 36, and the supply 34 can be removed without draining the resin 36 if so desired. The applicator 40 in this embodiment is in the form of an elongated roller 42, and one or both of the ends of the roller 42 is connected to the side walls 111 of the vat 34. The optical fibers 61 pass through an opening 112 extending through one of the side walls 111 and the end of the roller 42 to pass into the interior of the roller 42 to form the array 55 of outlets 54 within the roller 42. The braces 65 and associated supporting structure 113 holding the fibers 61, the micro-lens array 64 and other components of the exposure device 50 remain in place when the application module 110 is removed. It is understood that a side panel 114 of the carriage 32 is removed in this embodiment in order for the application module 110 to be removed, as shown in FIG. 44. The removable side panel 114 in the embodiment of FIGS. 31-46 is on the opposite side of the carriage as the drive assembly 115 that drives rotation of the roller 42. In one embodiment, either or both side panels 114 of the deposition mechanism 30 may include a resin tank connected to the supply 34 to replace used material 36 and/or keep the level of the material 36 constant. The deposition mechanism in FIGS. 8-13 may also include a removable application module 110 as described herein, such as shown in FIG. 47.

After the application module 110 is removed as shown in FIGS. 44-45, the same or a different application module 110 may be replaced in the same manner, as shown in FIG. 46. In one embodiment, a first application module 110 can be removed and replaced with a second application module 110 that has a different characteristic. For example, the second application module 110 may have a differently configured applicator 40 or may have a different flowable material 36, enabling switching of flowable materials 36 without draining, cleaning, and refilling the supply 34. As another example, the application module 110 may be removed for repair or refill and replaced with a backup application module 110 to avoid downtime. In other embodiments, either the supply 34 or the applicator 40 may be independently removable and replaceable using a similar configuration. Other removable configurations may be used in other embodiments.

Figure 34:
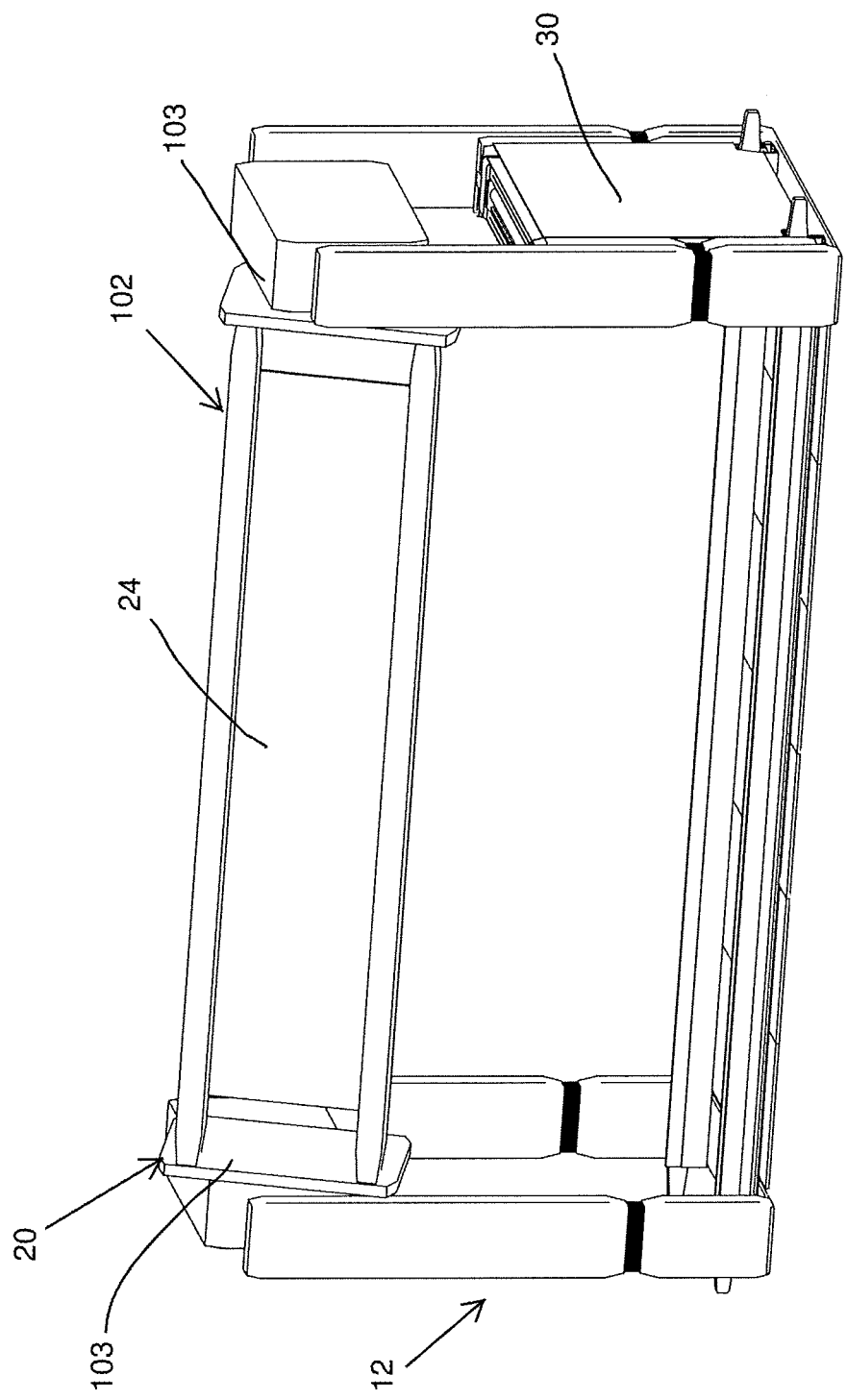
FIG. 34 is a perspective view of a support assembly of the apparatus of FIG. 31, showing movement of a build platform from a build position to a tending position.
Figure 35:
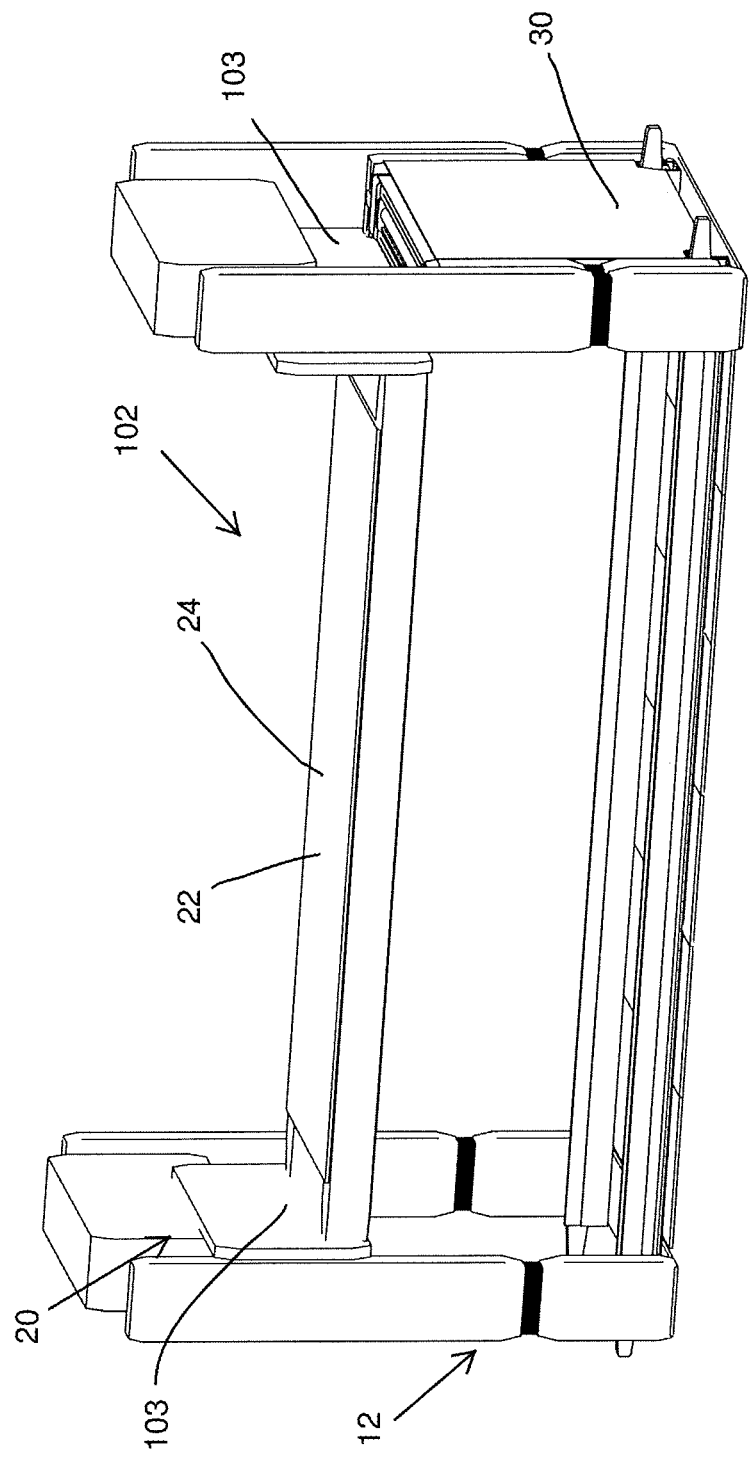
FIG. 35 is a perspective view of a support assembly of the apparatus of FIG. 31, showing the build platform in the tending position.
Figure 36:
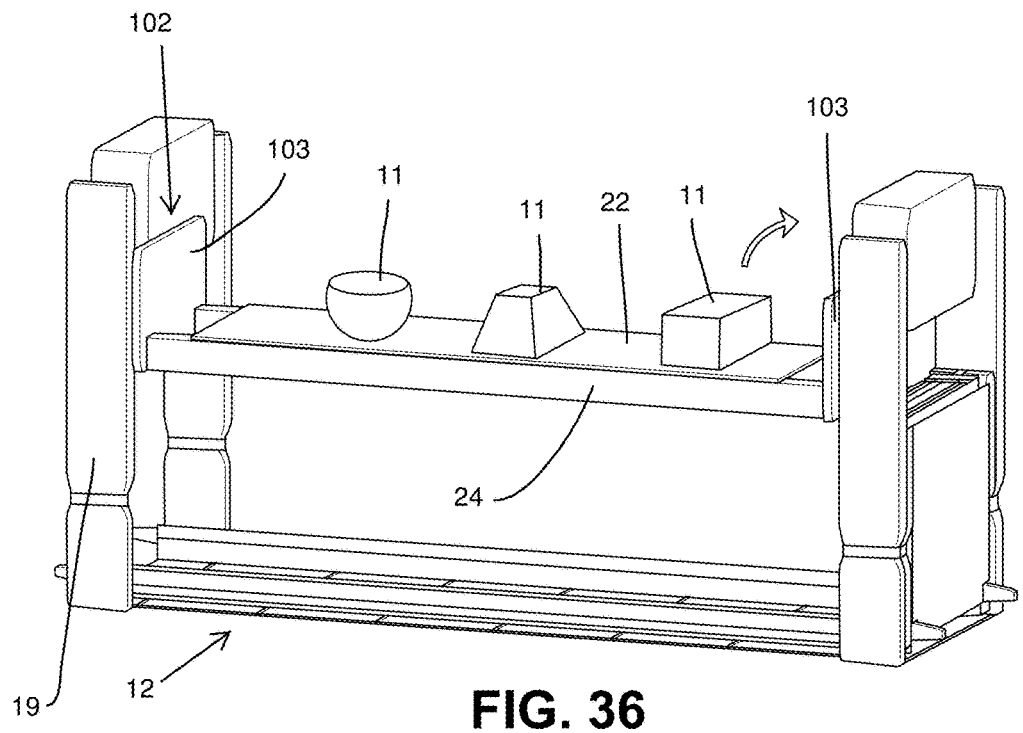
FIG. 36 is a perspective view of the apparatus of FIG. 31 illustrating performance of a tending operation when the build platform is in the tending position.

The support assembly 20 further includes a mechanism 102 for moving the build platform 22 between a build position and a tending position, where the build platform 22 faces toward the track 14 for production of an object 11 in the build position, and the build platform 22 faces away from the track 14 in the tending position, to permit a tending operation to be performed on the object 11. Examples of tending operations include modifying the object 11, such as by material removal, including removal of support structure (e.g., by cutting, machining, etc.), painting, cleaning, or removing the object 11 from the build platform 22, such as if production of the object 11 is completed, or inserting or attaching functional or non-functional components previously manufactured by the same or different process (also referred to as secondary objects), such as RFID chips, magnets, added weights or structural supports, printed circuit boards, liquid tanks, etc. Such a secondary object may be connected in a configuration such that it is not exposed to the waves 53 during continuing production of the object 11 when the build platform 22 is returned to the build position. For example, the secondary object may be inserted within an internal cavity of the partially-built object 11 and/or provided with a protective casing. In one embodiment, the secondary object(s) may be other objects 11 manufactured simultaneously on the same or other build platforms 22 as described herein. In the embodiment of FIGS. 31-46, the mechanism 102 moves the build platform 22 between the build position and the tending position by rotation. FIGS. 31-33 and 37 illustrate the build platform 22 in the build position, FIG. 34 illustrates the build platform 22 being moved from the build position to the tending position, and FIGS. 35 and 36 illustrate the build platform 22 in the tending position in this embodiment.

The mechanism 102 for moving the build platform 22 in the embodiment of FIGS. 31-46 includes a support platform 24 that defines and/or supports the build platform 22 as described herein, with one or more rotating bases 103 connected to the support platform 24 and configured for rotating to move the support platform 24. As shown in FIGS. 31-37, the mechanism 102 includes two rotating bases 103 at opposed ends of the support platform 24 that are configured for rotating in unison about an axis, and the support platform 24 is fixed with respect to the rotating bases 103. The rotating bases 103 are mounted on the base frame 19 and configured to rotate with respect to the base frame 19. The support platform 24 in this embodiment is offset from the axis and parallel to the axis such that the support platform 24 and the build platform 22 orbit the axis when the rotating bases 103 rotate. This orbital action results in the build platform 22 both facing in a different direction and changing in height when moving between the build position and the tending position. The build platform 22 in this embodiment is higher in the build position, in order to permit more build space in the vertical direction, and is lower in the tending position, in order to facilitate manual manipulation of any object(s) 11 on the build platform. In another embodiment, the support platform 24 may be rotationally aligned with the axis of the rotating base(s) 103, such that the support platform 24 rotates rather than orbits in moving between the build position and the tending position. In another embodiment, the support platform 24 may have a different arrangement, such as a cantilever arrangement where only a single rotating base 103 is provided at one end of the support platform 24, or an arrangement where the rotating base(s) 103 are not located at the ends of the support platform 24. In a further embodiment, a different type of movement mechanism 102 may be used.

Figure 62:
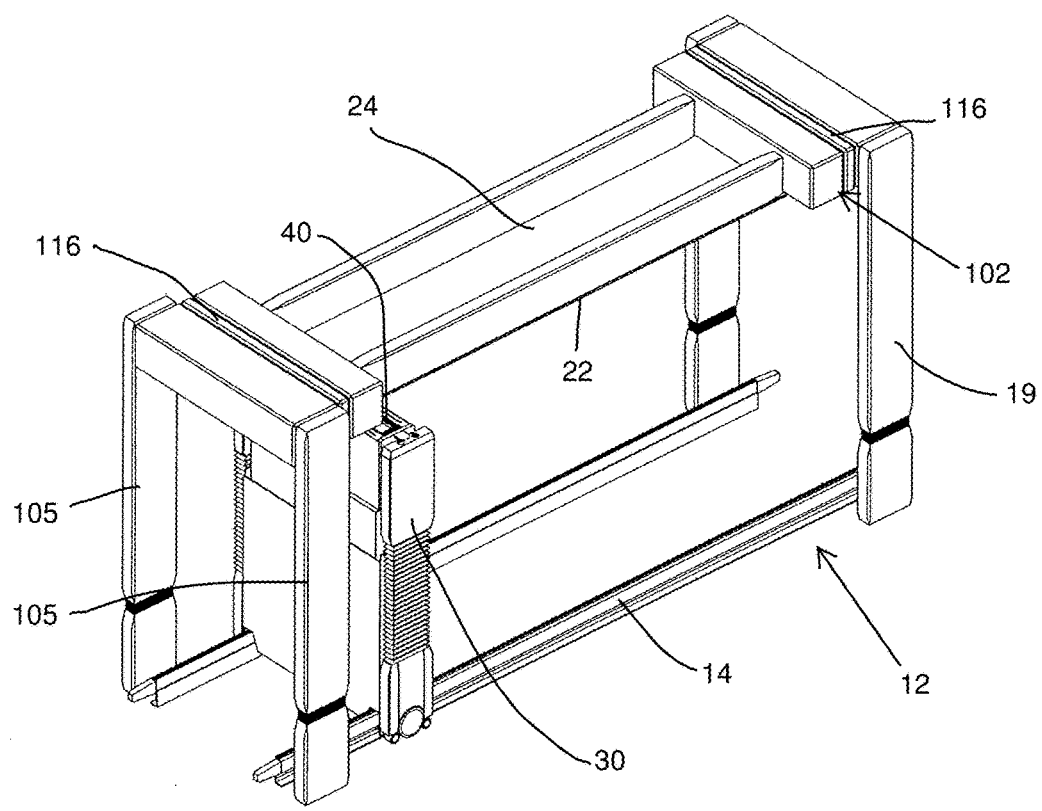
FIG. 62 is a perspective view illustrating another embodiment of an apparatus for producing a three-dimensional object in operation, according to aspects of the disclosure, shown with a build platform in a build position.
Figure 63:
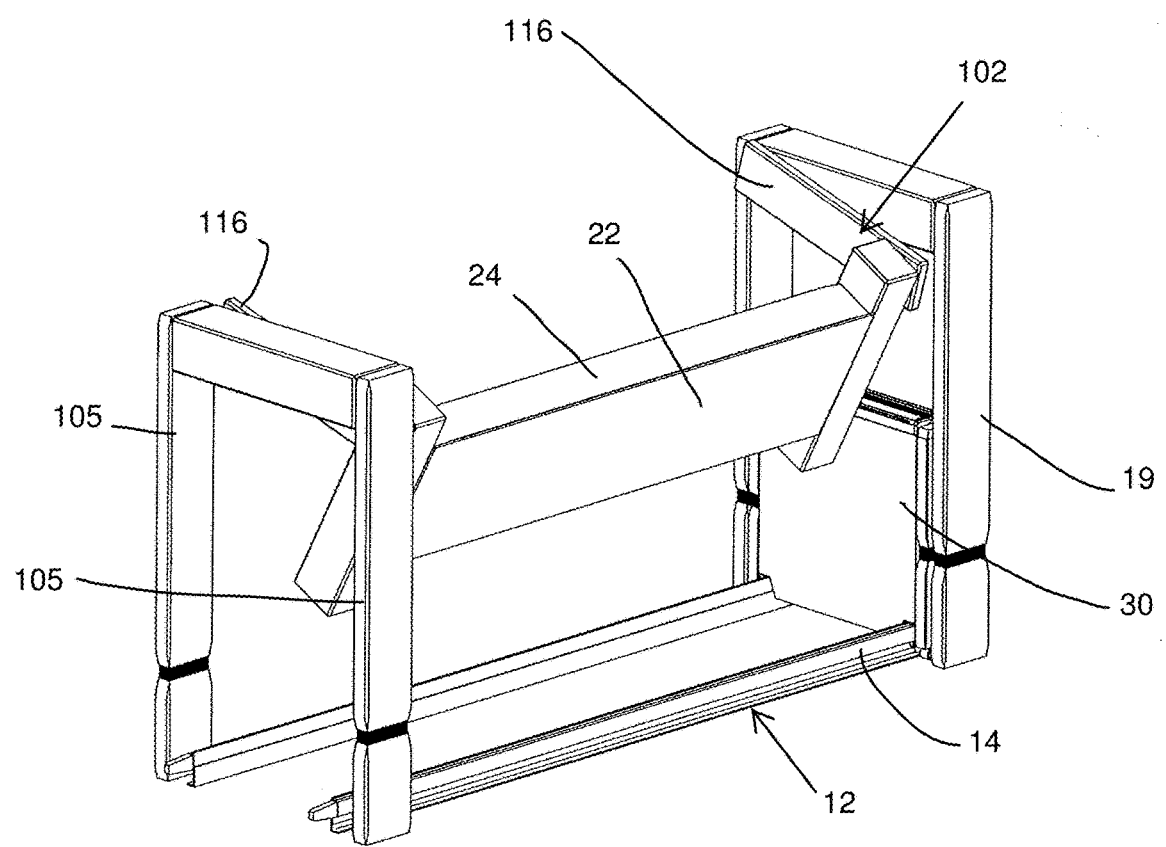
FIG. 63 is a perspective view illustrating the apparatus of FIG. 62 showing movement of the build platform from the build position to a tending position.
Figure 64:
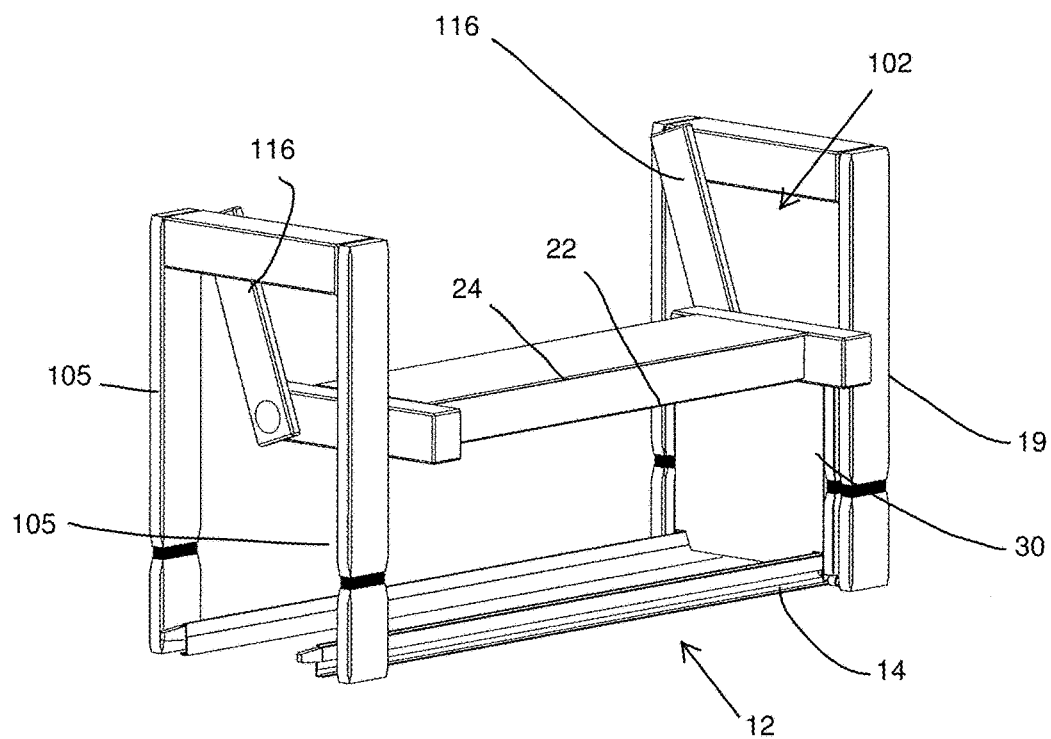
FIG. 64 is a perspective view illustrating the apparatus of FIG. 62 showing the build platform in the tending position.

FIGS. 62-64 illustrate another embodiment of a mechanism 102 for moving the build platform 22 between the build position and the tending position. FIG. 62 illustrates the build platform 22 in the build position, FIG. 63 illustrates the build platform 22 being moved from the build position to the tending position, and FIG. 64 illustrates the build platform 22 in the tending position in this embodiment. In the embodiment of FIGS. 62-64, the mechanism includes one or more pivoting bases (or pivoting arms) 116 connected to the support platform 24 and configured for pivoting to move the support platform 24 upward and downward. As shown in FIGS. 62-64, the mechanism 102 includes two pivoting bases 116 at opposed ends of the support platform 24 that are configured for pivoting in unison about a common axis, and the support platform 24 is configured for pivoting with respect to the pivoting bases 116. The pivoting bases 116 are pivotably mounted on the base frame 19 and configured to pivot with respect to the base frame 19. As shown in FIGS. 63 and 64, in moving from the build position to the tending position, the pivoting bases 116 pivot downward to lower the level of the build platform 22 for ease of access, and the support platform 24 pivots with respect to the pivoting bases 116 to cause the build platform 22 to face upward and/or away from the track 14. Similarly, in moving from the tending position to the build position, the pivoting bases 116 pivot upward to raise the level of the build platform 22, and the support platform 24 pivots with respect to the pivoting bases 116 to cause the build platform 22 to face downward and/or toward the track 14 for use in production. In another embodiment, the support platform 24 may rotate about a central axis on the pivoting bases 116, rather than pivoting, with respect to the pivoting bases 116. The configuration in FIGS. 62-64 permits greater ability to adjust the height of the build platform 22 in the tending position, and also provides more clearance room for an autonomous unit 90 to engage with the track 14 (such as without lowering the applicator 40 as described herein).

Figure 37:
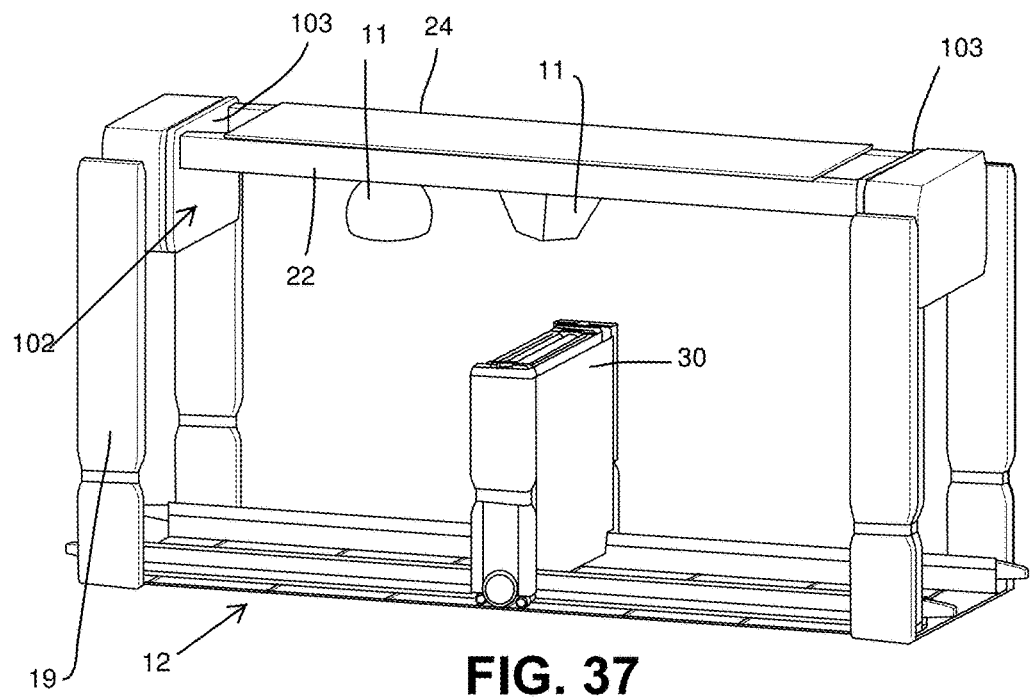
FIG. 37 is a perspective view of the apparatus of FIG. 31 illustrating further production of objects when the build platform is in the build position, after performance of the tending operation in FIG. 36.
Figure 38:
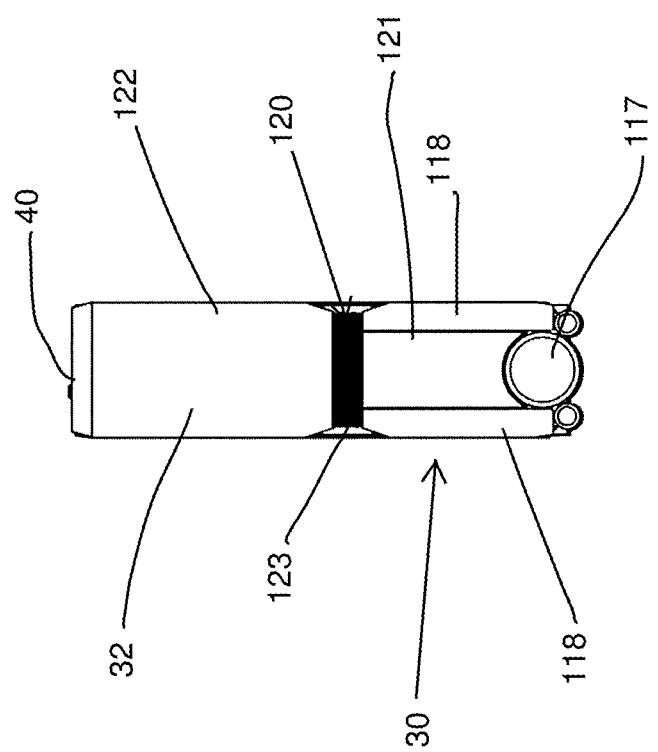
FIG. 38 is a side view of the deposition mechanism of the apparatus of FIG. 31.
Figure 39:
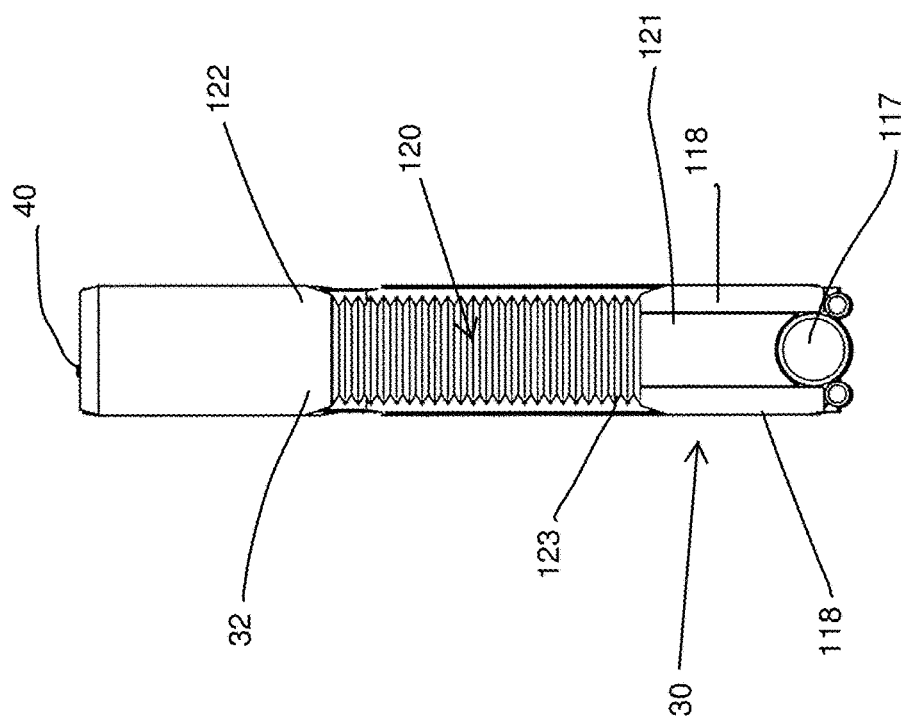
FIG. 39 is a side view of the deposition mechanism of FIG. 38, showing vertical adjustment of the deposition mechanism to a new vertical application location.

FIGS. 34-37 and 62-64 illustrate the build platform 22 and the support platform 24 being rotated 180° between the build position and the tending position, such that the build platform 22 faces downward in the build position and upward in the tending position. In other embodiments, the build platform 22 and the support platform 24 may be oriented differently in the tending position, such as rotating 90° or 135° from the build position. For example, the mechanism 102 for moving the build platform 22 in one embodiment may be configured to provide multiple tending positions at different orientations, such as a first tending position that faces downward (i.e., 180° rotation from the build position 22 as shown in FIGS. 37 and 62), a second tending position that faces laterally outward (i.e., a 90° rotation from the build position 22 as shown in FIGS. 37 and 62), and/or a third tending position at a different angular orientation (e.g., 135° rotation from the build position 22 as shown in FIGS. 37 and 62). In a further embodiment, the mechanism 102 for moving the build platform 22 may be configured to provide the tending position at any desired orientation selectable by the user, and the mechanism 102 may be manually controlled. Any combination of tending positions may be provided by the structures described herein and other embodiments of mechanisms 102 for moving the build platform 22 between the build position and the tending position.

In one embodiment, as shown in FIGS. 36 and 37, the system 10 and apparatus 12 may be used to produce multiple objects 11 simultaneously, including multiple objects that are different from each other and have different build times, build requirements, and/or build heights. As described herein, the apparatus 12 and the deposition mechanism 30 according to various embodiments is capable of producing multiple objects 11 simultaneously, including multiple objects 11 on the same build platform 22 or multiple objects 11 on different build platforms 22 supported by the same support assembly 20. In the apparatus 12 of FIGS. 31-46, the multiple objects 11 can be built with the build platform 22 in the build position, as shown in FIG. 37. When a tending operation is necessary on one or more of the objects 11, the build platform 22 can be moved to the tending position, as shown in FIG. 36, and the tending operation may be performed. FIG. 36 illustrates a tending operation in the form of removal of one of the objects 11 for which building is complete, and it is understood that additional tending operations may be performed on any of the objects 11, including the objects 11 not removed at this stage. When the tending operation is complete, the build platform 22 can be returned to the build position, as shown in FIG. 37, which illustrates the apparatus 12 continuing to build the two remaining incomplete objects 11. This permits different objects to be simultaneously manufactured.

Figure 41A:
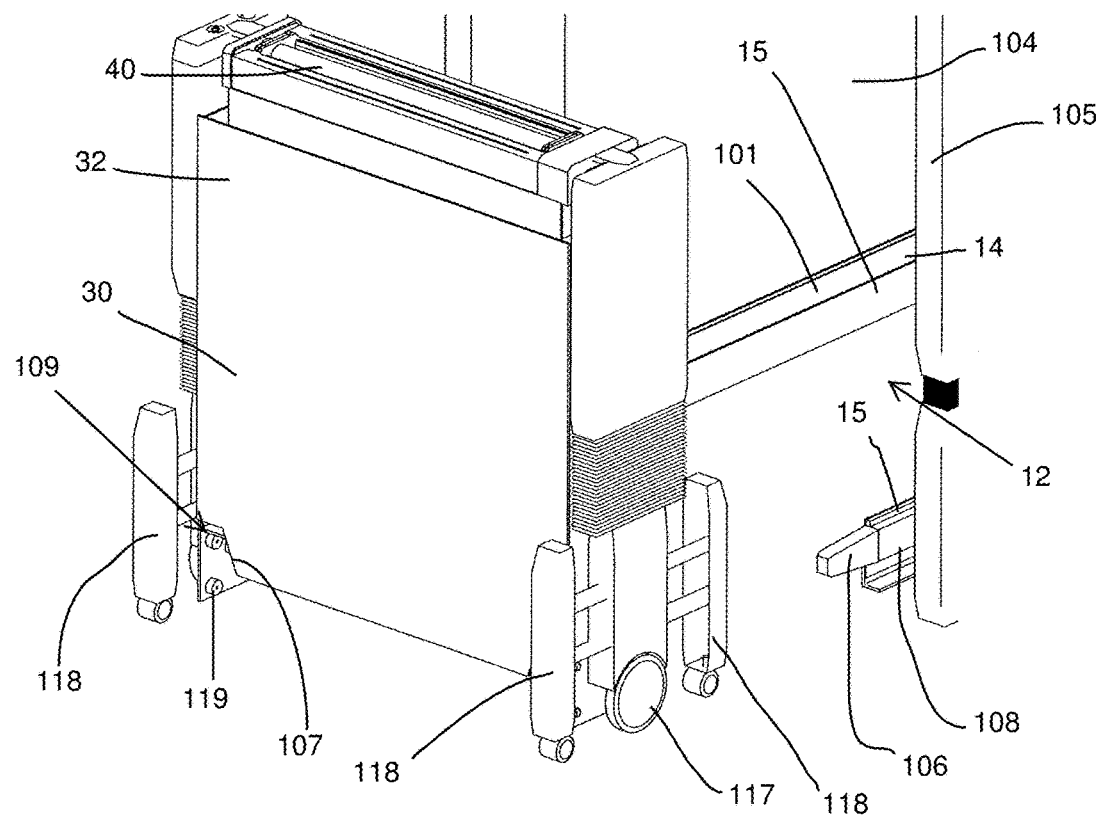
FIG. 41A is a partial perspective view of the deposition mechanism of FIG. 40 preparing to engage with a track of the support assembly.
Figure 41B:
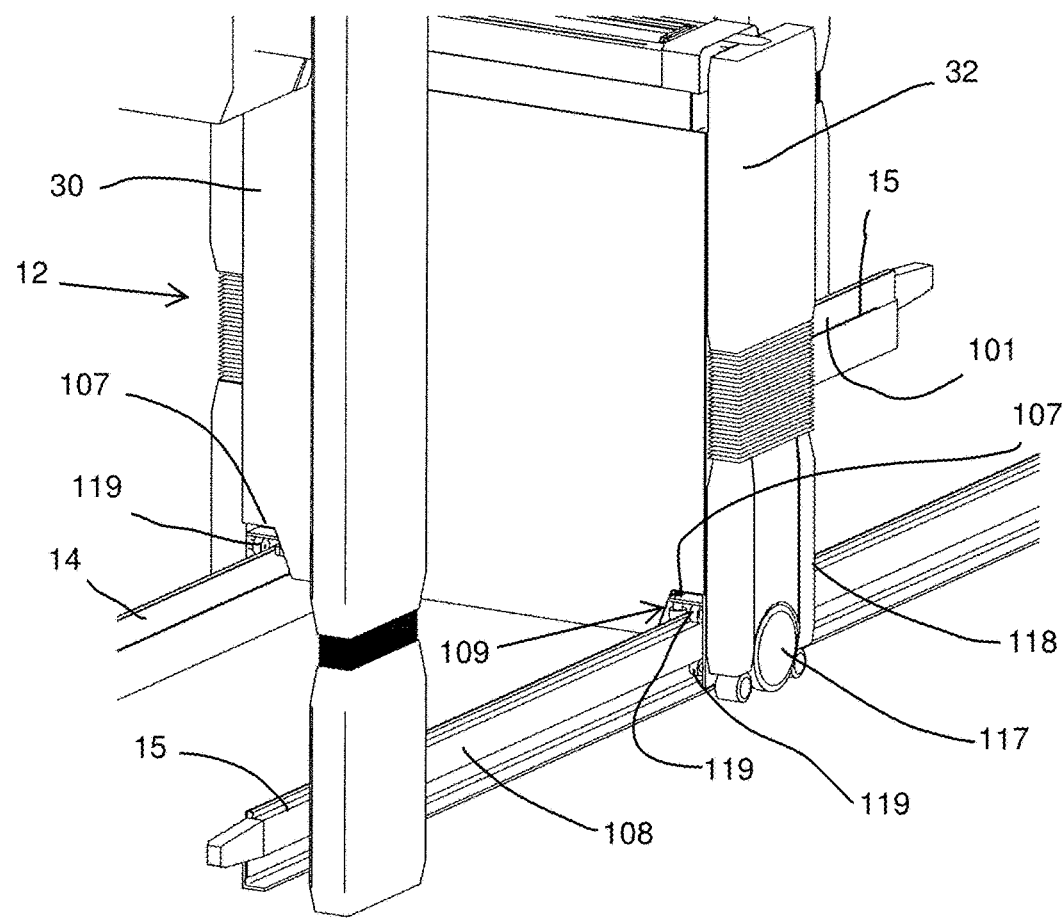
FIG. 41B is a partial perspective view of the deposition mechanism of FIG. 41 after engaging with the track of the support assembly.

The track 14 in the embodiment of FIGS. 31-46 is configured to be "open" to allow a deposition mechanism 30 (such as the autonomous unit 90) to engage and disengage with the track 14 as desired. The track 14 may be considered to have an open end at one or both ends, where the deposition mechanism 30 can be engaged and disengaged with the track 14. As shown in FIGS. 41A-42, the base frame 19 provides an opening 104 defined between two vertical columns 105 at one or both ends of the track 14 to permit the deposition mechanism 30 to engage with the track through the base frame 19. The opening 104 is also present between the rails 15 of the track 14. The rails 15 of the track 14 shown in FIGS. 31-46 extend outwardly beyond the opening 104 and/or beyond the adjacent portion of the base frame 19 and have ends 106 that are tapered on one or more surfaces to ease engagement of the carriage 32 with the track 14. The carriage 32 has a track engagement mechanism 109 that is configured to engage the track 14 to permit movement of the deposition mechanism 30 along the track 14. The carriage 32 in the embodiment of FIGS. 31-46 includes slots 107 that are configured to receive the ends 106 during engagement of the track engagement mechanism 109 with the track 14 and to further receive a portion of the respective rail 15 when the carriage 32 is engaged with the track 14. The rails 15 in the embodiment of FIGS. 31-46 each have a flange or other outwardly extending portion 108 that is received in the slot 107, and the track engagement mechanism 109 has wheels, rollers, sliders, gears, sprockets or other engagement structures positioned within the slots 107 and engaging the rails 15 on multiple surfaces, including the bottom and/or inner sides of the outwardly extending portion 108. As shown in FIGS. 41A-B, the track engagement mechanism 109 in the embodiment of FIGS. 31-46 includes rollers 119 that engage the top and inner surfaces of the rails 15 and the undersides of the outwardly extending portions 108 to stabilize the carriage 32 with respect to the track 14. The locomotion of the carriage 32 along the track 14 is provided by the track engagement mechanism 109, which includes a locomotion mechanism that engages the track 14, such as wheels, gears, sprockets, etc. In one embodiment, the deposition mechanism 30 includes a circular gear that engages a linear gear on the or each rail 15 to drive motion of the carriage 32 along the track 14. In other embodiments, the locomotion of the carriage 32 along the track 14 may be provided by powered wheels 117 or by linear induction motors, among other mechanisms. The track engagement mechanism 109 in one embodiment further may have one or more electrical contacts (not shown) for engaging and drawing power from the bus bar(s) 101. The deposition mechanism 30 may be powered by other mechanisms, including an internal power source, a temporary umbilical power connection, and/or a contactless inductive power supply. Other track engagement mechanisms 109 may be used in other embodiments, including different locomotion mechanisms, and it is understood that the track 14 and the track engagement mechanism 109 may be designed in a complementary manner.

The deposition mechanism 30 in FIGS. 31-46 is configured to be an autonomous unit 90 that may be moveable independently of the track 14 in some circumstances, as described herein with respect to FIG. 28. FIGS. 40-41B illustrate movement of the deposition mechanism 30 independently of the track 14 and engagement of the deposition mechanism 30 with the track 14. As illustrated in FIG. 42, multiple deposition mechanisms 30 can be used on the track 14 simultaneously. Such multiple deposition mechanisms 30 may be configured for making multiple passes in opposite directions or for making a single pass. For example, a deposition mechanism 30 may engage with one end of the track 14, make a single pass of the build area 13, and then exit the track 14 at the opposite end to either move along to a different task (e.g., another apparatus) or to re-engage the track 14 again at the first end. It is contemplated that a continuous train of deposition mechanisms 30 could sequentially pass the build area 13, with each deposition mechanism 30 making a single pass and returning to re-engage the track 14 in order to make another pass. In a further embodiment, the apparatus 12 may use a mix of deposition mechanisms including autonomous units 90 that can be disengaged from the track 14 and non-autonomous and/or permanent deposition mechanisms 30 that cannot be readily disconnected from the track 14.

As described above, the deposition mechanism 30 may be moveable separately and independently from the track 14 in the embodiment of FIGS. 31-46, where the deposition mechanism 30 is provided as an autonomous unit 90. In this embodiment, the deposition mechanism 30 uses a ground engagement mechanism for support and locomotion independently of the track 14. The ground engagement mechanism in the embodiment of FIGS. 31-46 uses the wheels 117 for locomotion independently from the track 14, e.g., on the surface on which the apparatus 12 sits. The ground engagement mechanism in FIGS. 31-46 also includes stabilizers 118 on the front and rear sides of the wheels 117 to stabilize the deposition mechanism 30 and resist tipping during movement by the wheels 117 apart from the track 14. In this embodiment, the stabilizers 118 are retractable when not needed, i.e., the stabilizers 118 are moveable between an extended position, shown in FIGS. 33 and 39, for use in movement apart from the track 14 and a retracted position, shown in FIGS. 31, 32, and 38, when the deposition mechanism 30 is engaged with the track 14. The stabilizers 118 may include additional wheels, casters, sliders, or other structures to enable ground engagement while in motion. In other embodiments, the deposition mechanism 30 may include different ground engagement mechanism(s), including tracks, moveable legs, or other such structures.

The deposition mechanism 30 in the embodiment of FIGS. 31-46 has a vertical adjustment mechanism 120 that is configured for adjusting the position of the applicator 40 and/or other components of the deposition mechanism 30 in the vertical direction, i.e., parallel to the build direction in the embodiment illustrated. This configuration differs from the configurations illustrated in FIGS. 8-11 and 15-18, where vertical adjustment is performed by adjusting the position of the build platform 22. The deposition mechanism 30 in FIGS. 31-46 has a bottom portion 121 that is engaged with the track 14 and/or the ground and a top portion 122 that is supported by the bottom portion 121 and is moveable in the vertical direction with respect to the bottom portion 121. The top portion 122 includes at least the applicator 40, the supply 34 of flowable material 36, and the outlets 54 in the embodiment of FIGS. 31-46, such that at least these components move in the vertical direction with the top portion 122. The vertical adjustment mechanism 120 moves the top portion 122 with respect to the bottom portion 121. In the embodiment of FIGS. 31-46, the vertical adjustment mechanism 120 includes two lifts 123 on opposite sides of the deposition mechanism 30. These lifts 123 may include telescoping structure and may be powered by a variety of different mechanisms, including hydraulic or pneumatic cylinders, jack screws, sprocket/chain drive, gears, etc. In other embodiments, the build platform 22 of FIGS. 31-46 may additionally or alternately be configured for vertical adjustment as described elsewhere herein. For example, the build platform 22 is not configured for vertical adjustment in the embodiment of FIGS. 31-46, but may be so configured in other embodiments, in addition to or instead of the vertical adjustment of the deposition mechanism 30. In one embodiment, both the build platform 22 and the deposition mechanism 30 may be configured for vertical adjustment, to further increase the potential vertical size of an object 11 to be built. In this configuration, the build platform 22 may be configured for vertical adjustment only when the vertical adjustment range of the deposition mechanism 30 is insufficient for the build requirements, or vice-versa.

The build platform 22 may be configured for movement to permit production of larger and/or more numerous objects than would be enabled by the size of the track 14 in some embodiments. For example, in one embodiment, shown in FIGS. 48A-B, the build platform 22 is provided on a support platform 24 that has multiple build platforms 22 and is moveable to selectively position different build platforms 22 in the build area 13 for production of different objects 11. As shown in FIG. 48A, the support platform 24 is rotatable to position a first build platform 22A within the build area 13 to produce a first object 11A, and can then rotate to place one of three additional build platforms 22B-D in the build area 13 to produce one of three other objects 11B-D. This configuration permits a single deposition mechanism 30 and/or a single track 14 with multiple deposition mechanisms 30 to produce objects 11 or portions of objects sequentially. This provides the advantage of allowing production of one object 11A and then immediately commencing production of a second object 11B, without waiting for the completed object 11A to be removed from the build platform 22A, which can be done at a later time. This also provides the advantage of allowing one or more deposition mechanisms 30 to produce a first portion of multiple objects 11 sequentially, then switching the deposition mechanism(s) 30 to produce a different portion of the objects 11 (e.g., that may be made from a different material), reducing the number of times that the deposition mechanism(s) 30 need to be modified or switched during the course of producing multiple objects.

Figure 49C:
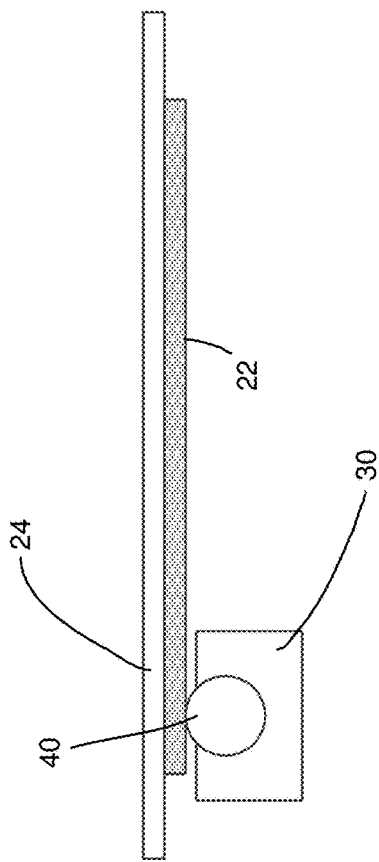
FIGS. 49C and 49D are side schematic views of another embodiment of an apparatus for producing a three-dimensional object in operation, according to aspects of the disclosure.
Figure 49D:
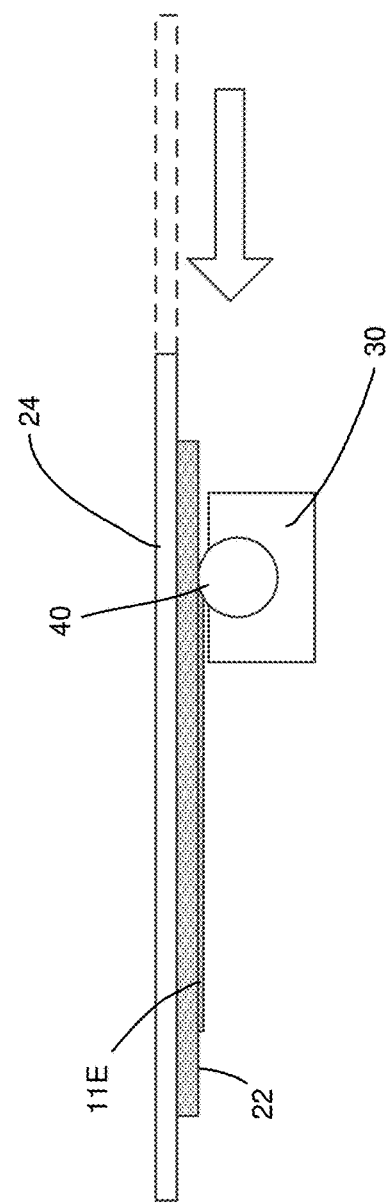

As another example, the build platform 22 may be positioned on a support platform 24 that is moveable in one or more directions, as shown in FIG. 49A-D. In the embodiment of FIGS. 49A-B, the support platform 22 is moveable laterally (i.e., in the y-direction). In this embodiment, the deposition mechanism(s) 30 may make one or more passes through the build area 13 to produce a first object or portion of an object 11E, then the build platform 22 and/or the support platform 24 may be shifted laterally to permit production of a second object or portion of an object 11F. It is understood that FIGS. 49A-B are viewed along the x-direction, i.e., the direction of movement of the deposition mechanism 30. The lateral movement shown in FIGS. 49A-B can permit operation of the deposition mechanism(s) 30 to build multiple different objects 11 on the same or different build platforms 22, or to build portions of a single object 11 that is wider than the build area. In the embodiment of FIGS. 49C-D, the build platform 22 is moveable horizontally (i.e., in the x-direction). In this embodiment, the deposition mechanism(s) 30 may be stationary, and the build platform 22 and/or the support platform may be shifted horizontally to apply the material 36. In other words, relative movement between the deposition mechanism(s) 30 and the build platform 22 is accomplished via movement of the build platform 22 rather than movement of the deposition mechanism(s). This configuration may be practiced with a moveable deposition mechanism 30 as described herein that is held stationary for production, and may be connected to an "open" track 14 as described herein, or alternately, this configuration may be practiced with a permanently stationary deposition mechanism 30. It is understood that in the embodiments of FIGS. 49A-D, the vertical adjustment may be accomplished via adjustment of the height of the applicator 40, the height of the build platform 22, or a combination. In a further embodiment, the build platform movement of FIGS. 49A-B may be combined with the movement of FIGS. 49C-D, offering further increase in potential size of the build area 13.

Figure 50:
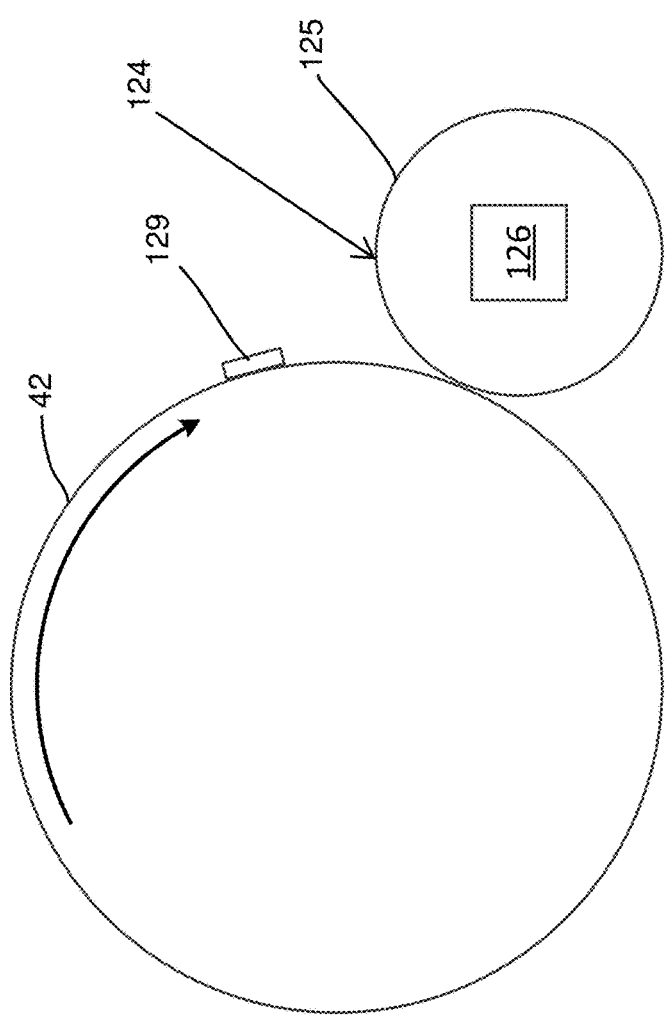
FIG. 50 is a side schematic view of one embodiment of a buildup sensor configured for use in connection with a deposition mechanism for producing a three-dimensional object in operation, according to aspects of the disclosure.

The apparatus 12 may include a material buildup sensor 124 in one embodiment, configured to sense buildup of material (e.g., cured resin) on the applicator 40. For example, as shown in FIG. 50, when a roller 42 is used, material 129 that is cured by the exposure device 50 may inadvertently adhere to the roller 42. This adhered material 129 can cause further buildup and negatively affect the quality of the object 11. In the embodiment of FIG. 50, a contact member 125 may be positioned so that any discontinuity on the surface of the roller 42 (e.g., material 129) will cause displacement of the contact member 125, thus allowing the discontinuity to be sensed by a displacement sensor 126 configured to sense displacement of the contact member 125. The contact member 125 in the embodiment of FIG. 50 is shown as a contact roller, but other contact members may be used in other embodiments, such as sliders, fibers, etc. Other non-contact based buildup sensors 124 may be used in other embodiments, such as optical sensors, conductivity/resistance sensors, or other sensors. A material buildup sensor 124 as described herein may be incorporated into the deposition mechanism 30 in one embodiment, or may be provided separately from the deposition mechanism 30 in another embodiment.

Figure 51:
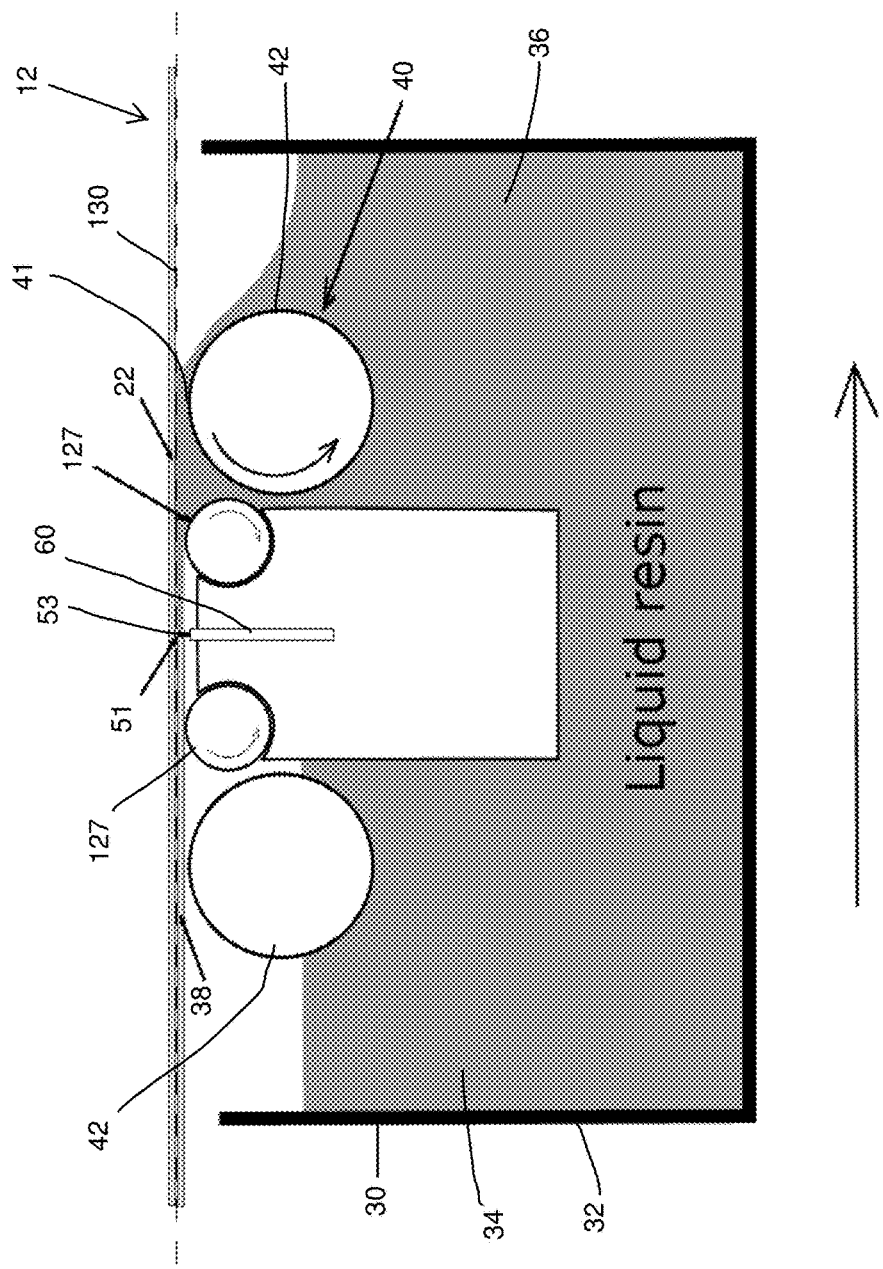
FIG. 51 is a side schematic view of another embodiment of an apparatus for producing a three-dimensional object in operation, according to aspects of the disclosure.
Figure 52:
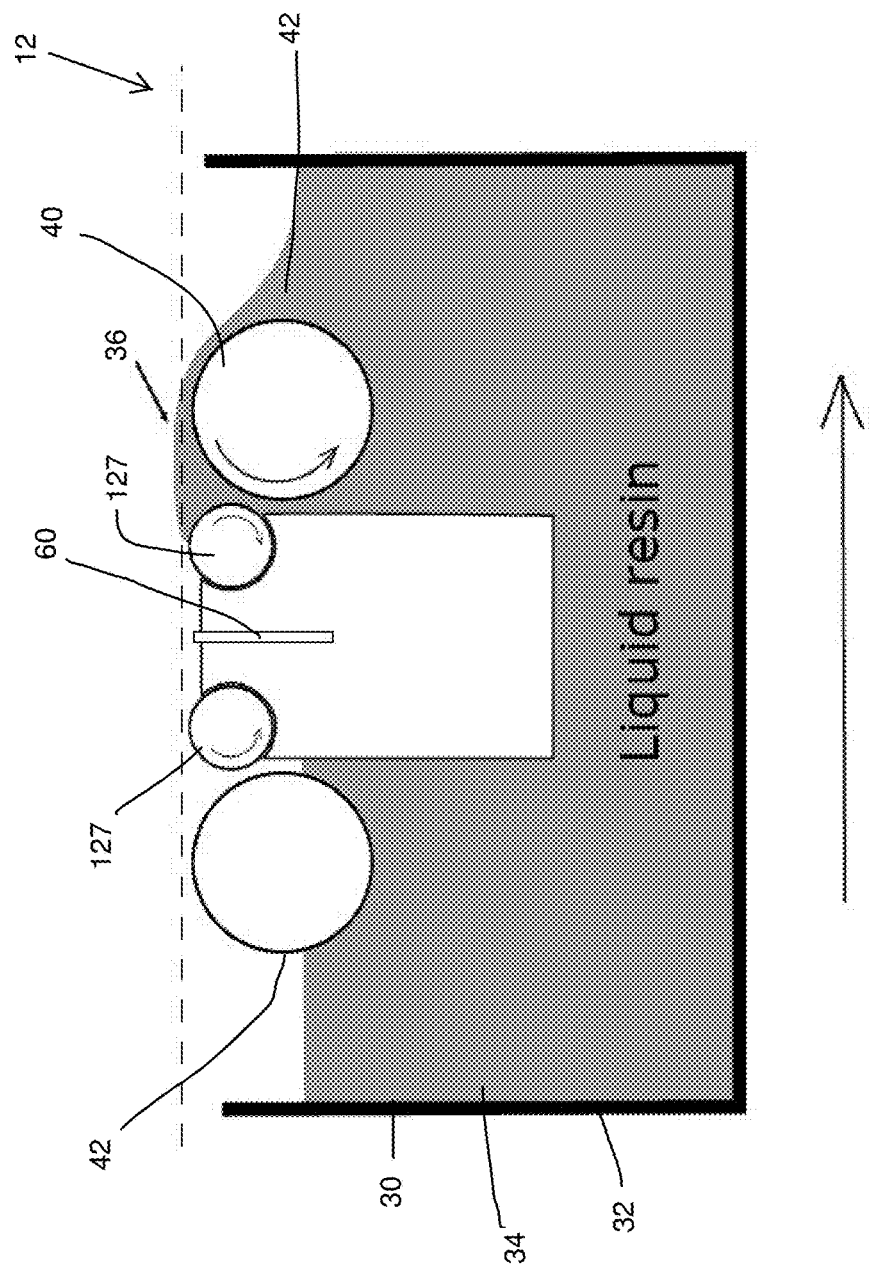
FIG. 52 is a side schematic view illustrating operation of the apparatus of FIG. 51 away from a build platform.
Figure 53:
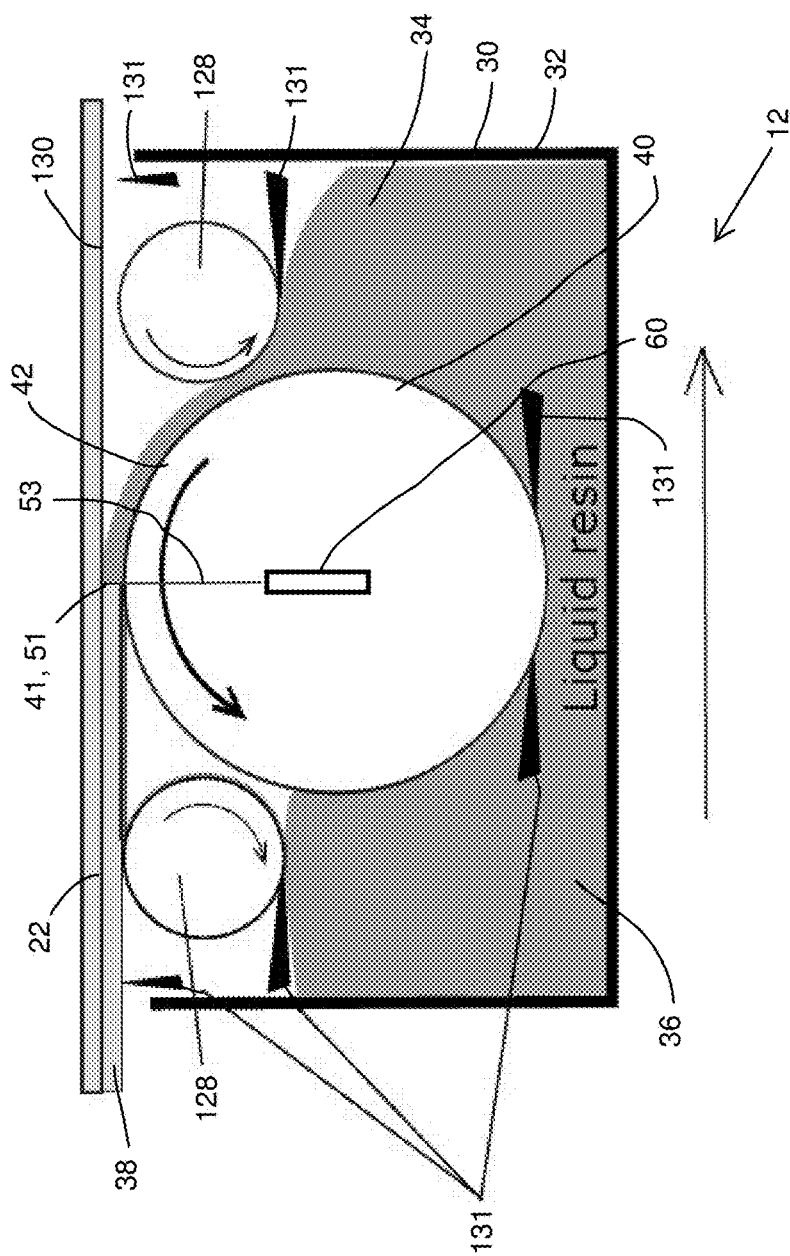
FIG. 53 is a side schematic view of another embodiment of an apparatus for producing a three-dimensional object in operation, according to aspects of the disclosure.

In another embodiment, the deposition mechanism 30 may be configured with a leveling device 127 to provide greater control over the thickness of the material 36 applied by the applicator 40. FIGS. 51-52 illustrate one embodiment of an apparatus with a leveling device 127, and FIG. 53 illustrates another such embodiment. In the embodiment of FIGS. 51-52, the deposition mechanism 30 includes an applicator 40 in the form of a roller 42 that rotates to carry the flowable material 36 from the supply 34 to the build area 13, an exposure device 50 for solidifying the flowable material 36, and a leveling device 127 in the form of a leveling roller 128 located between the roller 42 and the outlet 54 of the exposure device 50. In this embodiment, the roller 42 carries the flowable material 36 to the surface 130 to which the material 36 is to be applied (i.e., the build platform 22 or the surface of the object 11), and the leveling roller 128 rotates in the opposite direction from the roller 42 to move any excess material 36 back into the supply 34. The movement of the carriage 32 causes the exposure device 50 to solidify the material 36 after the material 36 has passed the leveling roller 128, and the spacing between the leveling roller 128 and the surface 130 approximately sets the thickness of the applied layer 38. As shown in FIG. 52, when there is no surface 130 for application of the material 36, the rotation of the leveling roller 128 pushes all of the material 36 back into the supply 34. It is understood that increased adherence between the material 36 and the surface 130 may assist in forming the object 11 using a deposition mechanism 30 as shown in FIGS. 51-52, as an air gap exists between the applied material 36 and the deposition mechanism 30 at the intersection point between the waves 53 and the material 36. In this embodiment, the application site 41 may be spaced from the exposure site 51, and it is understood that the outlet 54 may be aimed in the leading direction as described herein in order to move the exposure site 51 at or nearer to the application site 41. The deposition mechanism 30 further includes a second roller 42 and leveling roller 128 on the opposite side of the carriage 32 (i.e., the left side in FIGS. 51 and 52). The second roller 42 does not spin when trailing the application site 41 to avoid moving excess material 36 toward the surface 130. When the carriage 32 moves in the opposite direction (i.e., right to left in FIGS. 51-52), the second (leading) roller 42 rotates and the trailing roller 42 is still. The deposition mechanism 30 in FIGS. 51-52 can therefore apply the material 36 while traveling in two opposite directions.

FIG. 53 illustrates another embodiment of a deposition mechanism 30 that uses a leveling device 127 in the form of two leveling rollers 128. In this embodiment, the applicator 40 is in the form of a roller 42 that carries the material 36 toward the surface 130, and the leveling roller 128 on the leading side rotates the opposite direction as the roller 42 to remove excess material 36 from the roller 42. The spacing between the roller 42 and the leveling roller 128 approximately sets the thickness of the applied layer 38. The deposition mechanism 30 includes a second leveling roller 128 on the opposite side of the carriage 32 (i.e., the left side in FIG. 53) that performs the leveling function when the carriage 32 is moving in the opposite direction (i.e., right to left in FIG. 53). Additionally, the trailing leveling roller 128 provides the further function of removing unsolidified material (e.g., uncured resin) from the surface of the applied layer 38 after exposure. It is understood that the roller 42 will rotate in the opposite direction when the carriage is moving in the opposite direction. The deposition mechanism 30 in FIGS. 51-52 can therefore apply the material 36 while traveling in two opposite directions. The deposition mechanism 30 further includes a plurality of wipers or squeegees 131 configured for wiping excess material 36 from various surfaces, including the surface of the roller 42, the surfaces of the leveling rollers 128, and the surface of the applied layer 38. The deposition mechanism 30 may also include a vacuum squeegee (not shown) or other vacuum-based material removal device as described herein, trailing the final wiper 131. This vacuum device may further include a recovery tank for storing unused material 36 removed by the vacuum device, and it is understood that any of the vacuum-based material removal devices described herein (including vacuum squeegees 82) may include such a recovery tank.

The exposure device 50 and associated structures for transmission and direction of the electromagnetic waves 53 may be configured for adjustability to provide improved performance and/or versatility to the deposition mechanism 30. Such adjustability may include adjustability in the selection, arrangement, power output, aiming direction, and/or other aspects and properties of the exposure device 50 and associated structures (including the outlets 54). FIGS. 54-61B illustrate various embodiments providing such adjustability, and it is understood that aspects of the embodiments of FIGS. 54-61B may be used in combination with each other and with other embodiments described herein, including other adjustable configurations (and applications thereof) already described herein.

Figure 54:
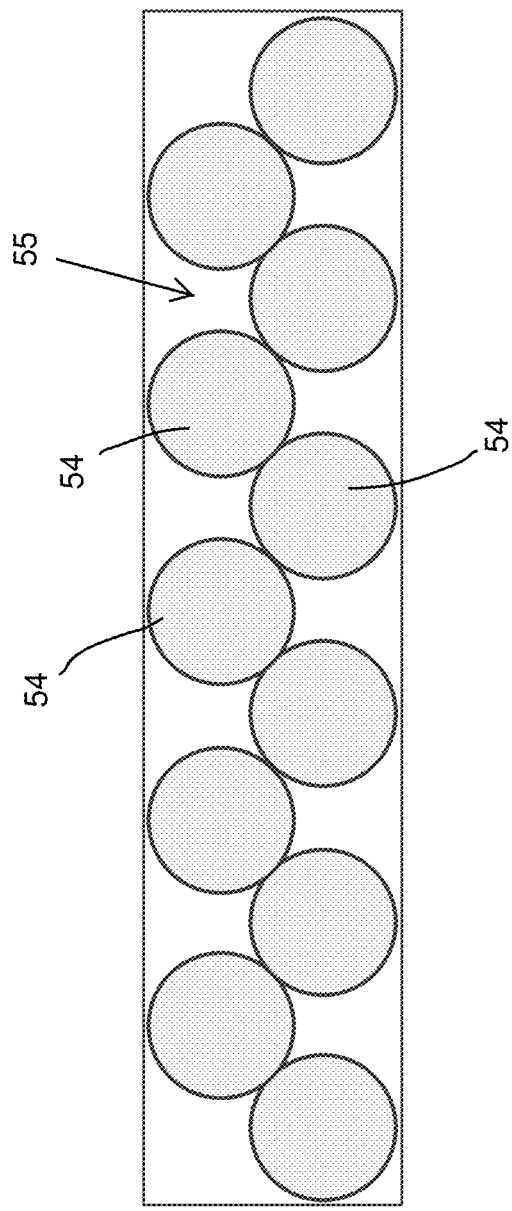
FIG. 54 is a plan schematic view of one embodiment of an exposure device for use in connection with an apparatus for producing a three-dimensional object in operation, according to aspects of the disclosure.

FIG. 54 illustrates one embodiment an arrangement of the array 55 of the outlets 54 of the exposure assembly 60 that can provide improved resolution in part production. The outlets 54 in the embodiment of FIG. 54 are staggered with respect to each other, such that each outlet 54 of the array 55 is overlapped laterally (i.e., in the y-direction) by at least one other outlet 54. As shown in FIG. 54, all outlets 54 other than the outlets 54 on opposite ends of the array 55 are overlapped on both edges by other outlets 54. This arrangement permits the lateral (y-direction) extremities of the exposure area to be more precisely selected, improving the resolution of the exposure assembly 60. The staggering of the outlets 54 also permits a greater number of outlets 54 to be placed into a given lateral width as compared to a single row, thus improving the total power output of the array 55.

Figure 55:
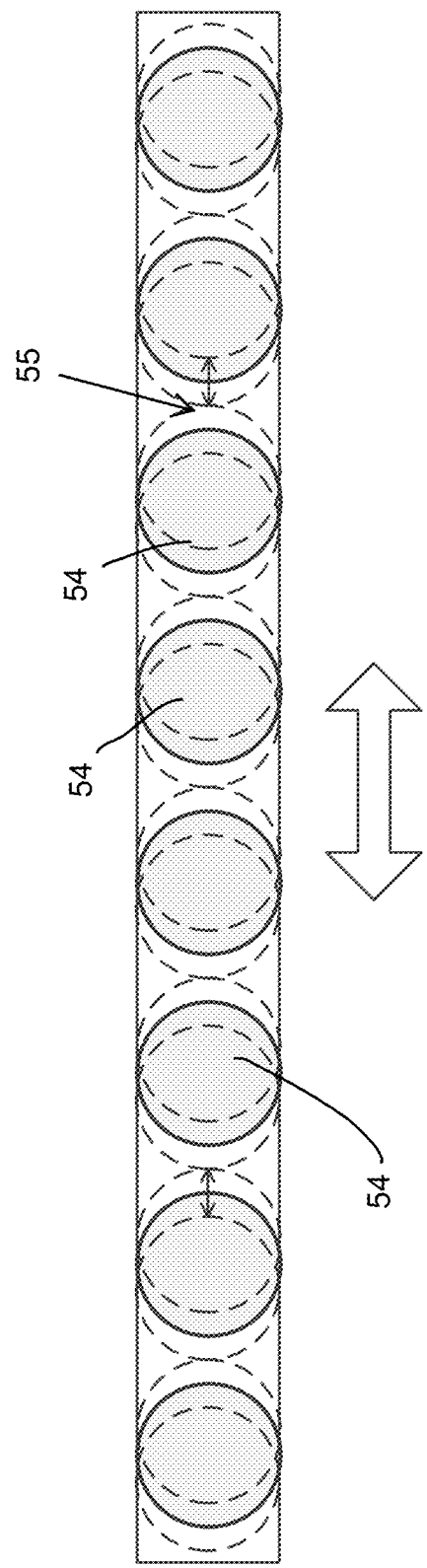
FIG. 55 is a plan schematic view of another embodiment of an exposure device for use in connection with an apparatus for producing a three-dimensional object in operation, according to aspects of the disclosure.

FIG. 55 illustrates an embodiment of an array 55 of the outlets 54 of the exposure assembly 60 that are configured for positional adjustment in the y-direction. In one embodiment, this positional adjustment may be accomplished by mounting the array 55 on a structure that is configured for translational/sliding movement in one embodiment, which sliding movement may be actuated by a piston, jack screw, or other structure configured for one-dimensional movement. In another embodiment, this positional adjustment may be accomplished by mounting the array 55 on a structure that is configured for angular/tilting movement, which may be actuated by a piston, jack screw, or other structure configured to raise and lower one or both lateral ends of the array 55. In a further embodiment, the outlets 54 may be adjustable individually or in discrete groups or clusters. The outlets 54 may further be configured for rapid reciprocation in the y-direction, permitting a single outlet 54 to direct waves 53 at an area that is enlarged in the y-direction. This y-direction adjustment and/or reciprocation permits the lateral (y-direction) extremities of the exposure area to be more precisely selected, improving the resolution of the exposure assembly 60. It is understood that the array 55 may include a larger number of rows and/or different offset arrangements in other embodiments.

Figure 56:
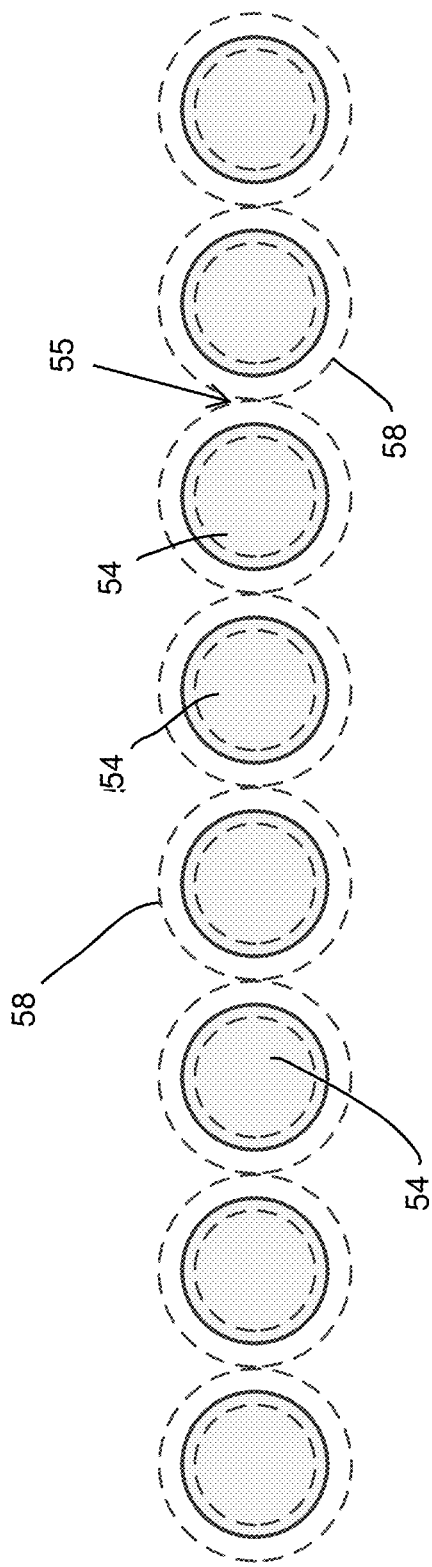
FIG. 56 is a plan schematic view of another embodiment of an exposure device for use in connection with an apparatus for producing a three-dimensional object in operation, according to aspects of the disclosure.

FIG. 56 illustrates an embodiment of an array 55 of the outlets 54 of the exposure assembly 60 that are configured for adjustment in output power. This adjustment in output power may be accomplished by varying the output power of the exposure device 50. In one embodiment, the adjustment in output power may be configured to adjust the size of the exposure area 58 of each outlet 54, thereby permitting the lateral (y-direction) extremities of the exposure area to be more precisely selected, improving the resolution of the exposure assembly 60. As seen in FIG. 56, the size of the exposure area 58 may be increased or decreased (indicated by broken lines) by increasing or decreasing the output power, respectively. In another embodiment, the adjustment in output power may be customized to the properties of the flowable material 36, as some materials 36 may require larger or smaller amounts of power for solidification. It is understood that other factors, such as travel speed of the deposition mechanism 30, may influence the desired output power.

Figure 57:
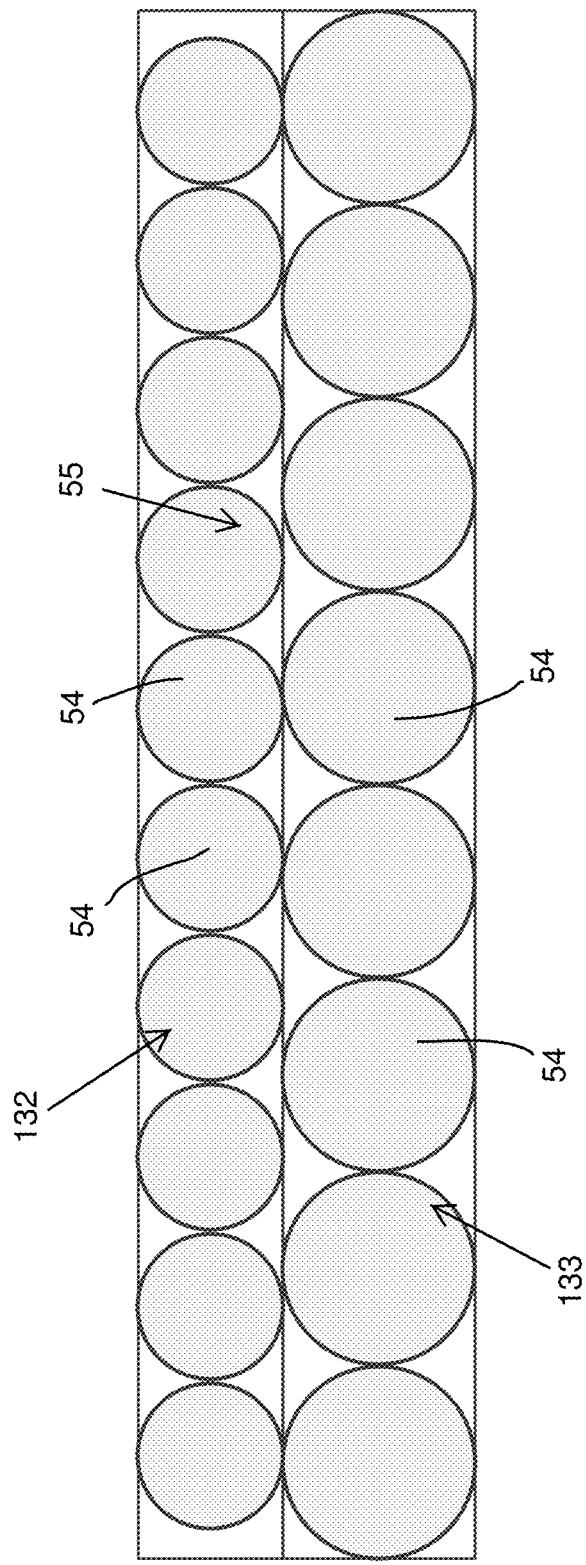
FIG. 57 is a plan schematic view of another embodiment of an exposure device for use in connection with an apparatus for producing a three-dimensional object in operation, according to aspects of the disclosure.

FIG. 57 illustrates an embodiment of an array 55 of the outlets 54 of the exposure assembly 60 that are configured such that a first subset 132 of the array 55 is configured for emitting waves 53 having a first property and a second subset 133 of the array is configured for emitting waves 53 having a second property. In one embodiment, the first and second subsets 132, 133 may be configured for emitting waves having different power output levels, permitting significantly greater versatility in production. For example, the first subset 132 may include smaller outlets 54 (e.g., smaller diameter optical fibers 61) with relatively smaller power output levels that are more tightly packed together, to permit greater y-direction resolution for critical dimensions, and the second subset 132 may include larger outlets 54 (e.g., larger diameter optical fibers 61) with relatively larger power output levels to permit more rapid solidification for filling the body of an object. The different power outputs may be achieved by connecting the outlets 54 of the different subsets 132, 133 to different exposure devices 50, connecting the outlets 54 of the different subsets 132, 133 to a single exposure device 50 that is capable of power variation, or by the entrance ends 62 of the second subset 133 receiving waves 53 emitted by a larger number of pixels (if a DLP projector is used) due to their larger size. A combination of outlets 54 from different subsets 132, 133 (including laterally overlapping outlets 54) may be activated to permit further process variability, such as further increased exposure power and/or a combination of high power for the middle portions of the object 11 and finer resolution at the edges of the object 11. In an alternate embodiment, some of these benefits may be achieved using subsets 132, 133 of smaller and larger diameter optical fibers 61 without having any difference in power output between the two subsets 132, 133. In another embodiment, the outlets 54 of the first and second subsets 132, 133 may be connected to different exposure devices that emit different wavelengths of waves 53 that may cure different types of materials 36 or to cure one material 36 at different rates. It is understood that a larger number of subsets 132, 133 with further different properties may be used in other embodiments, and that the waves 53 emitted by each subset may have multiple properties differing from each other.

Figures 61A, 61B:
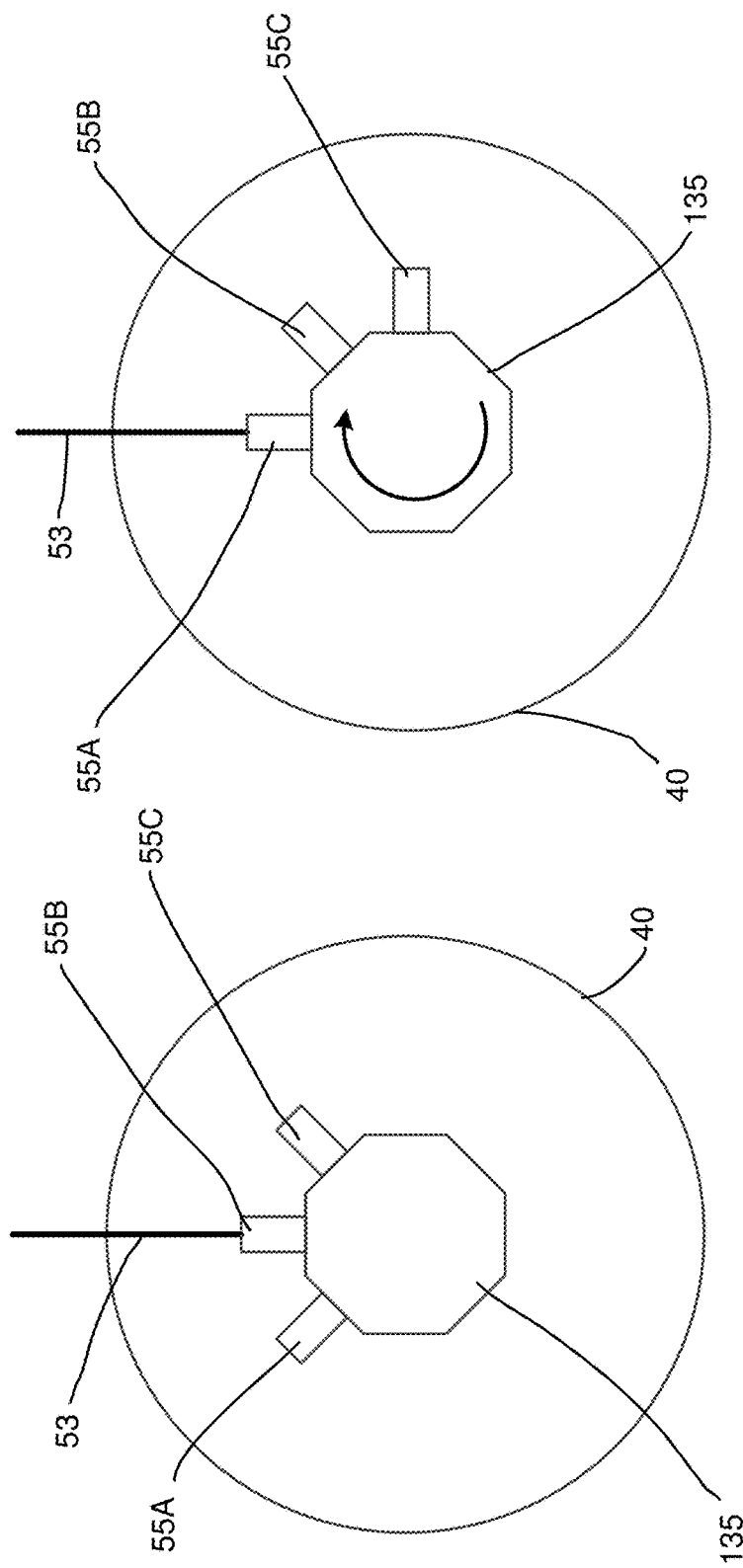
FIGS. 61A and 61B are side schematic views of another embodiment of an exposure device and an applicator for use in connection with an apparatus for producing a three-dimensional object in operation, according to aspects of the disclosure.

FIGS. 61A and 61B illustrates an embodiment of a deposition mechanism 30 that uses multiple outlets 54 or arrays 55A-C of outlets 54 that can be switched selectively. In one embodiment, multiple arrays 55A-C of outlets 54 may be mounted on a mounting structure 135 that is rotatable about an axis (e.g., mounted on a gimbal structure), such that the arrays 55A-C can be selectively aimed toward the exposure site 51. Each array 55A-C may be configured differently. For example, the arrays 55A-C may be configured to emit waves 53 having one or more different properties, e.g., wavelengths, power, or other properties as described herein, or the arrays 55A-C may have outlets 54 that are sized or arranged differently to produce different resolution ability. This configuration increases the versatility of the process, as a single deposition mechanism 30 can operate with different materials 36 that require waves 53 having different properties for solidification and different projects that require different resolution capabilities, similar to the configuration of FIG. 57. It is understood that the subsets 132, 133 in FIG. 57 may be mounted to be moveable to selectively aim each subset 132, 133 toward the exposure site 51 in one embodiment, such as by translational movement and/or by rotational movement as shown in FIGS. 61A-B. In other embodiments, the deposition mechanism 30 may include a different number of arrays 55A-C, and the mounting structure 135 may be moveable in a different manner to select among the arrays 55A-C.

Figure 58:
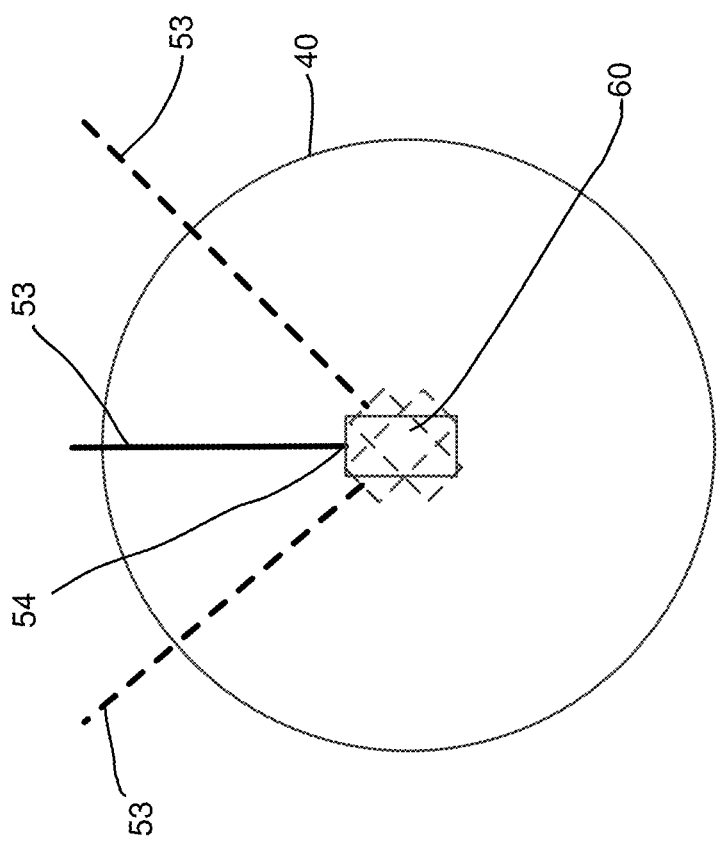
FIG. 58 is a side schematic view of another embodiment of an exposure device and an applicator for use in connection with an apparatus for producing a three-dimensional object in operation, according to aspects of the disclosure.

FIG. 58 illustrates one embodiment of a structure for directing the waves 53 so that the exposure site 51 is located approximately at the application site 41 in one embodiment, or so that the exposure site 51 is offset from the application site 41 (ahead or behind the application site 41 in the direction of travel) in another embodiment, as described herein and illustrated with respect to FIGS. 1, 3, and 4. In this embodiment, the aim of the outlets 54 is adjustable forwardly and rearwardly in the x-direction. As illustrated in FIG. 58, the outlets 54 of the exposure assembly 60 may be configured to be tiltable in one embodiment, such as by mounting the outlets 54 using a structure (e.g., braces 65) that is rotatable or pivotable over a range of movement to advance or retard the exposure site 51. For example, the deposition mechanism 30 may include a mounting structure for the outlets 54 that is mounted on a gimbal to permit single-axis rotation. It is understood that the degree of tilting shown in FIG. 58 may be exaggerated compared to the actual degree of tilting necessary to achieve this purpose in many embodiments. In another embodiment, the exposure device 50 may include multiple arrays of outlets 54 that are directed at different angles, where selective activation of the outlets 54 allows the exposure site 51 to be advanced or retarded. In a further embodiment, the outlets 54 may be aimed differently by translational movement in the x-direction. It is understood that the degree of offset of the exposure site 51 may depend on the properties of the flowable material 36 and the speed of the deposition mechanism 30, among other factors. Offsetting the exposure site 51 may improve bonding of the flowable material 36 to the surface 130 and/or separation of the flowable material 36 from the roller 42. On rollers 42 having greater lengths, contraction of the material 36 as it solidifies can pull on the surface of the roller 42 if the material 36 is not properly separated from the roller 42, causing dimensional distortion (e.g., bowing outward) of the surface of the roller 42. Offsetting the exposure site 51 can therefore be particularly advantageous for such configurations.

Figure 59:
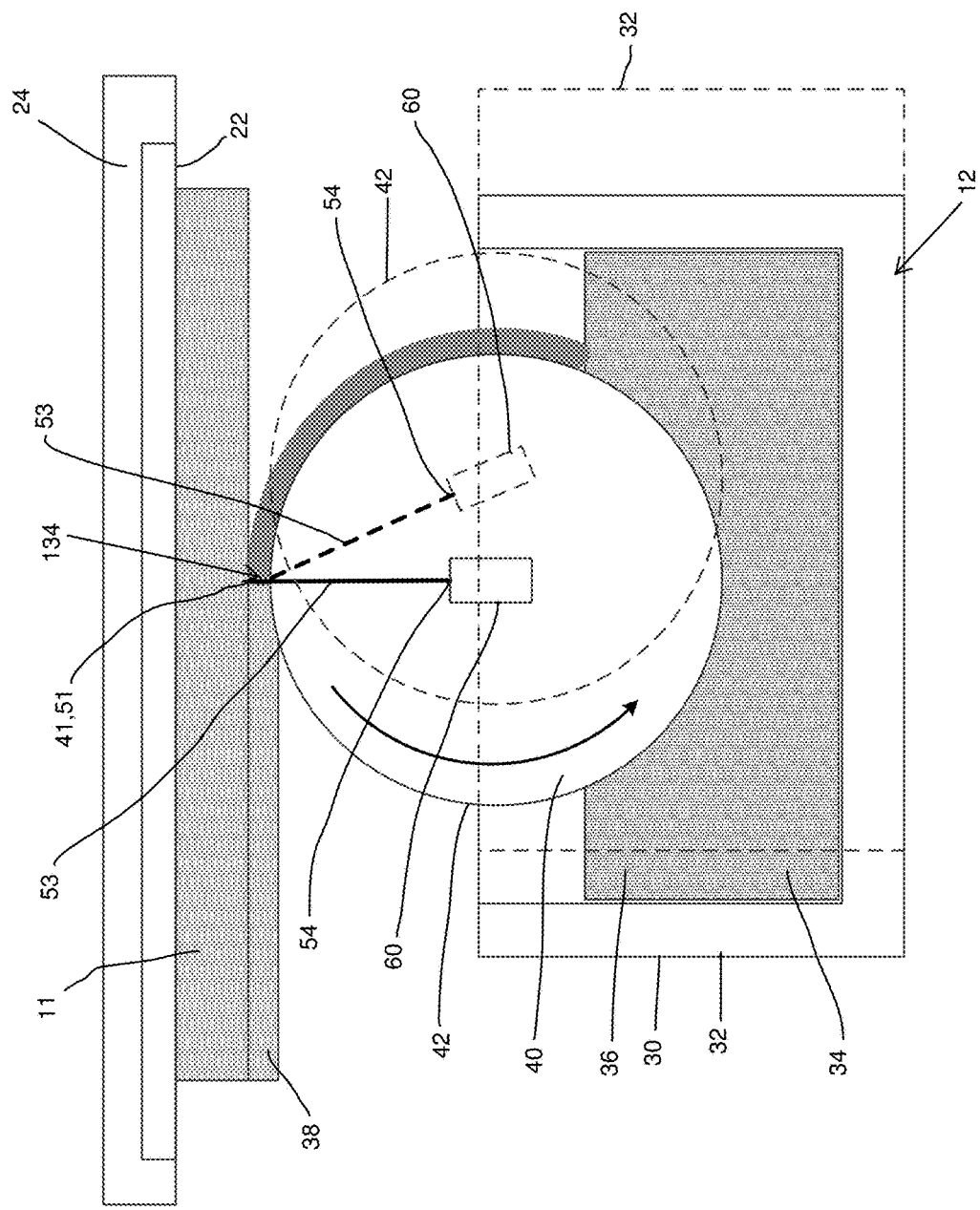
FIG. 59 is a side schematic view illustrating one embodiment of operation of the exposure device and applicator of FIG. 58 in connection with an apparatus for producing a three-dimensional object in operation, according to aspects of the disclosure.
Figure 60:
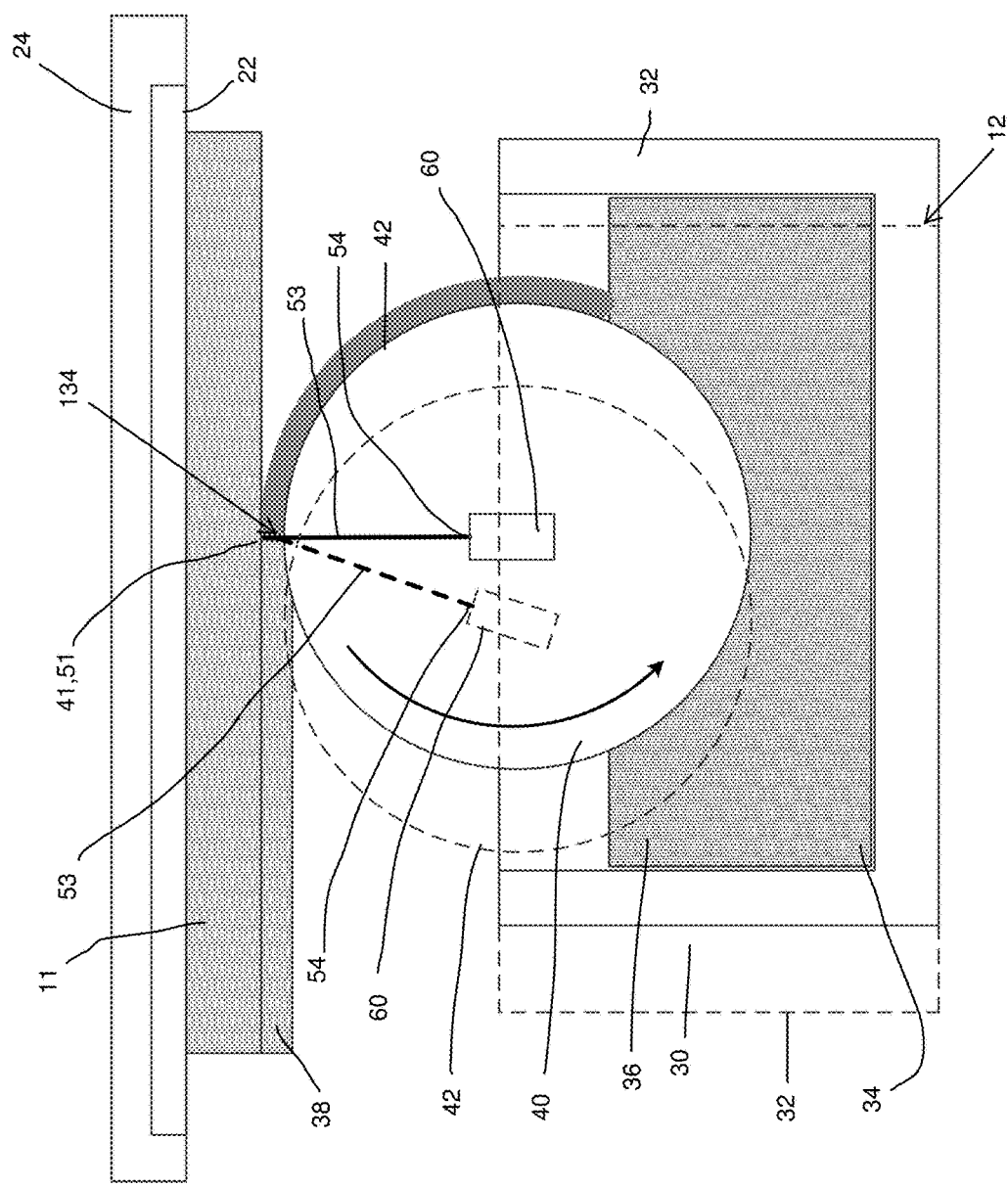
FIG. 60 is a side schematic view illustrating another embodiment of operation of the exposure device and applicator of FIG. 58 in connection with an apparatus for producing a three-dimensional object in operation, according to aspects of the disclosure.

FIGS. 59 and 60 illustrate an embodiment of a deposition mechanism 30 with an exposure assembly 60 capable of directing the waves 53 offset from the application site 41. In the embodiment of FIGS. 59 and 60, the aim of the outlets 54 is adjusted along the direction of travel of the deposition mechanism as the applicator 40 passes the application site 41 to focus the waves 53 on a defined point 134 within the build area 22 as the applicator 40 passes the defined point 134, to increase the exposure time of the defined point 134. As illustrated in FIG. 59, the exposure assembly 60 is configured for continuously adjusting the aim of the outlets 54 rearwardly in the travel direction so that the aim of the outlets 54 tracks the defined point 134 and continue to focus on the defined point 134 after the applicator 40 (i.e., the apex of the roller 42 in this embodiment) passes the defined point 134. As illustrated in FIG. 60, the exposure assembly 60 is configured for continuously adjusting and re-adjusting the aim of the outlets 54 forwardly in the travel direction so that the aim of the outlets 54 tracks the defined point 134 in advance of the applicator 40 and continue to focus on the defined point until the applicator 40 (i.e., the apex of the roller 42 in this embodiment) arrives at the defined point 134. This creates moments of stationary exposure at the defined point 134, and it is understood that the start/stop aim angles may be based on factors such as build speed and the properties of the material 36. It is understood that the embodiments in FIGS. 59 and 60 may be combined so that the aim of the outlets 54 tracks the defined point 134 both in advance of and behind the arrival of the applicator 40 at the defined point 134.

In a further embodiment, an apparatus 12 as described herein may be enclosed within a sealed chamber that may be temperature controlled, pressure-controlled, humidity-controlled, and/or filled with a specific gas (including mixtures of gases). Temperature, pressure, and humidity control may be able to influence build speed and thereby improve efficiency. Additionally, the apparatus 12 has the ability to build hollow, sealed objects 11, and thus, selection of the environmental gas may permit production of a hollow, sealed object 11 filled with a specified gas. For example, such an object 11 filled with an inert gas may be useful, e.g., for aerospace applications.

The system 10 also includes a controller 100 that is configured to control and/or monitor the operation of one or more mechanisms of the apparatus 12, including numerous examples described herein. In one embodiment of the invention, controller 100 may be implemented with a computer system, such as computer 2602. Computer 2602 includes a central processor 2604 that controls the overall operation of the computer and a system bus 2606 that connects central processor 210 to the components described below. System bus 2606 may be implemented with any one of a variety of conventional bus architectures.

Computer 2602 may include a variety of interface units and drives for reading and writing data or files. For example, computer 2602 may include a memory interface 2608 coupling a memory drive 2610 to system bus 2606. Memory drive 2610 may be implemented with physical memory device, magnetic memory device, optical memory device or other type of memory device. Memory drive 2610 may store data, CAD files, and other electronic files that are used to produce three-dimensional objects as described herein. A system memory 2612 may be included and implemented with a conventional computer readable medium memory having a read only memory section that stores a basic input/output system (BIOS) and a random access memory (RAM) that stores other data and files. Memory drive 2610 and system memory 2612 may both contain computer-executable instructions designed to be executed by processor 2604. In some embodiments, one or more control programs for operating one or more apparatuses 12 and/or multiple components (e.g., multiple deposition mechanisms 30) within each apparatus 12 may be stored in memory drive 2610 and/or system memory 2612.

Figure 26:
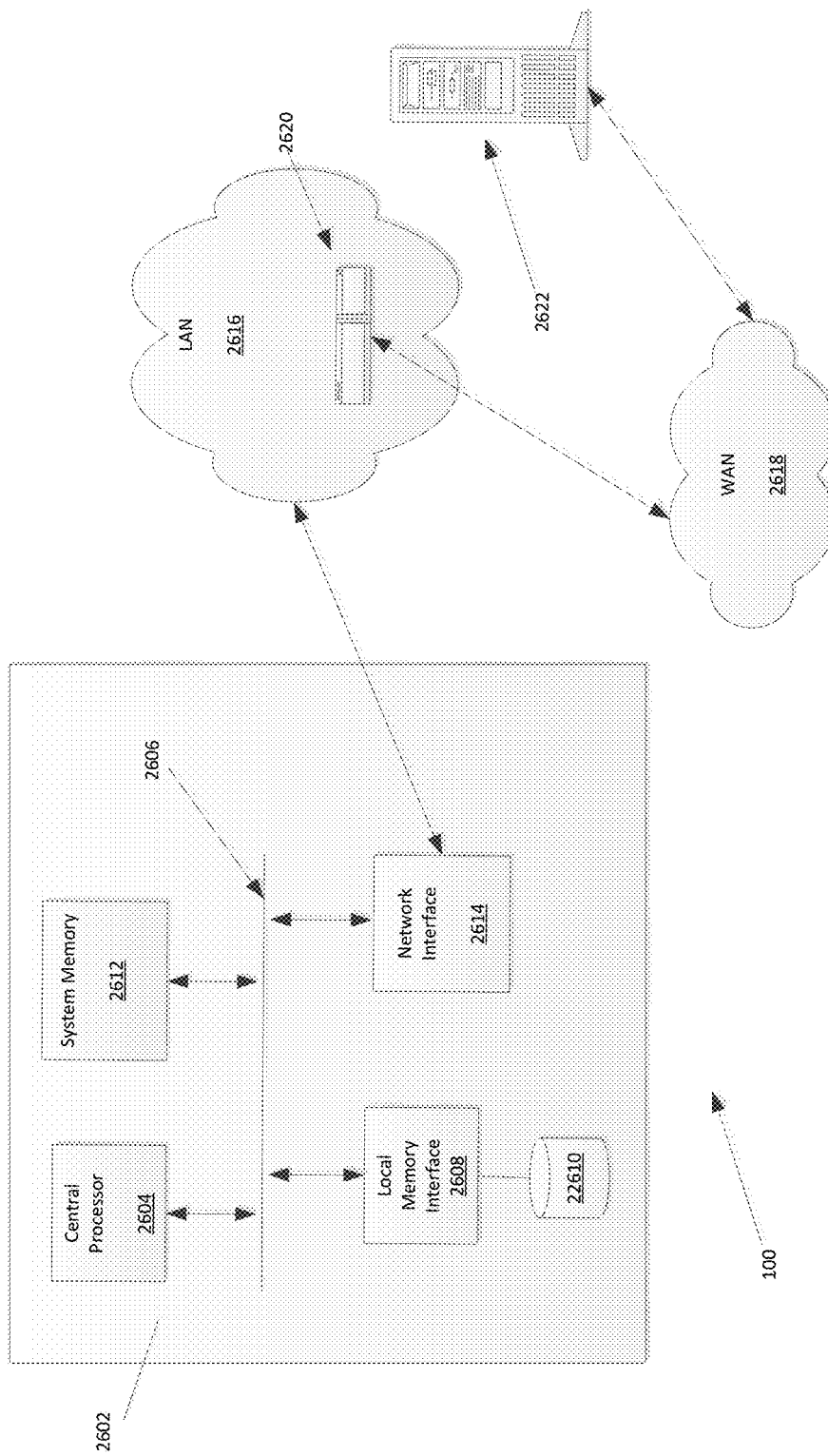
FIG. 26 is a schematic view of a controller according to aspects of the disclosure.

Computer 2602 may include additional interfaces for connecting peripheral devices to system bus 2606. For example, computer 2602 may also include a network interface 2614 that couples system bus 2602 to local area network (LAN) 2616. LAN 2616 may have one or more of the well-known LAN topologies and may use a variety of different protocols, such as Ethernet. A wide area network (WAN) 2618, such as the Internet, may also be accessed by computer 2602. FIG. 26 shows a router 2620 that may connect LAN 2616 to WAN 2618 in a conventional manner. A server 2622 is shown connected to WAN 204. Of course, numerous additional servers, computers, handheld devices, personal digital assistants, telephones and other devices may also be connected to WAN 2618. In some embodiments, server 2622 stores data, CAD files, control programs and/or other electronic files that may be accessed by computer 2602 and used to produce three-dimensional objects as described herein.

Various embodiments are described herein with various combinations of features and components. It is understood that the features and components of each of the various embodiments described herein may be incorporated into other embodiments described herein.

The use of the system and apparatus described herein provides benefits and advantages over existing technology. For example, consumable cost is greatly decreased, as the apparatus generates little waste and does not require maintaining a large vat of material to be solidified for manufacturing, as do many current technologies. Additionally, the structure of the apparatus does not dictate any specific size limits, and the apparatus may be configured to create an object that is significantly larger than existing technologies. The length of the track and the width of the applicator can be increased as desired without negatively affecting performance, and the size of the room in which the apparatus sits becomes the limit of the size of the apparatus. Further, the apparatus may be configured for manufacturing an object or multiple objects many times faster than any existing technology. The apparatus also provides the ability to manufacture objects from multiple materials, including objects that have removable support structure that is made from a material different from that of the main object. Production of objects from multiple materials that require different exposure sources is enabled as well. The apparatus further provides the ability to manufacture functional objects, such as a window or other transparent object, or a conductive object. Still further, objects manufactured using the apparatus described herein may not require draining liquid material from any internal cavities of the finished object, which may require drilling a hole for drainage. The apparatus is also capable of producing clean, dry, and fully-cured objects, which increases production efficiency. The modular configuration of the apparatus also great versatility, customizability, and other benefits.

Additional advantages are provided by the configuration of the deposition mechanism 30 as an autonomous unit 90 with a vertical adjustment mechanism 120, in combination with an open-ended track 14 that can be engaged and disengaged by the unit 90 and a build platform 22 associated with the track 14 and configured for manufacturing of an object 11 in a downward layer-by-layer technique. This configuration permits multiple deposition mechanisms 30 to operate on the same track 14 to apply multiple layers to one or more objects 11 simultaneously. Multiple deposition mechanisms 30 operating on the same track 14 may combine to build one or more objects 11 or may build multiple objects 11 separately and simultaneously on the same build platform 22. This configuration also enables building multiple objects of the same or different materials in separate locations on the same build platform 22 in a rapid manner. This configuration also facilitates maintenance of the deposition mechanism 30, as an autonomous unit 90 can be removed from the production process for maintenance quickly and easily, and may also be quickly and easily replaced with another unit 90 to achieve substantially uninterrupted production. A system including multiple such units 90 can operate with a number of different build platforms 22, such as in a large production facility, where the units 90 can be assigned and re-assigned to specific build areas 13 as needed for optimized production. Still other benefits and advantages over existing technology are provided by the systems, apparatuses, and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. An assembly comprising:
   a support assembly comprising a build platform defining a build area for producing a three-dimensional object on the build platform;
   a track extending through the build area, wherein the track has an open end; and
   a deposition mechanism configured to be engaged with the track, the deposition mechanism comprising a carriage configured for movement along the track through the build area, a supply of a flowable resin mounted on the carriage, an applicator in communication with the supply of the flowable resin and configured for application of the flowable resin, and an exposure device mounted on the carriage and configured for emitting electromagnetic waves to solidify the flowable resin,
   wherein the deposition mechanism comprises a track engagement mechanism configured for releasably engaging the track and moving the deposition mechanism along the track for producing the three-dimensional object, and
   wherein the deposition mechanism is engageable with and disengageable from the track by passing through the open end of the track, and the deposition mechanism further comprises a ground engagement mechanism configured to move the deposition mechanism separately and autonomously from the track when the deposition mechanism is disengaged from the track.

2. The assembly of claim 1, wherein the ground engagement mechanism comprises wheels configured for movement of the deposition mechanism separately from the track.

3. The assembly of claim 1, wherein the track comprises first and second rails on opposite sides of the build platform, wherein the first and second rails are configured to be engaged by the deposition mechanism and support the deposition mechanism for movement through the build area, and wherein an opening is defined between the first and second rails at the open end, such that the deposition mechanism can engage with and disengage from the track by passing through the opening.

4. The assembly of claim 3, wherein the track engagement mechanism comprises rollers configured to engage inner and outer surfaces of the first and second rails and gears configured to drive movement of the deposition mechanism along the first and second rails.

5. The assembly of claim 1, wherein the track extends below the build platform and the build area is defined below the build platform.

6. The assembly of claim 1, wherein the deposition mechanism further comprises an onboard power source to power operation of the deposition mechanism.

7. The assembly of claim 1, wherein the deposition mechanism further comprises a processor configured to control movement of the carriage and operation of the applicator and the exposure device in an autonomous manner, according to computer-executable instructions.

8. The assembly of claim 1, wherein the ground engagement mechanism further comprises extendible stabilizers, wherein the stabilizers are configured to be movable between an extended position for stabilizing the deposition mechanism when the deposition mechanism is disengaged from the track and a retracted position when the deposition mechanism is engaged with the track.

9. The assembly of claim 1, wherein the build platform is moveable between a build position and a tending position, wherein the build platform faces toward the track in the build position to permit production of the three dimensional object by the deposition mechanism located on the track, and wherein the build platform faces away from the track in the tending position to permit a tending operation to be performed on the three dimensional object.

10. The assembly of claim 9, wherein the support assembly further comprises a rotating base configured for rotation on an axis and a support platform extending from the rotating base in a direction parallel to the axis, wherein the build platform is supported by the support platform, and wherein the build platform is moveable between the build position and the tending position by rotation of the rotating base, which causes the support platform to orbit the axis.

11. The assembly of claim 1, wherein the track includes a rail, and the track engagement mechanism further includes a first engagement structure configured to engage a first surface of the rail and a second engagement structure configured to engage a second surface of the rail, and wherein the first and second surfaces extend to the open end of the track and are configured to engage the first and second engagement structures at the open end, and wherein the first and second engagement structures are selected from a group consisting of: wheels, rollers, sliders, gears, and sprockets.

12. An assembly comprising:
a support assembly comprising a build platform defining a build area for producing a three-dimensional object on the build platform;
a track extending through the build area, wherein the track has an open end; and
a deposition mechanism configured to be engaged with the track, the deposition mechanism comprising a carriage configured for movement along the track through the build area, a supply of a flowable resin mounted on the carriage, an applicator in communication with the supply of the flowable resin and configured for application of the flowable resin, and an exposure device mounted on the carriage and configured for emitting electromagnetic waves to solidify the flowable resin,
wherein the deposition mechanism comprises a track engagement member comprising a first rotating element configured for releasably engaging the track and moving the deposition mechanism along the track for producing the three-dimensional object, and
wherein the deposition mechanism is engageable with and disengageable from the track by passing through the open end of the track, and the deposition mechanism further comprises a ground engagement member comprising a second rotating element configured for powering movement of the deposition mechanism separately from the track, and wherein the deposition mechanism is configured to move autonomously when disengaged from the track.

13. An assembly comprising:
a support assembly comprising a build platform defining a build area for producing a three-dimensional object on the build platform;
a track extending through the build area, wherein the track has an open end; and
a first deposition mechanism configured to be engaged with the track, the first deposition mechanism comprising a first carriage configured for movement along the trackthrough the build area, a first supply of a first flowable resin mounted on the first carriage, a first applicator in communication with the first supply of the first flowable resin and configured for application of the first flowable resin, and a first exposure device mounted on the first carriage and configured for emitting electromagenetic waves to solidify the first flowable resin; and
a second deposition mechanism configured to be engaged with the track simultaneously with the first deposition mechanism, the second deposition mechanism comprising a second carriage configured for movement along the track through the build area, a second supply of a second flowable resin mounted on the second carriage, a second applicator in communication with the second supply of the second flowable resin and configured for application of the second flowable resin, and a second exposure device mounted on the second carriage and configured for emitting electromagnetic waves to solidify the second flowable resin,
wherein the first deposition mechanism is configured for releasably engaging the track and moving along the track for producing the three-dimensional object, and the first deposition mechanism is engagable with and disengagable from the track by passing through the open end of the track, and wherein the first deposition mechanism is further configured for engaging a ground surface to move the first deposition mechanism separately from the track when the first deposition mechanism is disengaged from the track, and
wherein the second deposition mechanism is configured for releasably engaging the track and moving along the track for producing the three-dimensional object together with the first deposition mechanism, and the second deposition mechanism is engagable with and disengagable from the track by passing through the open end of the track.

14. The assembly of claim 13, wherein the track comprises first and second rails on opposite sides of the build platform, wherein the first and second rails are configured to be engaged by the first and second deposition mechanisms and support the first and second deposition mechanisms for movement through the build area, and wherein an opening is defined between the first and second rails at the open end, such that the first and second deposition mechanisms can engage and disengage from the track by passing through the opening.

15. The assembly of claim 14, wherein the first deposition mechanism comprises rollers configured to engage inner and outer surfaces of the first and second rails and gears configured to drive movement of the first deposition mechanism along the first and second rails.

16. The assembly of claim 13, wherein the track extends below the build platform and the build area is defined below the build platform.

17. The assembly of claim 13, wherein the first deposition mechanism further comprises an onboard power source to power operation of the first deposition mechanism.

18. The assembly of claim 13, wherein the first deposition mechanism further comprises a processor configured to control movement of the first carriage and operation of the first applicator and the first exposure device in an autonomous manner, according to computer-executable instructions.

19. The assembly of claim 13, wherein the build platform is moveable between a build position and a tending position, wherein the build platform faces toward the track in the build position to permit production of the three dimensional object by the first and second deposition mechanisms located on the track, and wherein the build platform faces away from the track in the tending position to permit a tending operation to be performed on the three dimensional object.

20. The assembly of claim 19, wherein the support assembly further comprises a rotating base configured for rotation on an axis and a support platform extending from the rotating base in a direction parallel to the axis, wherein the build platform is supported by the support platform, and wherein the build platform is moveable between the build position and the tending position by rotation of the rotating base, which causes the support platform to orbit the axis.

21. The assembly of claim 13, wherein the second flowable resin has a property that is different from the first flowable resin.

22. The assembly of claim 13, wherein the first flowable resin and the second flowable resin are the same.

23. The assembly of claim 13, wherein the first deposition mechanism and the second deposition mechanism are configured to pass along the track through the build area sequentially.

\* \* \* \* \*